(12) United States Patent
Toyoda et al.

(10) Patent No.: US 11,817,768 B2
(45) Date of Patent: Nov. 14, 2023

(54) POWER CONVERSION DEVICE THAT CAN SUPPRESS INTERFERENCE BETWEEN CONTROL OF INPUT CURRENT FROM AN AC POWER SUPPLY AND VOLTAGE CONTROL FOR A DC CAPACITOR

(71) Applicant: Mitsubishi Electric Corporation, Tokyo (JP)

(72) Inventors: Hajime Toyoda, Tokyo (JP); Takaaki Takahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 192 days.

(21) Appl. No.: 17/283,255

(22) PCT Filed: Dec. 13, 2018

(86) PCT No.: PCT/JP2018/045841
§ 371 (c)(1),
(2) Date: Apr. 7, 2021

(87) PCT Pub. No.: WO2020/121469
PCT Pub. Date: Jun. 18, 2020

(65) Prior Publication Data
US 2021/0344277 A1    Nov. 4, 2021

(51) Int. Cl.
*H02M 1/00*    (2006.01)
*H02M 1/42*    (2007.01)
*H02M 7/483*    (2007.01)

(52) U.S. Cl.
CPC ......... *H02M 1/007* (2021.05); *H02M 1/4208* (2013.01); *H02M 7/4837* (2021.05); *H02M 1/0095* (2021.05)

(58) Field of Classification Search
CPC ............. H02M 1/4266; H02M 1/4225; H02M 1/4208; H02M 7/2176; H02M 7/23;
(Continued)

(56) References Cited

U.S. PATENT DOCUMENTS 9,998,007 B2 *   6/2018  Yuasa ................. H02M 7/4837
10,128,744 B1 *  11/2018 Viswanathan ...... H02M 1/4225
(Continued)

FOREIGN PATENT DOCUMENTS

JP    2013-118776 A    6/2013
JP    2017-85691 A     5/2017
(Continued)

OTHER PUBLICATIONS

Office Action dated Mar. 1, 2022, in corresponding Indian patent Application No. 202127024790, 5 pages.
(Continued)

*Primary Examiner* — Gustavo A Rosario-Benitez
(74) *Attorney, Agent, or Firm* — XSENSUS LLP

(57) ABSTRACT

Provided is a power conversion device that can suppress interference between control of input current from an AC power supply and voltage control for a DC capacitor to perform both the controls with high accuracy, and can reduce the capacitance and size of the DC capacitor. A power conversion circuit includes a rectification bridge circuit, a leg circuit having upper and lower legs connected in series, a DC capacitor, a smoothing capacitor, and a reactor. A control circuit performs PWM control of the leg circuit by generating a duty cycle so as to control a voltage of the DC capacitor while controlling an input current from an AC power supply, in a control cycle. When the duty cycle is generated, a sum of duty cycles is made constant in one cycle for each leg.

19 Claims, 46 Drawing Sheets

(58) Field of Classification Search
CPC ............. H02M 7/4837; H02M 7/4835; H02M 1/0095; H02M 1/0083; H02M 7/219
See application file for complete search history.

(56) References Cited

U.S. PATENT DOCUMENTS

| | | | |
|---|---|---|---|
| 10,164,546 B2 | 12/2018 | Kondo et al. | |
| 2010/0289423 A1* | 11/2010 | Yao | H02M 1/4225 315/246 |
| 2015/0171763 A1* | 6/2015 | Kondo | H02M 5/458 363/37 |
| 2016/0197562 A1* | 7/2016 | Kondo | H02M 7/2176 363/126 |
| 2017/0244317 A1* | 8/2017 | Kondo | H02M 7/12 |
| 2017/0324348 A1* | 11/2017 | Yamashita | H02M 5/458 |
| 2019/0334445 A1 | 10/2019 | Ishikawa et al. | |

FOREIGN PATENT DOCUMENTS

| | | |
|---|---|---|
| WO | 2015/045485 A1 | 4/2015 |
| WO | 2018/135045 A1 | 7/2018 |

OTHER PUBLICATIONS

International Search Report and Written Opinion dated Feb. 19, 2019, received for PCT Application PCT/JP2018/045841, Filed on Dec. 13, 2018, 8 pages including English Translation.
European Office Action dated Oct. 18, 2022 in corresponding European Patent Application No. 18 942 689.3, 7 pages.
Extended European Search Report dated Oct. 29, 2021, in corresponding European Patent Application No. 18942689.3.

* cited by examiner

FIG. 4

OPERATION RANGE α1

| REACTOR Cf | EXCITATION | | | RESET | | |
|---|---|---|---|---|---|---|
| | A1 | B1 | C1 | D1 | E1 | F1 |
| SWITCHING STATE | THROUGH | DISCHARGE | CHARGE | THROUGH | DISCHARGE | CHARGE |
| VOLTAGE APPLIED TO REACTOR | vac | | | vac−Vdc | vac−Vdc+Vcf | vac−Vcf |
| GQ1 | 1 | | | 0 | 0 | 1 |
| GQ2 | 1 | | | 0 | 1 | 0 |
| GQ3 | 0 | | | 1 | 0 | 1 |
| GQ4 | 0 | | | 1 | 1 | 0 |

FIG. 5

OPERATION RANGE α2

| REACTOR | | EXCITATION | | | RESET | |
|---|---|---|---|---|---|---|
| Cf | A2 | B2 | C2 | D2 | E2 | F2 |
| SWITCHING STATE | THROUGH | DISCHARGE | CHARGE | THROUGH | DISCHARGE | CHARGE |
| VOLTAGE APPLIED TO REACTOR | vac | vac-Vdc+Vcf | vac-Vcf | vac-Vdc | | |
| GQ1 | 1 | 0 | 1 | 1 | | |
| GQ2 | 1 | 0 | 0 | 1 | | |
| GQ3 | 0 | 1 | 1 | 0 | | |
| GQ4 | 0 | 1 | 0 | 0 | | |

FIG. 6

OPERATION RANGE α3

| REACTOR Cf | EXCITATION | | | | RESET | |
|---|---|---|---|---|---|---|
| SWITCHING STATE | A3 | B3 | C3 | D3 | E3 | F3 |
| | THROUGH | DISCHARGE | CHARGE | THROUGH | DISCHARGE | CHARGE |
| VOLTAGE APPLIED TO REACTOR | Vdc-vac | Vcf-vac | Vdc-vac-Vcf | vac-Vdc | | |
| GQ1 | 1 | 1 | 0 | 0 | | |
| GQ2 | 1 | 0 | 1 | 0 | | |
| GQ3 | 0 | 1 | 0 | 1 | | |
| GQ4 | 0 | 0 | 1 | 1 | | |

FIG. 7

OPERATION RANGE α4

| REACTOR | | EXCITATION | | | RESET | | |
|---|---|---|---|---|---|---|---|
| SWITCHING STATE | A4 | B4 | C4 | D4 | E4 | F4 |
| Cf | THROUGH | DISCHARGE | CHARGE | THROUGH | DISCHARGE | CHARGE |
| VOLTAGE APPLIED TO REACTOR | Vdc-vac | | | -vac | Vf-vac | Vdc-vac-Vcf |
| GQ1 | 1 | | | 0 | 1 | 0 |
| GQ2 | 1 | | | 0 | 0 | 1 |
| GQ3 | 0 | | | 1 | 1 | 0 |
| GQ4 | 0 | | | 1 | 0 | 1 |

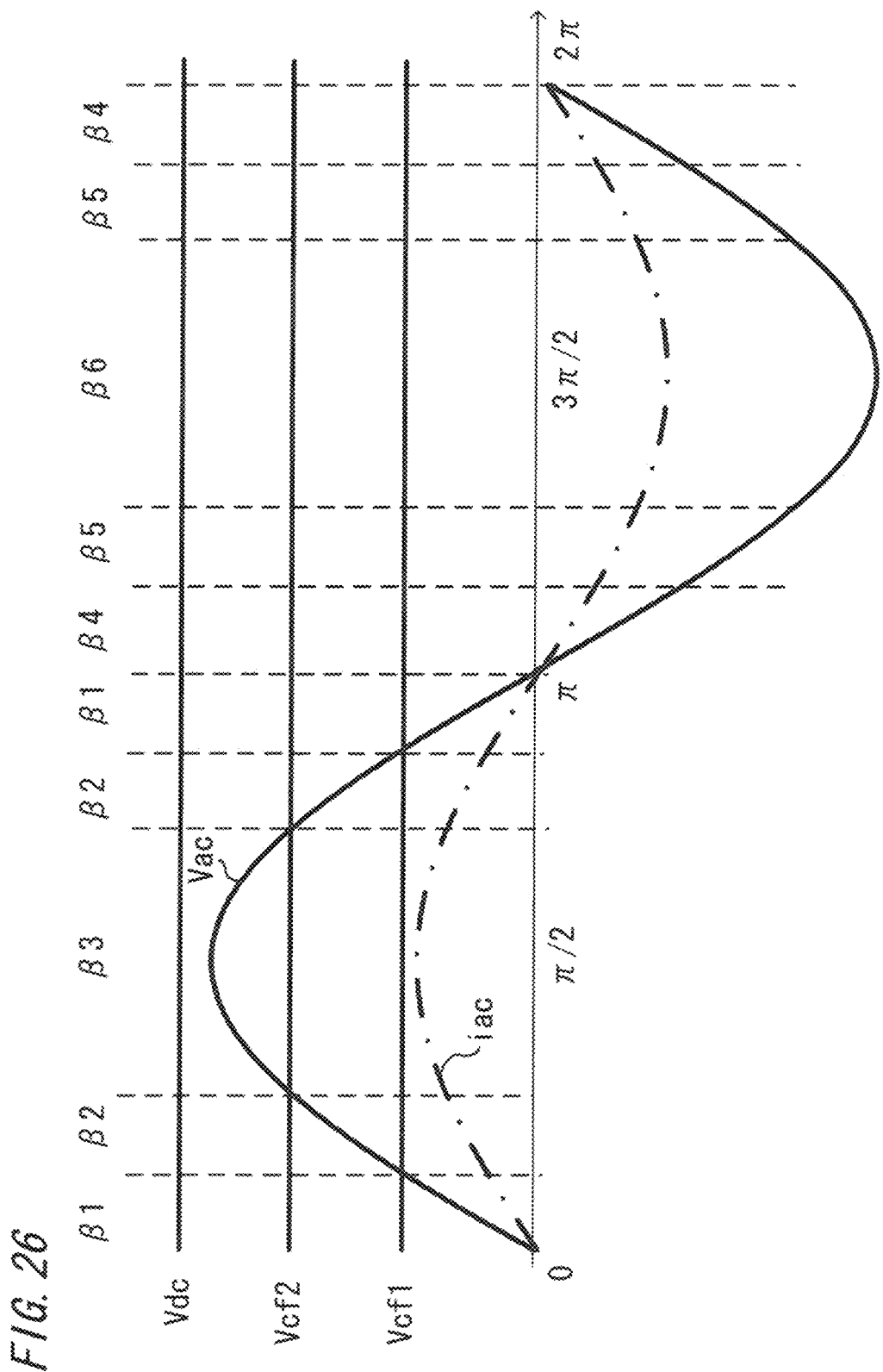

FIG. 27

OPERATION RANGE β1

| REACTOR | EXCITATION | | | | | RESET | | | | | |
|---|---|---|---|---|---|---|---|---|---|---|---|
| SWITCHING STATE | A1 | B1 | C1 | D1 | E1 | F1 | G1 | H1 | I1 | J1 | K1 |
| Cf1 | THROUGH | DISCHARGE | THROUGH | CHARGE | THROUGH | THROUGH | DISCHARGE | THROUGH | CHARGE | THROUGH | CHARGE |
| Cf2 | THROUGH | THROUGH | DISCHARGE | THROUGH | CHARGE | THROUGH | THROUGH | DISCHARGE | THROUGH | CHARGE | DISCHARGE |
| VOLTAGE APPLIED TO REACTOR | vac | | | | | vac−Vdc | vac−Vdc+Vcf1 | vac−Vdc+Vcf2 | vac−Vcf1 | vac−Vcf2 | vac−Vdc+Vcf2−Vcf1 |
| GQ1 | 1 | | | | | 0 | 0 | 0 | 1 | 1 | 0 |
| GQ2 | 1 | | | | | 0 | 0 | 1 | 1 | 0 | 1 |
| GQ3 | 1 | | | | | 0 | 1 | 1 | 0 | 0 | 0 |
| GQ4 | 0 | | | | | 1 | 0 | 0 | 1 | 1 | 1 |
| GQ5 | 0 | | | | | 1 | 1 | 0 | 0 | 1 | 0 |
| GQ6 | 0 | | | | | 1 | 1 | 1 | 0 | 0 | 1 |

FIG. 28

OPERATION RANGE B2

| REACTOR | EXCITATION | | | | | RESET | | | |
|---|---|---|---|---|---|---|---|---|---|
| SWITCHING STATE | A2 | B2 | C2 | D2 | E2 | F2 | G2 | H2 | I2 | J2 |
| Cf1 | THROUGH | DISCHARGE | THROUGH | CHARGE | THROUGH | THROUGH | DISCHARGE | THROUGH | CHARGE | THROUGH |
| Cf2 | THROUGH | CHARGE | DISCHARGE | THROUGH | CHARGE | THROUGH | THROUGH | DISCHARGE | DISCHARGE | CHARGE |
| VOLTAGE APPLIED TO REACTOR | vac | vac−Vcf2+Vcf1 | vac−Vdc+Vcf2 | vac−Vcf1 | | vac−Vdc | vac−Vdc+Vcf1 | | vac−Vdc+Vcf2−Vcf1 | vac−Vcf2 |
| GQ1 | 1 | 1 | 0 | 1 | | 0 | 0 | | 0 | 1 |
| GQ2 | 1 | 0 | 1 | 1 | | 0 | 0 | | 1 | 0 |
| GQ3 | 1 | 1 | 1 | 0 | | 0 | 1 | | 0 | 0 |
| GQ4 | 0 | 0 | 0 | 1 | | 1 | 0 | | 1 | 1 |
| GQ5 | 0 | 1 | 0 | 0 | | 1 | 1 | | 0 | 1 |
| GQ6 | 0 | 0 | 1 | 0 | | 1 | 1 | | 1 | 0 |

FIG. 29

OPERATION RANGE β3

| REACTOR SWITCHING STATE | EXCITATION | | | | | | | RESET | | | |
|---|---|---|---|---|---|---|---|---|---|---|---|
| | A3 | B3 | C3 | D3 | E3 | F3 | G3 | H3 | I3 | J3 | K3 |
| Cf1 | THROUGH | DISCHARGE | THROUGH | CHARGE | THROUGH | DISCHARGE | THROUGH | THROUGH | THROUGH | CHARGE | THROUGH |
| Cf2 | THROUGH | THROUGH | DISCHARGE | THROUGH | CHARGE | CHARGE | THROUGH | DISCHARGE | DISCHARGE | THROUGH | CHARGE |
| VOLTAGE APPLIED TO REACTOR | $v_{ac}$ | $v_{ac} - V_{dc} + V_{cf1}$ | $v_{ac} - V_{dc} + V_{cf2}$ | $v_{ac} - V_{cf1}$ | $v_{ac} - V_{cf2}$ | $v_{ac} - V_{cf2} + V_{cf1}$ | $v_{ac} - V_{dc}$ | | | | |
| GQ1 | 1 | 0 | 0 | 1 | 1 | 1 | 0 | | | | |
| GQ2 | 1 | 0 | 1 | 1 | 0 | 0 | 0 | | | | |
| GQ3 | 1 | 1 | 1 | 0 | 0 | 1 | 0 | | | | |
| GQ4 | 0 | 0 | 0 | 1 | 1 | 0 | 1 | | | | |
| GQ5 | 0 | 1 | 0 | 0 | 1 | 1 | 1 | | | | |
| GQ6 | 0 | 1 | 1 | 0 | 0 | 0 | 1 | | | | |

FIG. 30

| SWITCHING PATTERN | A1 | G1 | A1 | I1 | A1 | H1 | A1 | J1 | iac

| GQ1 | ON | OFF | ON | | | OFF | ON | |
| GQ2 | ON | OFF | | | ON | | | OFF |
| GQ3 | | ON | | OFF | | ON | | OFF |
| GQ4 | | OFF | | ON | | OFF | | ON |
| GQ5 | OFF | ON | | | OFF | | | ON |
| GQ6 | | ON | | OFF | | ON | | OFF |

Cf1: Dis-Chg, Chg, Dis-Chg
Cf2: Dis-Chg, Chg t0  t1  t2  t3  t4  t5  t6  t7  t8

S1 | S2

T

POWER CONVERSION DEVICE THAT CAN SUPPRESS INTERFERENCE BETWEEN CONTROL OF INPUT CURRENT FROM AN AC POWER SUPPLY AND VOLTAGE CONTROL FOR A DC CAPACITOR

CROSS-REFERENCE TO RELATED APPLICATION

The present application is based on PCT filing PCT/JP2018/045841, filed Dec. 13, 2018, the entire contents of which are incorporated herein by reference.

TECHNICAL FIELD

The present disclosure relates to a power conversion device for converting AC power to DC power by switching control.

BACKGROUND ART

A power conversion device that includes a circuit having a plurality of semiconductor switching elements connected in series, a DC capacitor for energy transfer, and a reactor, and that outputs multi-level DC power by utilizing charging and discharging of the DC capacitor, has been known.

A conventional power conversion device disclosed in Patent Document 1 includes an inverter circuit having a plurality of semiconductor switching elements and a DC capacitor, and a converter circuit having a plurality of semiconductor switching elements. A control unit controls the inverter circuit and the converter circuit such that a voltage of the DC capacitor of the inverter circuit is caused to follow a target DC voltage and a power factor of input current from an AC power supply is one. Furthermore, the control unit performs control such that the power factor of the input current is one by providing a period in which the converter circuit is switched so as to be PWM (pulse width modulation) controlled according to a preset voltage condition, and adds a voltage correction value to the voltage condition to determine switching to PWM-control of the converter circuit.

A conventional power conversion device disclosed in Patent Document 2 includes a reactor connected to a rectifier circuit, a leg portion, and a DC capacitor. The leg portion is structured such that two diodes, and first and second switching elements are connected in series between positive and negative terminals of a smoothing capacitor. A control circuit performs high-frequency PWM control of the first and the second switching elements by shifting a reference phase by half a cycle at a regular driving cycle, controls the sum of and a ratio between on-periods of the first and the second switching elements in one cycle, and achieves both high power factor control of an AC input and voltage control for the DC capacitor.

CITATION LIST

Patent Document

Patent Document 1: Japanese Laid-Open Patent Publication No. 2017-85691
Patent Document 2: International Publication No. WO2015/045485

SUMMARY OF THE INVENTION

Problems to be Solved by the Invention

In the conventional power conversion device disclosed in Patent Document 1, since control is switched at a cycle of the AC power supply, a charging/discharging time constant of the DC capacitor is greater than or equal to ¼ of the cycle of the AC power supply. Therefore, it has been difficult to reduce the capacitance and size of the DC capacitor.

In the conventional power conversion device disclosed in Patent Document 2, although the charging period and the discharging period of the DC capacitor are adjusted within a switching cycle, the voltage control for the DC capacitor interferes with high power factor control of input current. Therefore, it has been difficult to reduce the capacitance of the DC capacitor while maintaining accuracy for control of input current.

The present disclosure discloses a technique for solving the aforementioned problems, and an object of the present disclosure is to provide a power conversion device that can suppress interference between control of input current from an AC power supply and voltage control for a DC capacitor to perform both the controls with high accuracy, and can reduce the capacitance and size of the DC capacitor.

Solution to the Problems

A power conversion device according to the present disclosure includes: a power conversion circuit for converting AC power from an AC power supply, to DC power, and outputting the DC power; and a control circuit for performing output control for the power conversion circuit. The power conversion circuit includes: a rectification bridge circuit connected to the AC power supply; a leg circuit including an upper leg and a lower leg, connected in series, each of which includes a plurality of semiconductor elements connected in series via connection points, the plurality of semiconductor elements of at least the lower leg being switching elements, the leg circuit connected between DC buses and connected to the AC power supply via the rectification bridge circuit; at least one DC capacitor connected between the connection point in the upper leg and the connection point in the lower leg; a reactor inserted in a current path between the AC power supply and the leg circuit; and a smoothing capacitor connected between the DC buses. The control circuit performs PWM control of the leg circuit by generating a duty cycle so as to cause a voltage of the DC capacitor to follow a command value while controlling an input current from the AC power supply, such that a sum of duty cycles corresponding to each leg having the switching elements among the upper and the lower legs, is constant in one cycle.

Effect of the Invention

The power conversion device according to the present disclosure can suppress interference between control of input current from the AC power supply and voltage control for the DC capacitor to perform both the controls with high accuracy, and can reduce the capacitance and the size of the DC capacitor. Thus, the downsizing of the power conversion device can be promoted.

BRIEF DESCRIPTION OF THE DRAWINGS

FIG. 4 illustrates kinds of switching states in one operation range according to embodiment 1.

FIG. 5 illustrates kinds of switching states in one operation range according to embodiment 1.

FIG. 6 illustrates kinds of switching states in one operation range according to embodiment 1.

FIG. 7 illustrates kinds of switching states in one operation range according to embodiment 1.

FIG. 26 illustrates voltage/current waveforms and operation ranges in the power conversion device according to embodiment 2.

FIG. 27 illustrates kinds of switching states in one operation range according to embodiment 2.

FIG. 28 illustrates kinds of switching states in one operation range according to embodiment 2.

FIG. 29 illustrates kinds of switching states in one operation range according to embodiment 2.

FIG. 30 is a waveform diagram illustrating switching patterns and control in one operation range according to embodiment 2.

DESCRIPTION OF EMBODIMENTS

Embodiment 1

Figure 1:
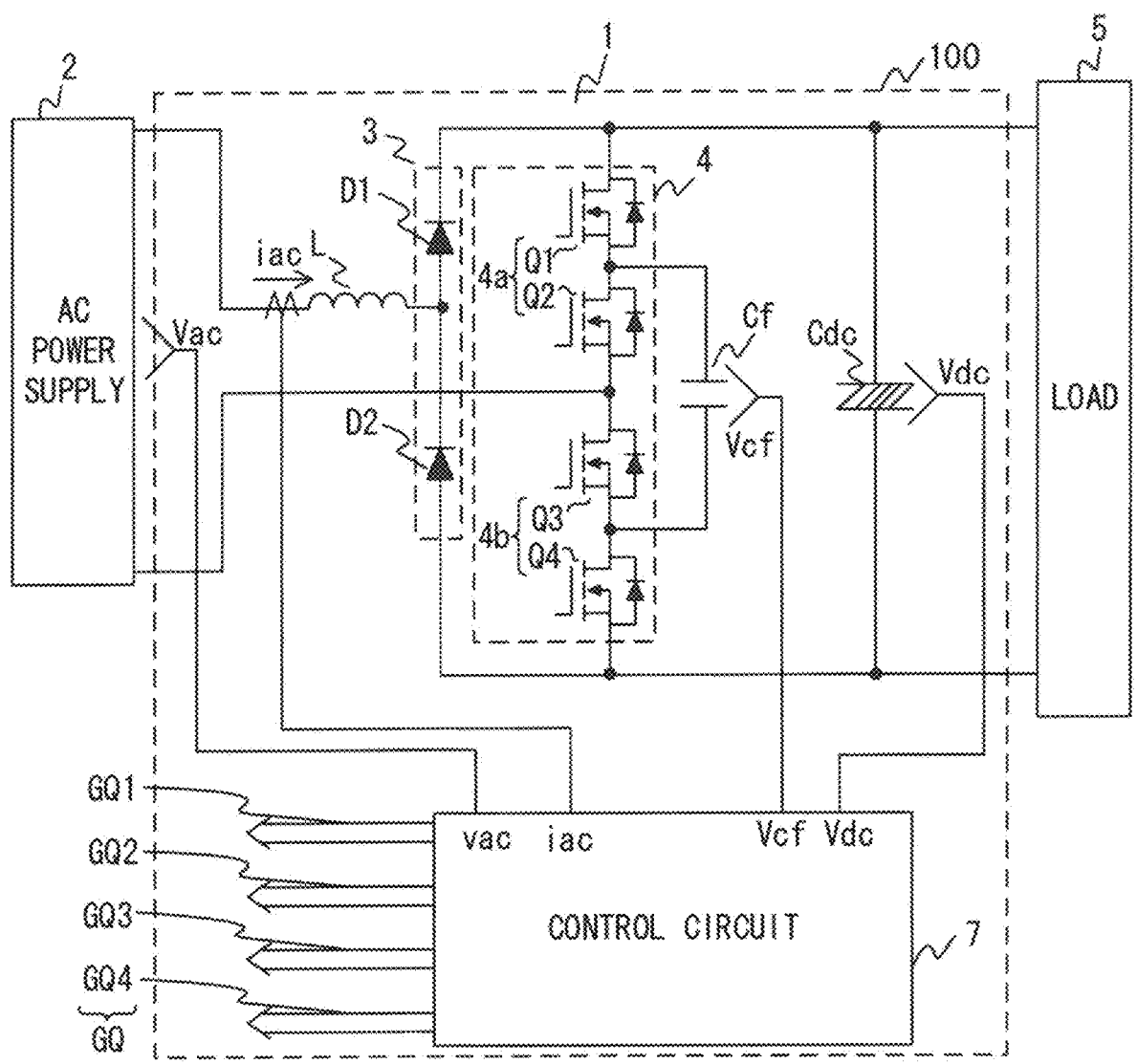
FIG. 1 schematically illustrates a configuration of a power conversion device according to embodiment 1.

FIG. 1 schematically illustrates a configuration of a power conversion device according to embodiment 1.

As shown in FIG. 1, a power conversion device 100 includes a power conversion circuit 1, and a control circuit 7 for performing output control for the power conversion circuit 1, and performs power conversion of AC power from an AC power supply 2, to supply DC power to a load 5.

The power conversion circuit 1 consists of a totem pole type AC/DC converter circuit, and includes a rectification bridge circuit 3 connected to the AC power supply 2, a leg circuit 4, a DC capacitor Cf, a smoothing capacitor Cdc, and a reactor L for limiting an input current iac from the AC power supply 2.

The rectification bridge circuit 3, the leg circuit 4, and the smoothing capacitor Cdc are connected between DC buses, respectively. The rectification bridge circuit 3 is a half-bridge circuit composed of two diodes D1, D2 connected in series. The mid-point of the rectification bridge circuit 3 as a connection point between the two diodes D1, D2 is connected to a first end of the AC power supply 2 via the reactor L. The leg circuit 4 is connected to the AC power supply 2 via the rectification bridge circuit 3.

The leg circuit 4 has an upper leg 4a and a lower leg 4b connected in series, and the mid-point as a connection point between the upper leg 4a and the lower leg 4b is connected to a second end of the AC power supply 2. The upper leg 4a consists of switching elements Q1, Q2, as semiconductor elements, connected in series via a connection point. The lower leg 4b consists of switching elements Q3, Q4, as semiconductor elements, connected in series via a connection point.

Hereinafter, the switching elements Q1, Q2, Q3, Q4 will be simply referred to as Q1, Q2, Q3, Q4, respectively.

The DC capacitor Cf is connected between the connection point of the Q1 and the Q2 in the upper leg 4a and the connection point of the Q3 and the Q4 in the lower leg 4b.

The smoothing capacitor Cdc is connected in parallel to the load 5 on the load 5 side of the leg circuit 4.

The DC capacitor Cf and the smoothing capacitor Cdc can be each composed of an aluminum electrolytic capacitor, a film capacitor, or the like.

The Q1, Q2, Q3, Q4 used in the leg circuit 4 are, for example, IGBTs (insulated gate bipolar transistors) to which diodes are connected in reverse parallel, MOSFETs (metal oxide semiconductor field effect transistors) to which diodes are connected between the sources and the drains, or cascode GaN-HEMTs (gallium nitride-high mobility transistors). The diodes may be diodes incorporated in the switching elements or external diodes may be separately connected.

The rectification bridge circuit 3 may be configured by using switching elements instead of the diodes D1, D2, and the same type of switching elements as those used in the leg circuit 4 may be used.

An AC voltage vac of the AC power supply 2, a voltage Vcf of the DC capacitor Cf, and a voltage Vdc of the smoothing capacitor Cdc are detected by a voltage sensor and inputted to the control circuit 7. Regarding the AC voltage Vac of the AC power supply 2, the AC voltage vac is, particularly, an instantaneous voltage.

The input current iac from the AC power supply 2 is detected by a current sensor and inputted to the control circuit 7. The control circuit 7 generates a gate signal GQ (GQ1, GQ2, GQ3, GQ4) for the Q1, Q2, Q3, Q4 in the leg circuit 4 based on information about the inputted voltage and current, and performs high-frequency switching of the Q1, Q2, Q3, Q4 by PWM control to control the power conversion circuit 1.

Figure 2:
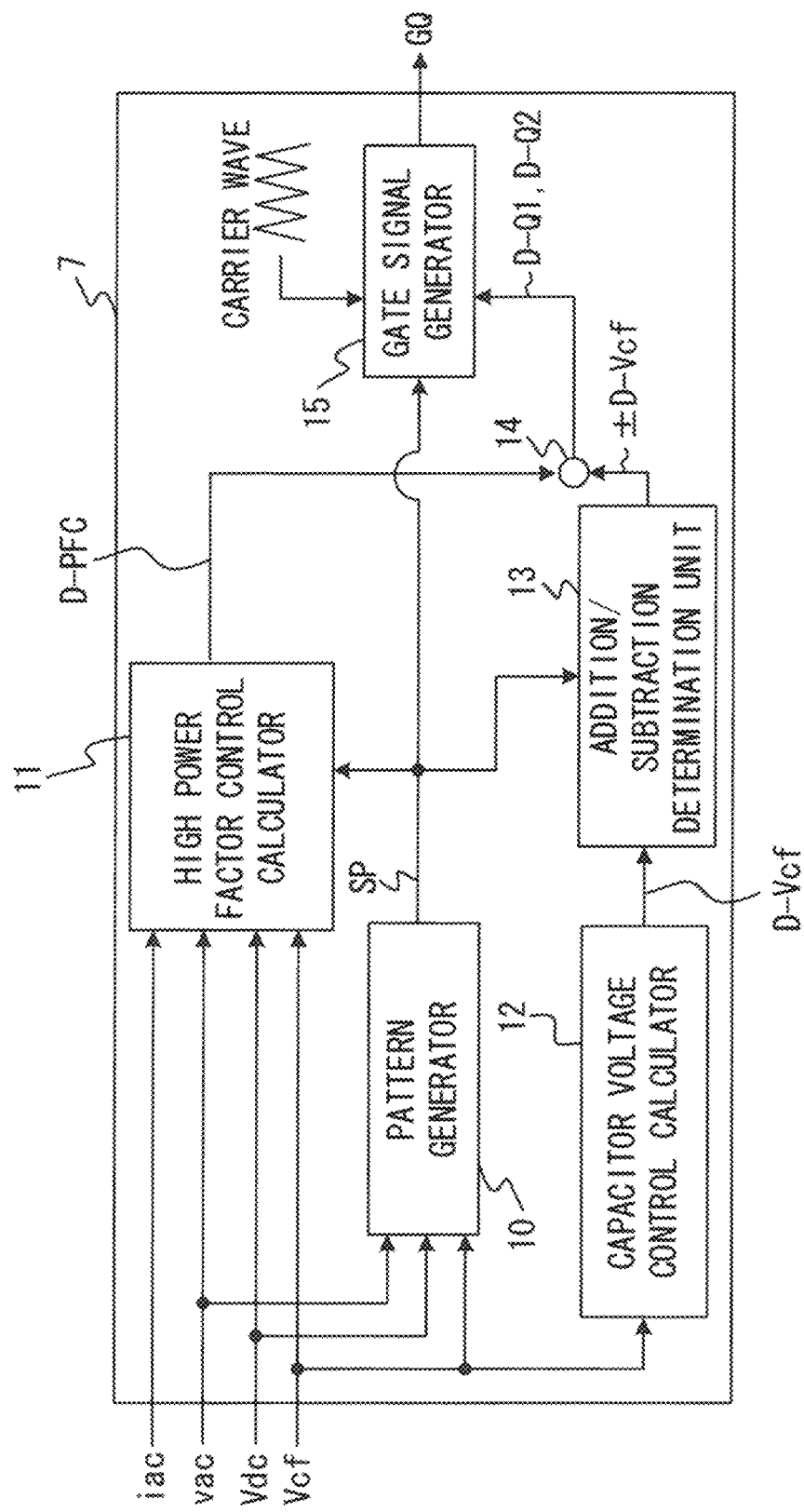
FIG. 2 is a control block diagram illustrating a control circuit of the power conversion device according to embodiment 1.

FIG. 2 is a control block diagram illustrating the control circuit 7.

As shown in FIG. 2, the control circuit 7 includes a pattern generator 10 for generating a switching pattern SP, a high power factor control calculator 11 (hereinafter, referred to as first controller 11) for controlling the input current iac, a capacitor voltage control calculator 12 (hereinafter, referred to as second controller 12) for controlling the voltage Vcf of the DC capacitor Cf, an addition/subtraction determination unit 13, an adder 14, and a gate signal generator 15.

The pattern generator 10 generates the switching pattern SP consisting of a combination of a plurality of switching states, of the leg circuit 4, which vary in one cycle of a control cycle. The first controller 11 uses the generated switching pattern SP to generate a first duty cycle D-PFC for performing control so as to improve a power factor of the input current iac, converting AC power to DC power, and outputting the DC power. The second controller 12 generates a second duty cycle D-Vcf so as to cause the voltage Vcf of the DC capacitor Cf to follow a command value Vcf*.

The addition/subtraction determination unit 13 and the adder 14 operate so as to add or subtract the second duty cycle D-Vcf to or from the first duty cycle D-PFC to calculate a duty cycle D of the leg circuit 4. In this case, as the duty cycle D, duty cycles D-Q1, D-Q2 for the Q1, Q2 in the upper leg 4a are calculated. The addition/subtraction determination unit 13 determines whether the second duty cycle D-Vcf is to be added or subtracted, according to the switching pattern SP. In the case of subtraction, the second duty cycle D-Vcf is inputted to the adder 14 with the polarity reversed. The duty cycles D-Q1, D-Q2 are generated such that the sum of the duty cycles D-Q1, D-Q2 for the Q1, Q2 becomes constant in one cycle.

The gate signal generator 15 obtains the duty cycles D-Q3, D-Q4 for the Q3, Q4 in the lower leg 4b based on the duty cycles D-Q1, D-Q2. The PWM control by comparing each of the duty cycles D-Q1, D-Q2, D-Q3, D-Q4 with a carrier wave, based on the switching pattern SP is performed, and the gate signal GQ (GQ1, GQ2, GQ3, GQ4) for each of the Q1, Q2, Q3, Q4 in the leg circuit 4 is generated based on the switching pattern SP. As the carrier wave, a triangular wave, a saw-tooth wave, or the like is used.

The duty cycles D-Q3, D-Q4 for the Q3, Q4 are obtained according to D-Q3=1−(D-Q2), D-Q4=1−(D-Q1). The gate signals GQ2 and GQ3 are signals that are on-off inverted relative to each other. The gate signals GQ1 and GQ4 are signals that are on-off inverted relative to each other.

Next, the control by the control circuit 7 and the operation of the power conversion circuit 1 will be described in detail.

The power conversion circuit 1 performs high-frequency switching of the Q1, Q2, Q3, Q4 in the leg circuit 4 to boost a voltage while the input current iac flowing in the reactor L is controlled to have a high power factor, causes the smoothing capacitor Vdc to smooth power, and supplies DC power to the load 5.

Figure 3:
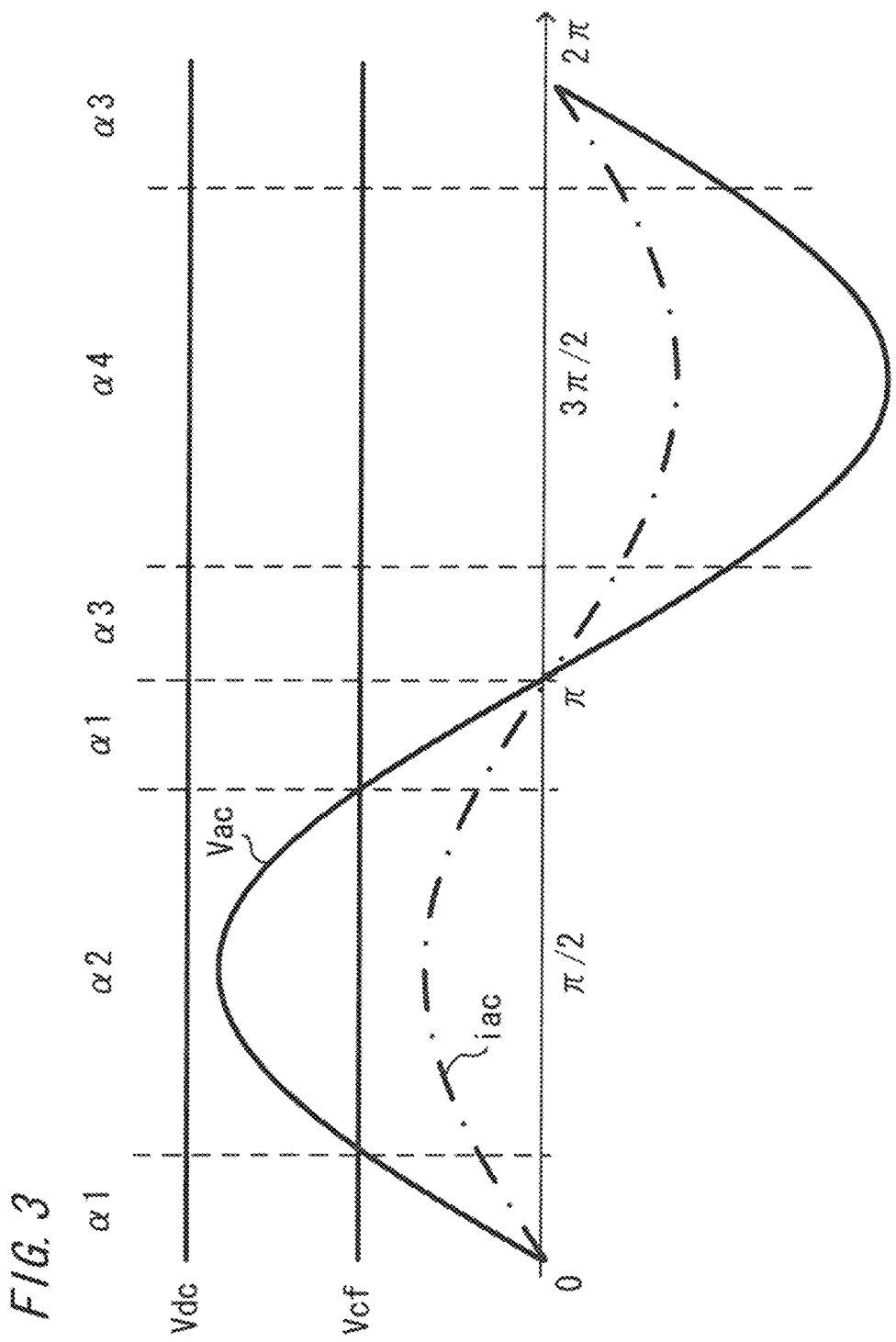
FIG. 3 illustrates voltage/current waveforms and operation ranges in the power conversion device according to embodiment 1.

FIG. 3 illustrates voltage/current waveforms and operation ranges in the power conversion device 100. FIG. 3 illustrates waveforms of the voltage Vac of the AC power supply 2 such as a system power supply in one cycle, the voltage Vcf of the DC capacitor Cf, the voltage Vdc of the smoothing capacitor Cdc as an output voltage of the power conversion circuit 1, and the input current iac.

The control circuit 7 determines a plurality of operation ranges α1 to α4 based on a relationship in voltage magnitude among the inputted AC voltage vac, the voltage Vcf, and the voltage Vdc. In this case, two operation ranges are in half the cycle of the AC power supply 2, and four operation ranges are in one cycle.

In this case, Vcf=Vdc/2 and Vdc>vac are satisfied as a voltage condition. The voltage Vcf may not necessarily satisfy Vdc/2 as long as the voltage Vcf is lower than or equal to the voltage Vdc.

The pattern generator 10 generates the switching pattern SP according to the operation ranges α1 to α4.

As described above, the switching pattern SP consists of a combination of a plurality of switching states, of the leg circuit 4, which vary in one cycle of the control cycle. In this case, the switching cycle of the PWM control coincides with the control cycle.

One cycle of the gate signal GQ (GQ1, GQ2, GQ3, GQ4) corresponds to a combination of four switching states based on ON and OFF of the Q1, Q2, Q3, Q4 in the leg circuit 4 as described below. The combination of the four switching states is the switching pattern SP. At this time, switching states in which the reactor L is excited by application of a positive voltage and switching states in which the reactor L is reset by application of a negative voltage are combined so as to alternate in order to control the input current iac.

In the power conversion circuit 1, the operation for exciting the reactor L and the operation for resetting the reactor L are different for each of the operation ranges α1 to α4.

FIG. 4 to FIG. 7 illustrate kinds of the switching states in the operation ranges α1 to α4. In a case where the gate signal GQ (GQ1, GQ2, GQ3, GQ4) represents 1, the Q1, Q2, Q3, Q4 is on. In a case where the gate signal GQ (GQ1, GQ2, GQ3, GQ4) represents 0, the Q1, Q2, Q3, Q4 is off. A charging, discharging, or through state of the DC capacitor Cf and a voltage applied to the reactor L in each switching state are also illustrated.

As shown in FIG. 4, in the operation range α1 in which vac whose polarity is positive is less than or equal to Vcf, the reactor L is excited in a switching state A1, and the reactor L is reset in switching states D1, E1, F1. In this case, the reactor L is excited only in the switching state A1 in which the DC capacitor Cf is in a through state.

As shown in FIG. 5, in the operation range α2 in which vac whose polarity is positive is higher than Vcf, the reactor L is excited in switching states A2, B2, C2, and the reactor L is reset in a switching state D2. In this case, the reactor L is reset only in the switching state D2 in which the DC capacitor Cf is in a through state.

As shown in FIG. 6, in the operation range α3 in which vac whose polarity is negative has an absolute value that is less than or equal to Vcf, the reactor L is excited in switching states A3, B3, C3, and the reactor L is reset in a switching state D3. In this case, the reactor L is reset only in the switching state D3 in which the DC capacitor Cf is in a through state.

As shown in FIG. 7, in the operation range α4 in which vac whose polarity is negative has an absolute value that is greater than Vcf, the reactor L is excited in a switching state A4, and the reactor L is reset in switching states D4, E4, F4. In this case, the reactor L is excited only in the switching state A4 in which the DC capacitor Cf is in a through state.

As described above, the pattern generator 10 generates the switching pattern SP according to the operation ranges α1 to α4.

The pattern generator 10 selects four switching states allowing overlapping from the switching states usable in the operation ranges α1 to α4 and combines them, so as to repeatedly alternate excitation and resetting of the reactor L and charge the DC capacitor Cf once and discharge the DC capacitor Cf once in one cycle, thereby generating the switching pattern SP. One cycle has four sections based on the switching states, and one cycle includes one section in which the DC capacitor Cf is charged and one section in which the DC capacitor Cf is discharged such that the numbers of both the sections are the same.

The control in the operation range α1 will be described below with reference to FIG. 8 and FIG. 9.

Figure 8:
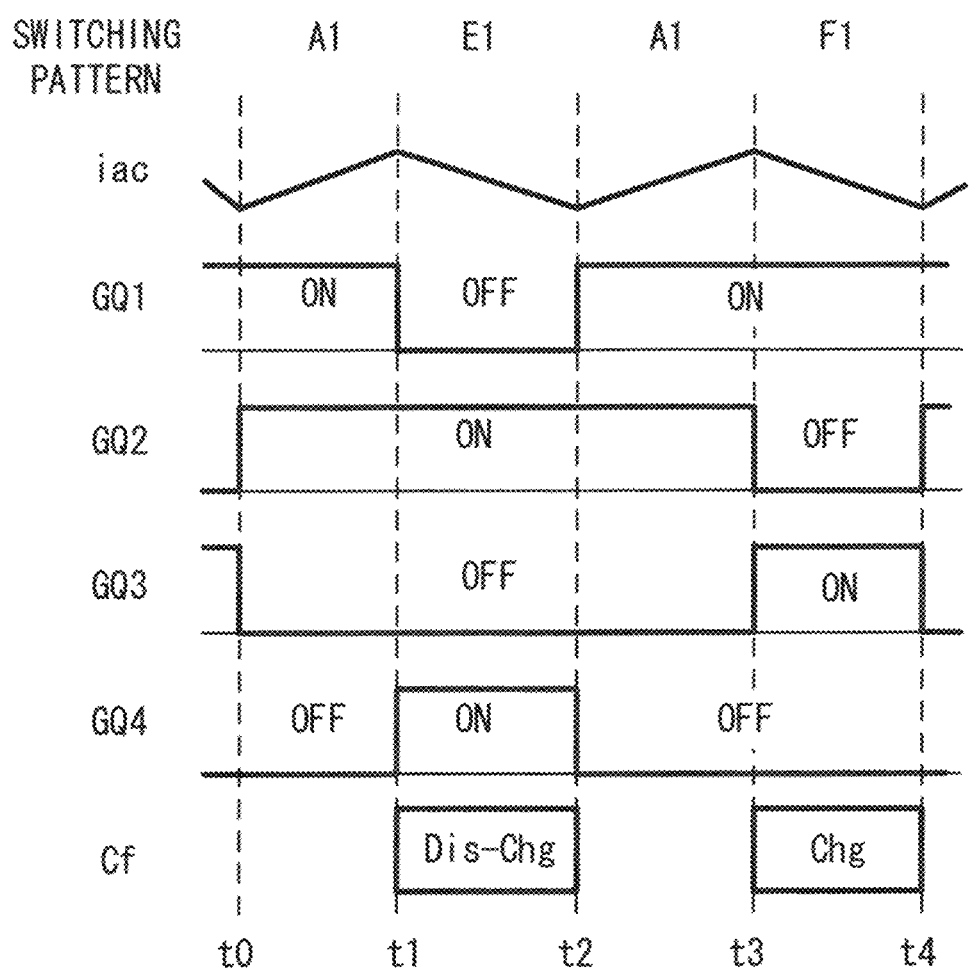
FIG. 8 is a waveform diagram illustrating switching patterns and control in one operation range according to embodiment 1.

FIG. 8 illustrates the switching pattern SP (A1-E1-A1-F1), the input current iac, the gate signal GQ (GQ1, GQ2, GQ3, GQ4), and the charged and discharged states of the DC capacitor Cf, in the operation range α1.

Figure 9:
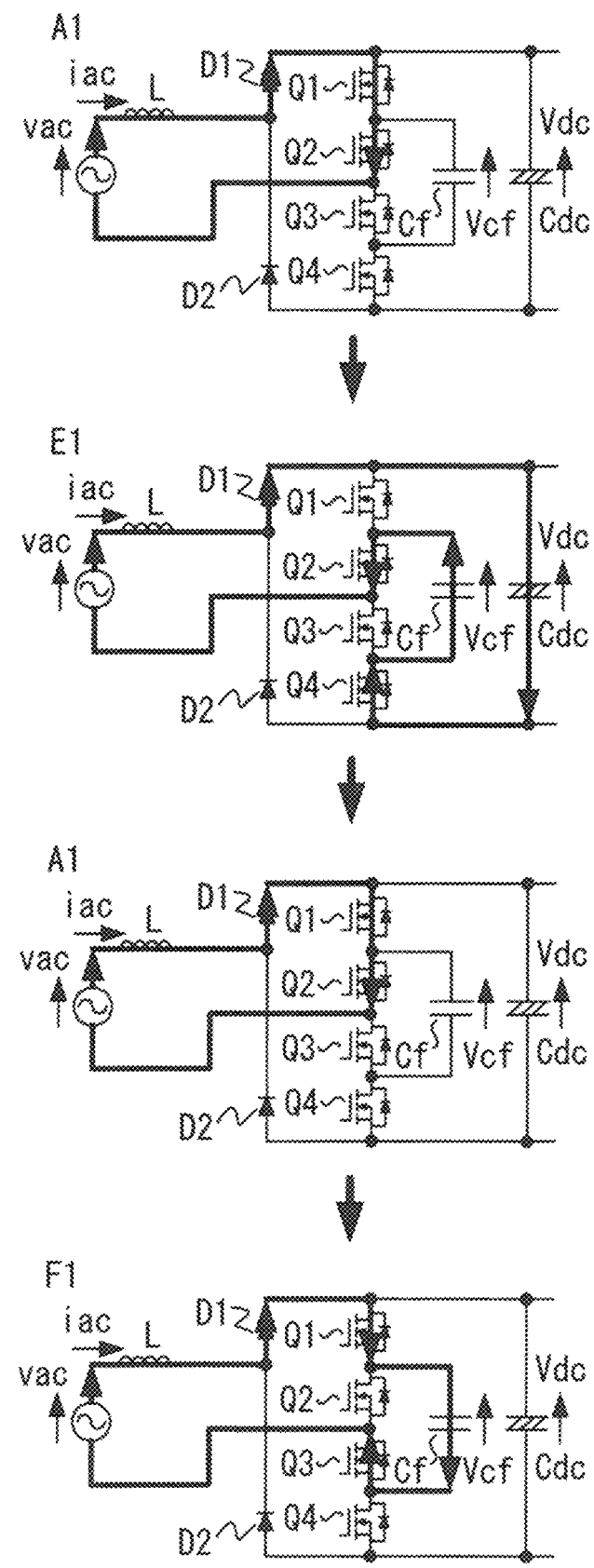
FIG. 9 is a current path diagram illustrating the control in FIG. 8.

FIG. 9 illustrates a current path in the power conversion circuit 1 in the switching pattern SP (A1-E1-A1-F1).

As shown in FIG. 8 and FIG. 9, in one cycle of the control cycle (switching cycle), the state varies as indicated by A1 (excited)-E1 (reset and discharged)-A1 (excited)-F1 (reset and charged). That is, the excitation and resetting of the reactor L repeatedly alternate, and the charging and discharging of the DC capacitor Cf are each performed once.

The control in the operation range α2 will be described below with reference to FIG. 10 and FIG. 11.

Figure 10:
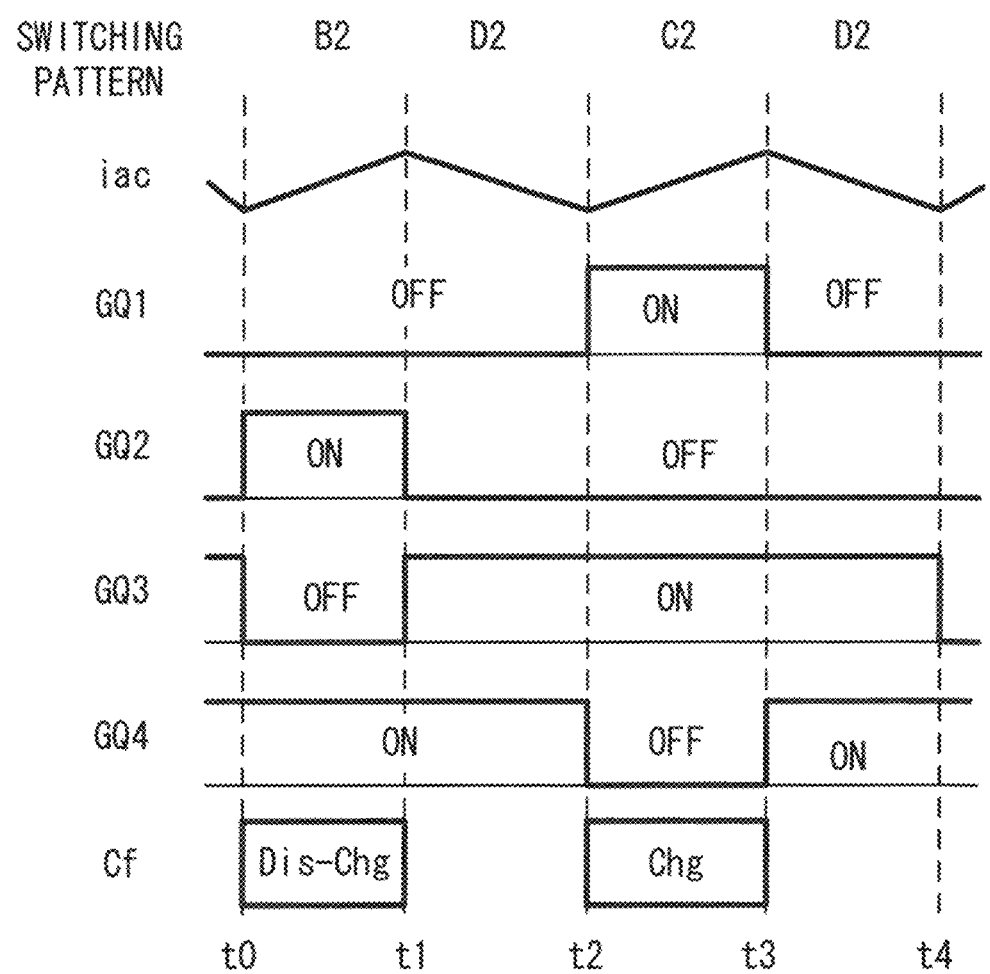
FIG. 10 is a waveform diagram illustrating switching patterns and control in one operation range according to embodiment 1.

FIG. 10 illustrates the switching pattern SP (B2-D2-C2-D2), the input current iac, the gate signal GQ (GQ1, GQ2, GQ3, GQ4), and the charged and discharged states of the DC capacitor Cf, in the operation range α2.

Figure 11:
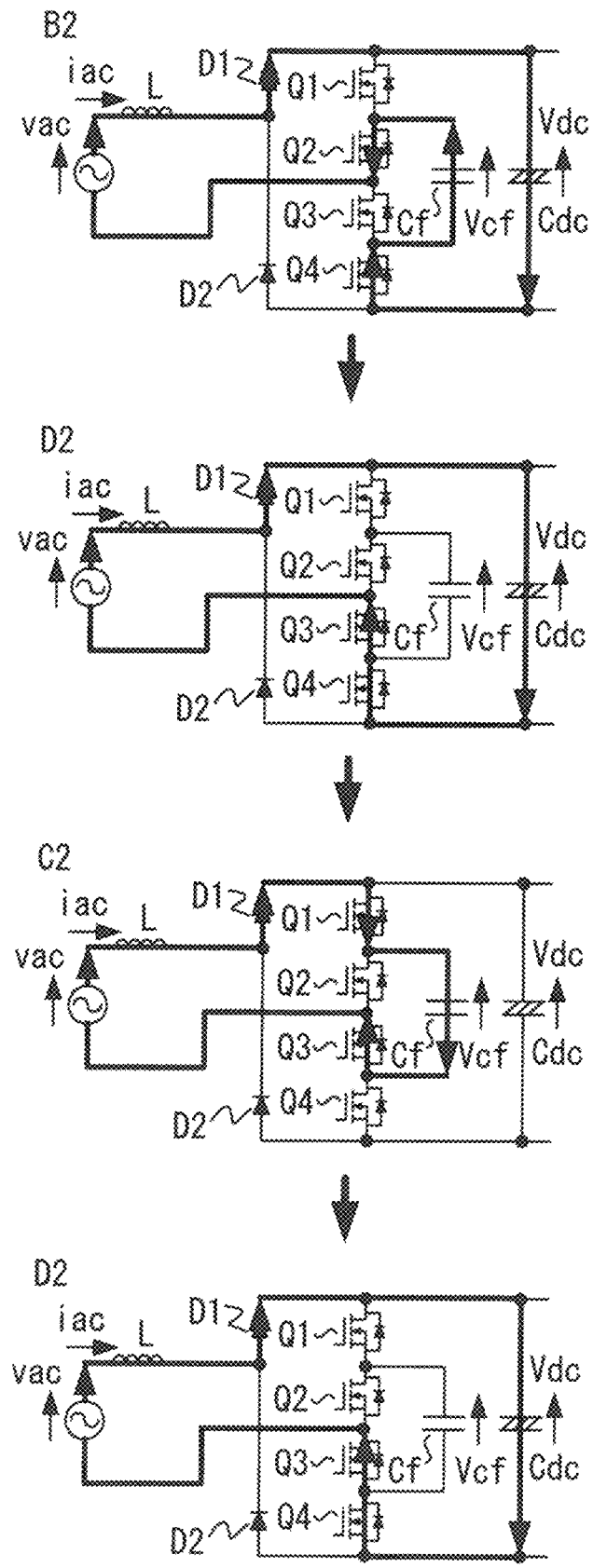
FIG. 11 is a current path diagram illustrating the control in FIG. 10.

FIG. 11 illustrates a current path in the power conversion circuit 1 in the switching pattern SP (B2-D2-C2-D2).

As shown in FIG. 10 and FIG. 11, in one cycle of the control cycle (switching cycle), the state varies as indicated by B2 (excited and discharged)-D2 (reset)-C2 (excited and charged)-D2 (reset). That is, the excitation and resetting of the reactor L repeatedly alternate, and the charging and discharging of the DC capacitor Cf are each performed once.

The control in the operation range α3 will be described below with reference to FIG. 12 and FIG. 13.

Figure 12:
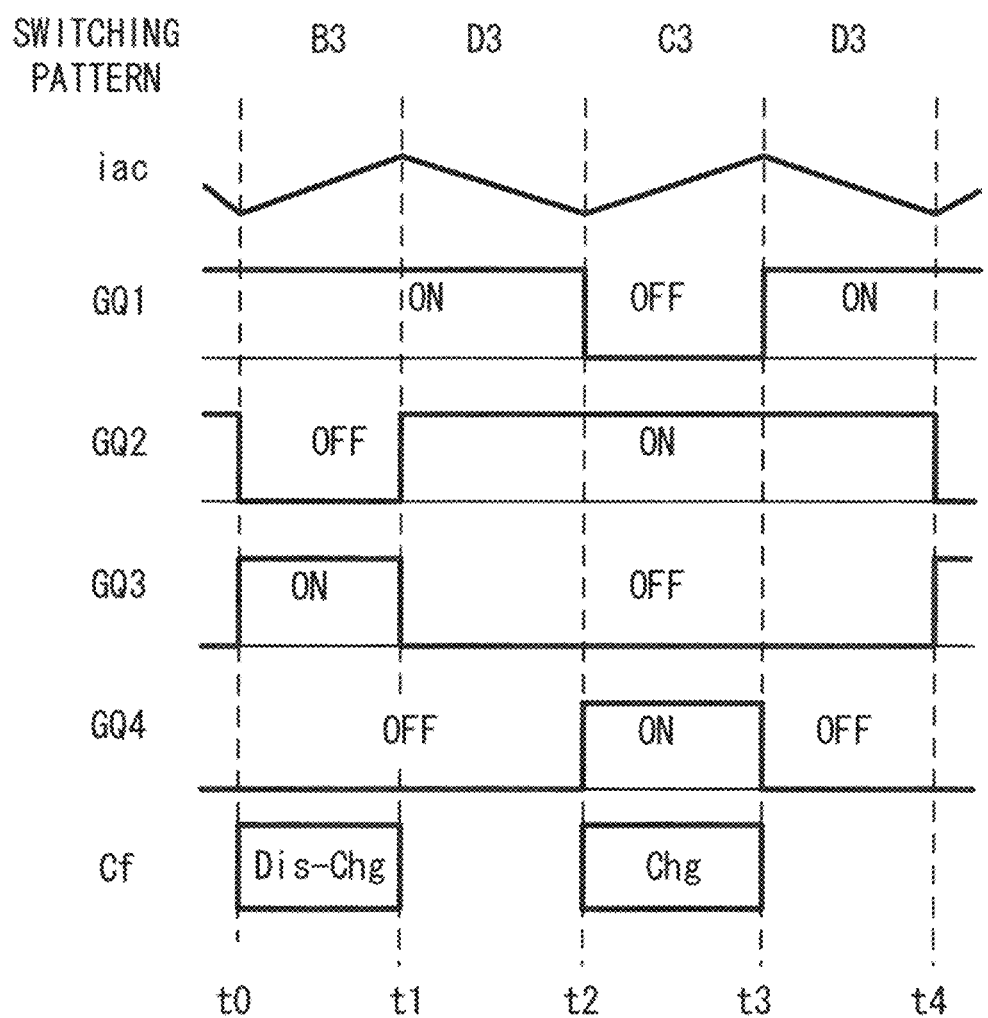
FIG. 12 is a waveform diagram illustrating switching patterns and control in one operation range according to embodiment 1.

FIG. 12 illustrates the switching pattern SP (B3-D3-C3-D3), the input current iac, the gate signal GQ (GQ1, GQ2, GQ3, GQ4), and the charged and discharged states of the DC capacitor Cf, in the operation range α3.

Figure 13:
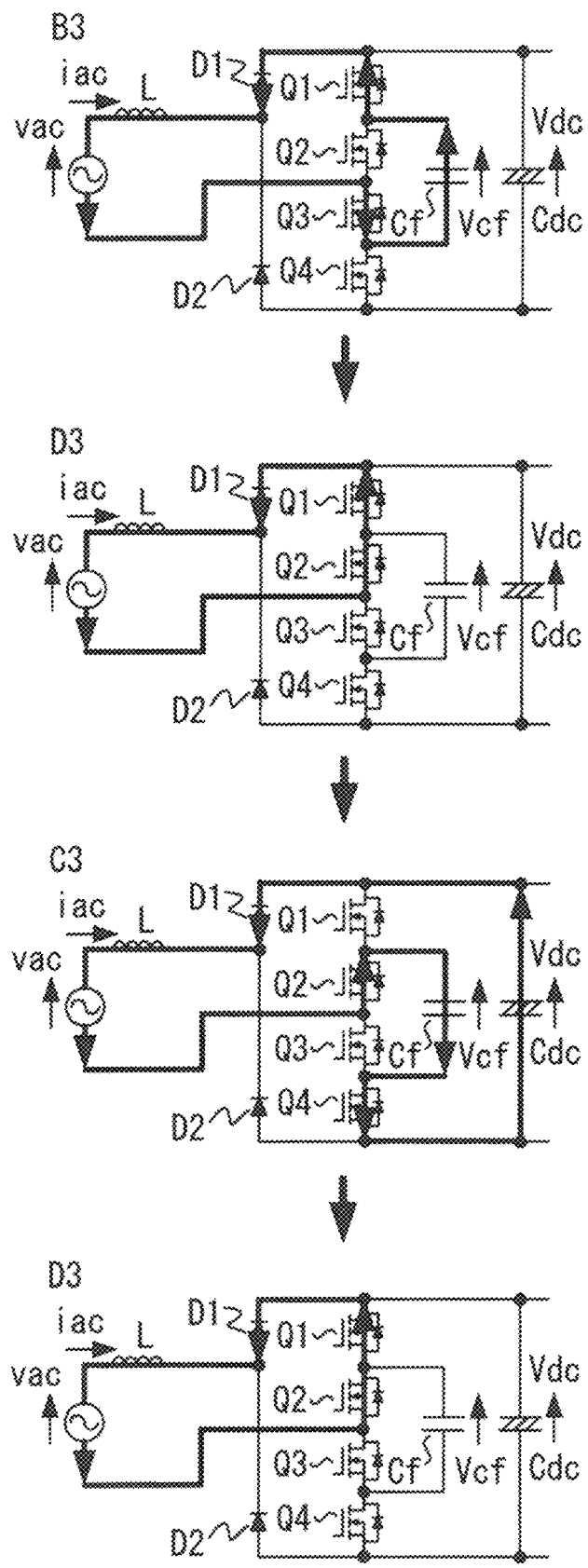
FIG. 13 is a current path diagram illustrating the control in FIG. 12.

FIG. 13 illustrates a current path in the power conversion circuit 1 in the switching pattern SP (B3-D3-C3-D3).

As shown in FIG. 12 and FIG. 13, in one cycle of the control cycle (switching cycle), the state varies as indicated by B3 (excited and discharged)-D3 (reset)-C3 (excited and charged)-D3 (reset). That is, the excitation and resetting of the reactor L repeatedly alternate, and the charging and discharging of the DC capacitor Cf are each performed once.

The control in the operation range α4 will be described below with reference to FIG. 14 and FIG. 15.

Figure 14:
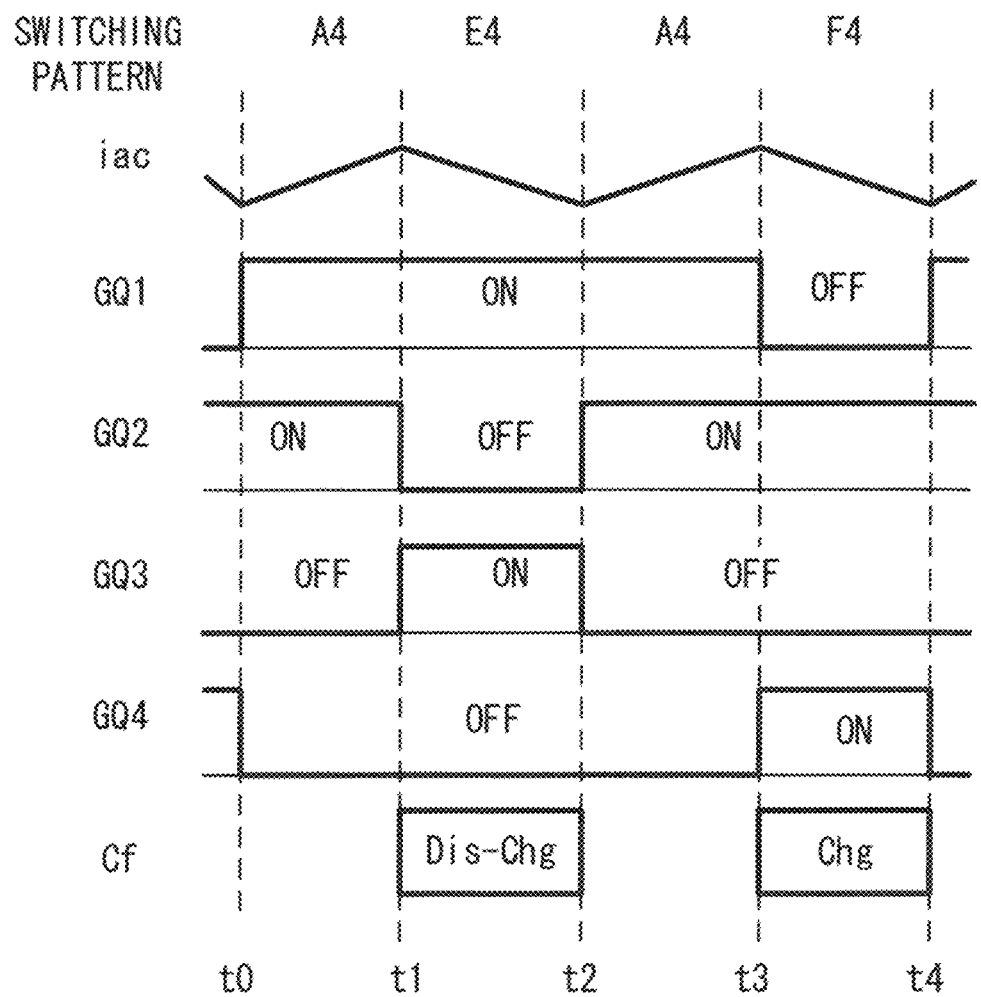
FIG. 14 is a waveform diagram illustrating switching patterns and control in one operation range according to embodiment 1.

FIG. 14 illustrates the switching pattern SP (A4-E4-A4-F4), the input current iac, the gate signal GQ (GQ1, GQ2, GQ3, GQ4), and the charged and discharged states of the DC capacitor Cf, in the operation range α4.

Figure 15:
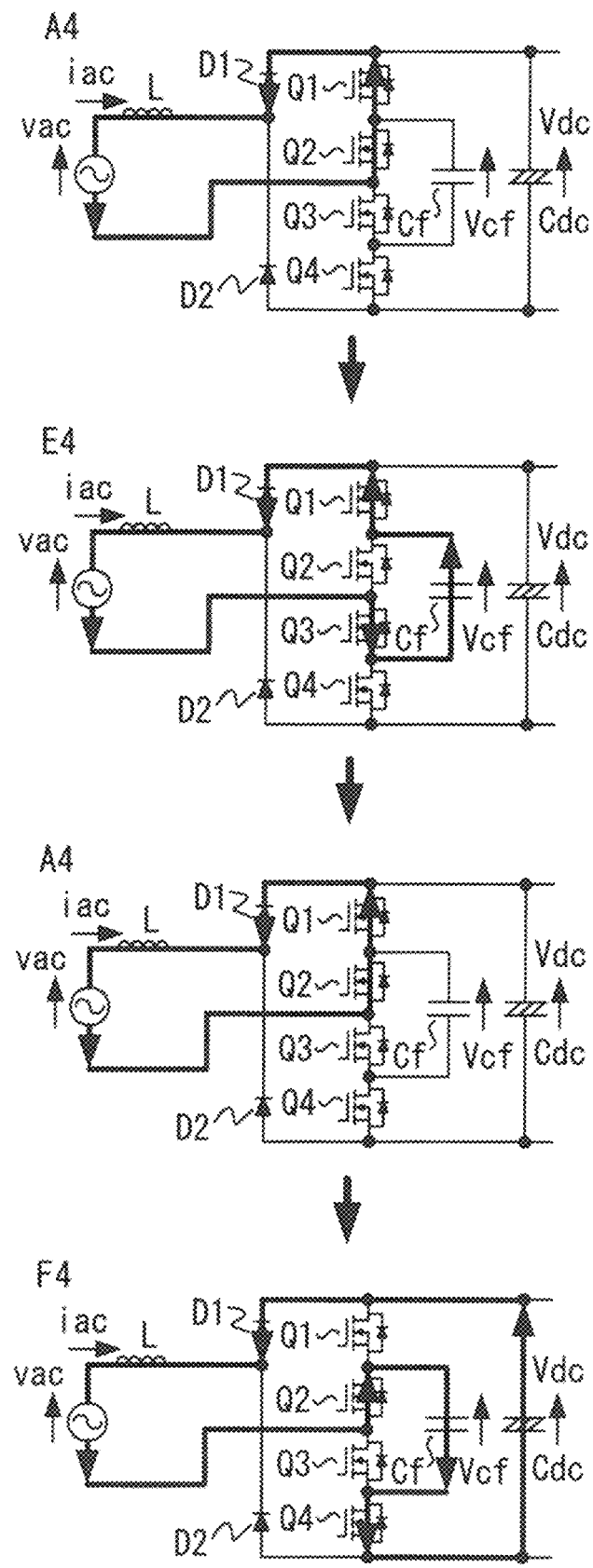
FIG. 15 is a current path diagram illustrating the control in FIG. 14.

FIG. 15 illustrates a current path in the power conversion circuit 1 in the switching pattern SP (A4-E4-A4-F4).

As shown in FIG. 14 and FIG. 15, in one cycle of the control cycle (switching cycle), the state varies as indicated by A4 (excited)-E4 (reset and discharged)-A4 (excited)-F4 (reset and charged). That is, the excitation and resetting of the reactor L repeatedly alternate, and the charging and discharging of the DC capacitor Cf are each performed once.

As described above, the switching pattern SP is generated such that excitation and resetting of the reactor L repeatedly alternate and charging and discharging of the DC capacitor Cf are each performed once in one cycle, according to the operation ranges α1 to α4. The control for improving a power factor of the input current iac and the voltage control for the DC capacitor Cf are performed by using such a switching pattern SP, whereby a high-accuracy control responsiveness can be obtained.

The control circuit 7 stores, as a table, information indicating the switching states for each of the operation ranges α1 to α4 as shown in, for example, FIG. 4 to FIG. 7, and selects a plurality of switching states with reference to the table, to generate the switching pattern SP. The switching pattern SP may be determined based on an external command.

The gate signal GQ (GQ1, GQ2, GQ3, GQ4) based on the switching pattern SP is generated.

As shown in FIG. 8, FIG. 10, FIG. 12, and FIG. 14, the gate signal GQ1 and the gate signal GQ2 are shifted from each other by half the cycle. The switching control of the leg circuit 4 is performed based on the gate signal GQ1 and the gate signal GQ2 shifted from each other by half the cycle, whereby excitation and resetting of the reactor are each performed twice in one cycle so as to alternate. Thus, the power factor of the input current iac can be controlled. The switching pattern SP is generated such that the number of times the DC capacitor Cf is charged and the number of times the DC capacitor Cf is discharged are equal to each other, whereby a circuit configuration that can suppress the voltage fluctuation of the DC capacitor Cf and does not use an external power supply can be obtained.

In FIG. 8, FIG. 10, FIG. 12, and FIG. 14, a timing t2 at the center in one cycle (t0-t4) is fixed, and the timings t1, t3 are variable. That is, the gate signal GQ1 and the gate signal GQ2 which are shifted from each other by half the cycle each become Hi (ON) at the cycle shifted by half the cycle, while the timing at which the gate signal GQ1 and the gate signal GQ2 each become Low (OFF) varies according to the duty cycles D-Q1, D-Q2.

The control of the input current iac, the voltage control for the smoothing capacitor Cdc, and the voltage control for the DC capacitor Cf are all performed by the PWM control of the leg circuit 4, that is, performed by using the duty cycle D as the command. The control circuit 7 adjusts the timings t1, t3 according to the duty cycle D (D-Q1, D-Q2) in each of the operation ranges α1 to α4, and controls an output voltage (Vdc) and the voltage Vcf of the DC capacitor Cf while performing high power factor control of the input current iac.

Figure 16:
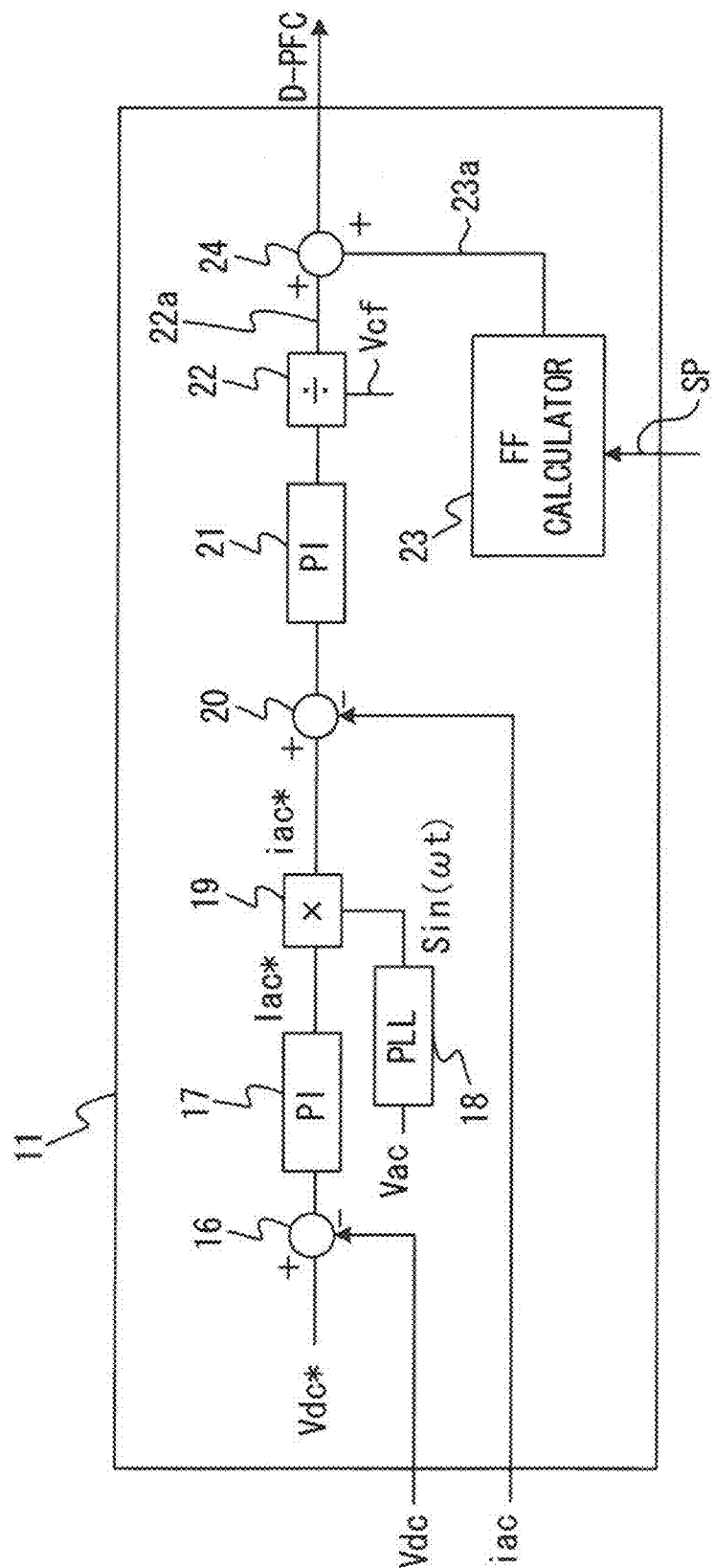
FIG. 16 illustrates a control block of a high power factor control calculator according to embodiment 1.

FIG. 16 illustrates a control block of the first controller 11. The first controller 11 generates the first duty cycle D-PFC so as to control the input current iac such that the power factor of 1 with respect to the voltage vac of the AC power supply 2, and further perform voltage control for the smoothing capacitor Cdc.

As shown in FIG. 16, a subtractor 16 calculates a deviation between a DC voltage command value Vdc* and the detected voltage Vdc of the smoothing capacitor Cdc. A PI (proportional integral) controller 17 performs PI control to calculate an amplitude Iac* such that the deviation approaches 0. A PLL (phase locked loop) controller 18 generates a sine wave signal sin(ωt) that is in phase with the voltage vac of the AC power supply 2. A multiplier 19 multiples the amplitude Iac* by the sine wave signal sin(ωt) to calculate a current command iac*.

In a case where the voltage control for the smoothing capacitor Cdc is not performed and only the high power factor control of the current iac is performed, the current command Iac* may be set based on an external command.

Subsequently, a subtractor 20 calculates a deviation between the current command iac* and the detected input current iac. A PI controller 21 performs PI control such that the deviation approaches 0, and, thereafter, a divider 22 performs division by the voltage Vcf of the DC capacitor Cf to calculate a duty cycle 22a.

An FF calculator 23 calculates a feedforward term 23a based on the switching pattern SP generated by the pattern generator 10. An adder 24 adds the feedforward term 23a and the duty cycle 22a to each other to generate the first duty cycle D-PFC.

The FF calculator 23 calculates the feedforward term 23a so as to improve responsiveness in the high power factor control of the input current iac when control is switched according to the operation ranges α1 to α4. Thus, the feedforward term 23a is added to generate the first duty cycle D-PFC, whereby rapid change during switching of control according to the operation ranges α1 to α4 can be inhibited.

The feedforward term 23a is obtained by calculation of a theoretical duty cycle that allows electric current increase and reduction caused by excitation and resetting of the reactor L to be equal to each other, and two theoretical expressions are derived in one cycle. For example, in the operation range α1, calculation is performed according to the following expression (1) and expression (2).

$$(Vdc-vac-Vcf)/(Vdc-Vcf) \tag{1}$$

$$(Vcf-vac)/Vcf \tag{2}$$

Expression (1) represents a calculation for balancing electric current increase and reduction according to the two switching states A1, E1 in the switching pattern SP (A1-E1-A1-F1) in the operation range α1. Expression (2) represents a calculation for balancing electric current increase and reduction according to the two switching states A1, F1.

For example, in the operation range α2, calculation is performed according to the following expression (3) and expression (4).

$$(Vdc-vac)/(Vdc-Vcf) \tag{3}$$

$$(Vdc-vac)/Vcf \tag{4}$$

Expression (3) represents a calculation for balancing electric current increase and reduction according to the two switching states B2, D2 in the switching pattern SP (B2-D2-C2-D2) in the operation range α2. Expression (4) represents a calculation for balancing electric current increase and reduction according to the two switching states C2, D2.

Figure 17:
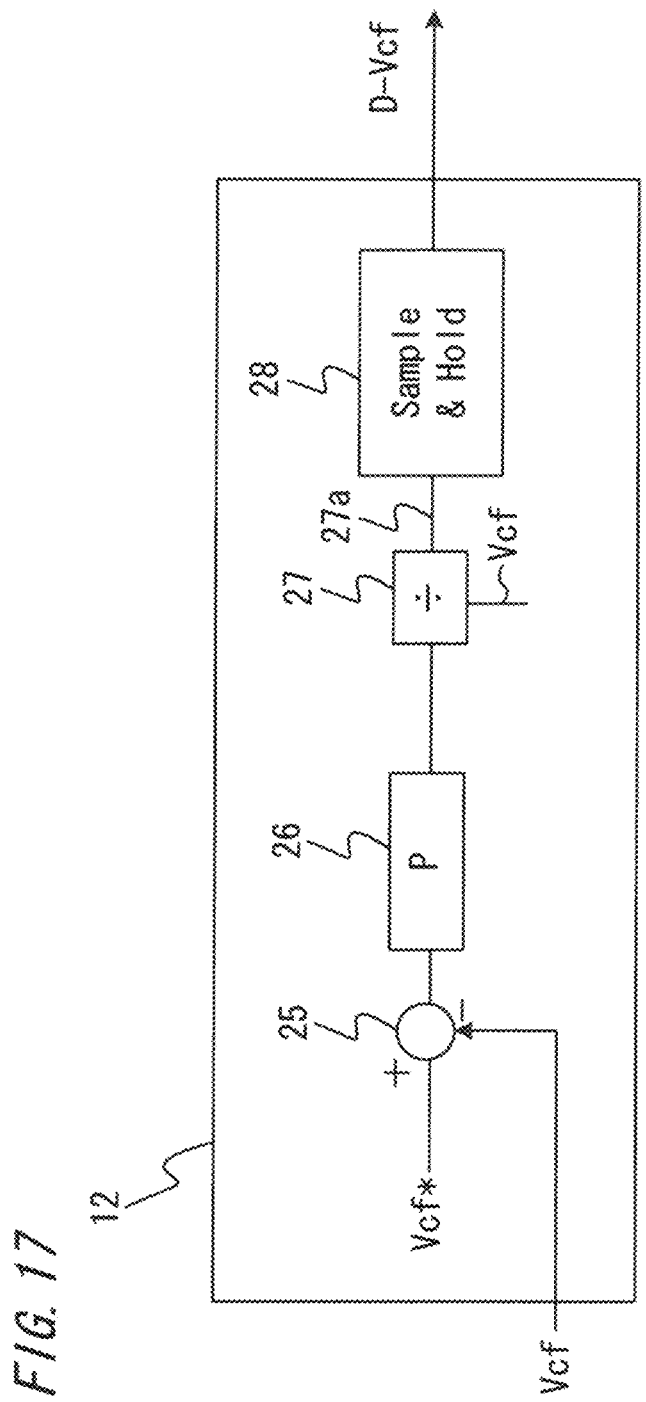
FIG. 17 illustrates a control block of a capacitor voltage control calculator according to embodiment 1.

FIG. 17 illustrates a control block of the second controller 12. The second controller 12 generates the second duty cycle D-Vcf so as to cause the voltage Vcf of the DC capacitor Cf to follow a command value Vcf*.

As shown in FIG. 17, a subtractor 25 calculates a deviation between the command value Vcf* and the detected voltage Vcf of the DC capacitor Cf. A P (proportional) controller 26 performs P control such that the deviation approaches 0, and, thereafter, a divider 27 performs division by the voltage Vcf of the DC capacitor Cf to calculate a duty cycle 27a. A sample and hold unit 28 updates a value of the duty cycle 27a for each cycle, and outputs the value as the second duty cycle D-Vcf.

Next, control of the addition/subtraction determination unit 13 will be described in detail.

As described above, the second duty cycle D-Vcf is added to or subtracted from the first duty cycle D-PFC to calculate the duty cycle D (D-Q1, D-Q2) of the leg circuit 4. The addition/subtraction determination unit 13 determines whether the second duty cycle D-Vcf is to be added or subtracted, according to the switching pattern SP. At this time, addition or subtraction is determined such that the sum of the duty cycles D-Q1, D-Q2 is constant in one cycle. That is, the sum of the duty cycles D-Q1, D-Q2 is constant regardless of voltage fluctuation of the DC capacitor Cf, and is equal to the sum of the first duty cycles D-PFC (corresponding components of the Q1, Q2).

An example of an operation of the addition/subtraction determination unit 13 in the operation range α1 will be described below.

Figure 18:
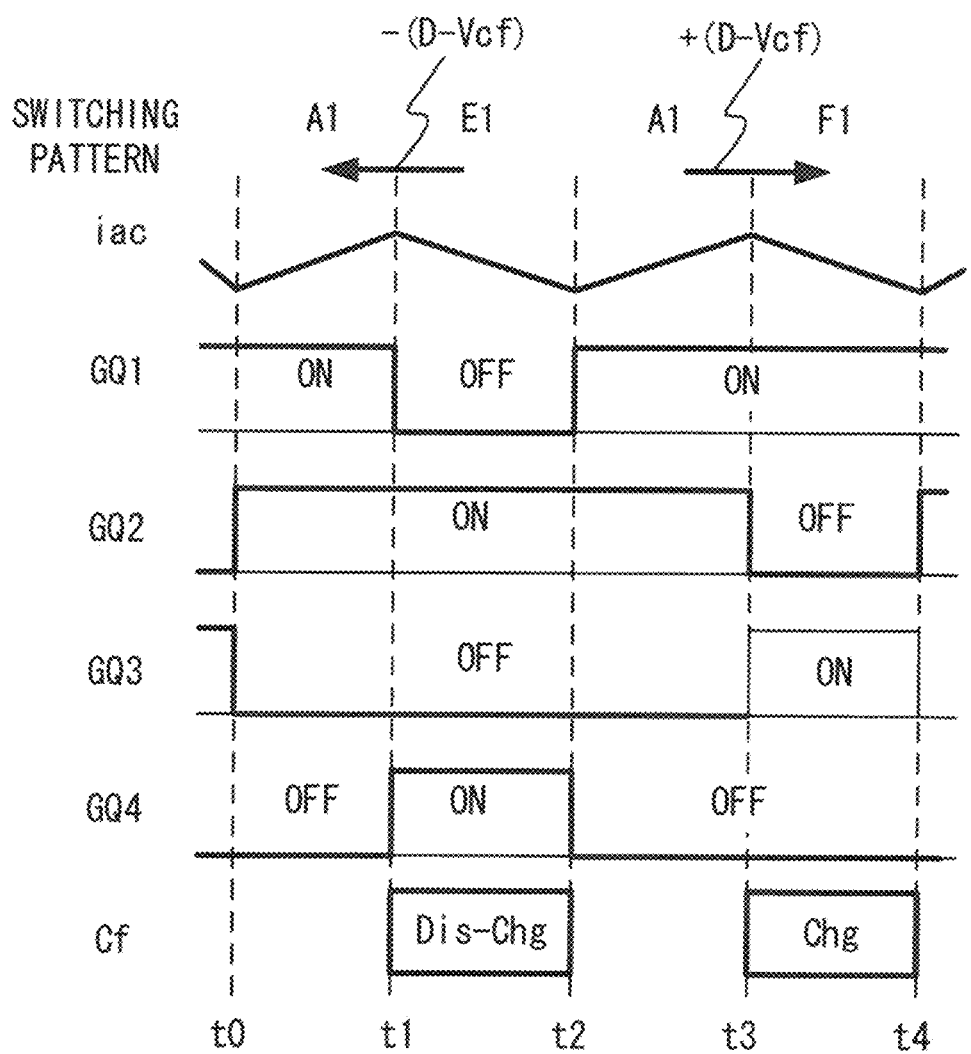
FIG. 18 is a waveform diagram illustrating control in voltage adjustment of a DC capacitor according to embodiment 1.
Figure 19:
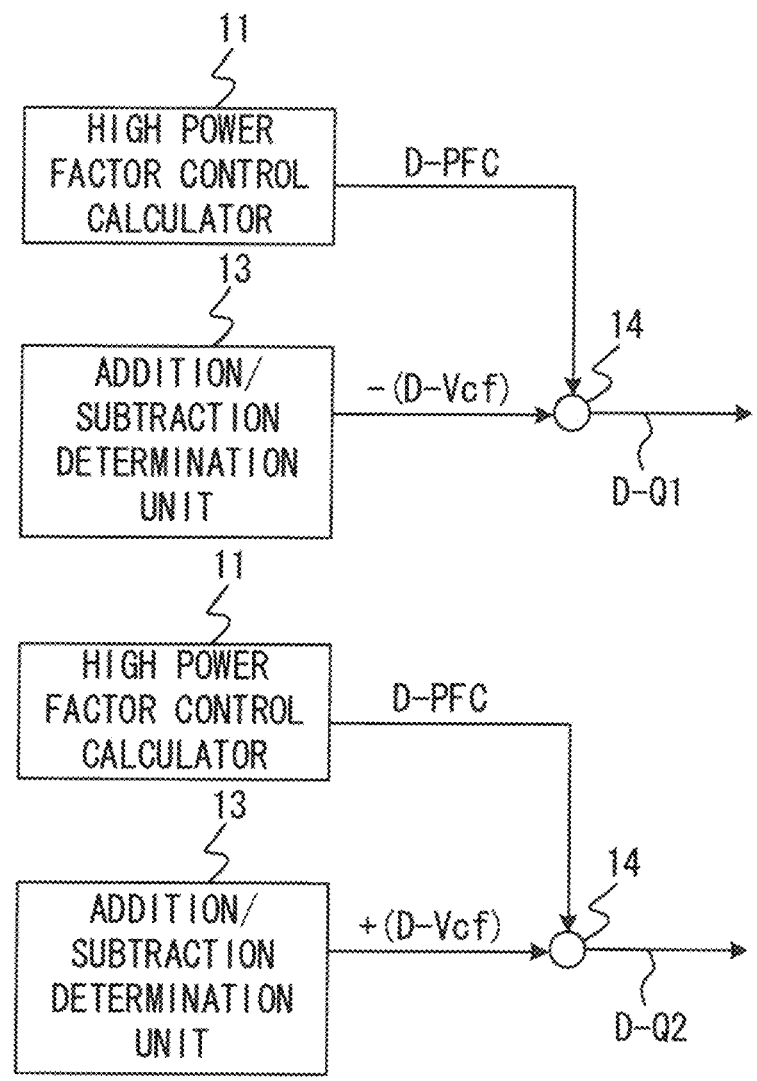
FIG. 19 is a control block diagram illustrating the control in FIG. 18.

FIG. 18 shows waveforms for illustrating control in which the voltage Vcf of the DC capacitor Cf is reduced due to the voltage Vcf being higher than the command value Vcf* in the operation range α1. FIG. 19 is a control block diagram illustrating the control in FIG. 18.

As shown in FIG. 18, the timing t1 at which the Q1 is switched off is shifted leftward in FIG. 18 to increase the discharging section, and the timing t3 at which the Q2 is switched off is shifted rightward in FIG. 18 to shorten the charging section. As shown in FIG. 19, in a case where the duty cycle D-Q1 is generated, the addition/subtraction determination unit 13 determines that the second duty cycle D-Vcf is to be subtracted from the first duty cycle D-PFC, to reduce the duty cycle D-Q1. In a case where the duty cycle D-Q2 is generated, the addition/subtraction determination unit 13 determines that the second duty cycle D-Vcf is to be added to the first duty cycle D-PFC, to increase the duty cycle D-Q2.

Figure 20:
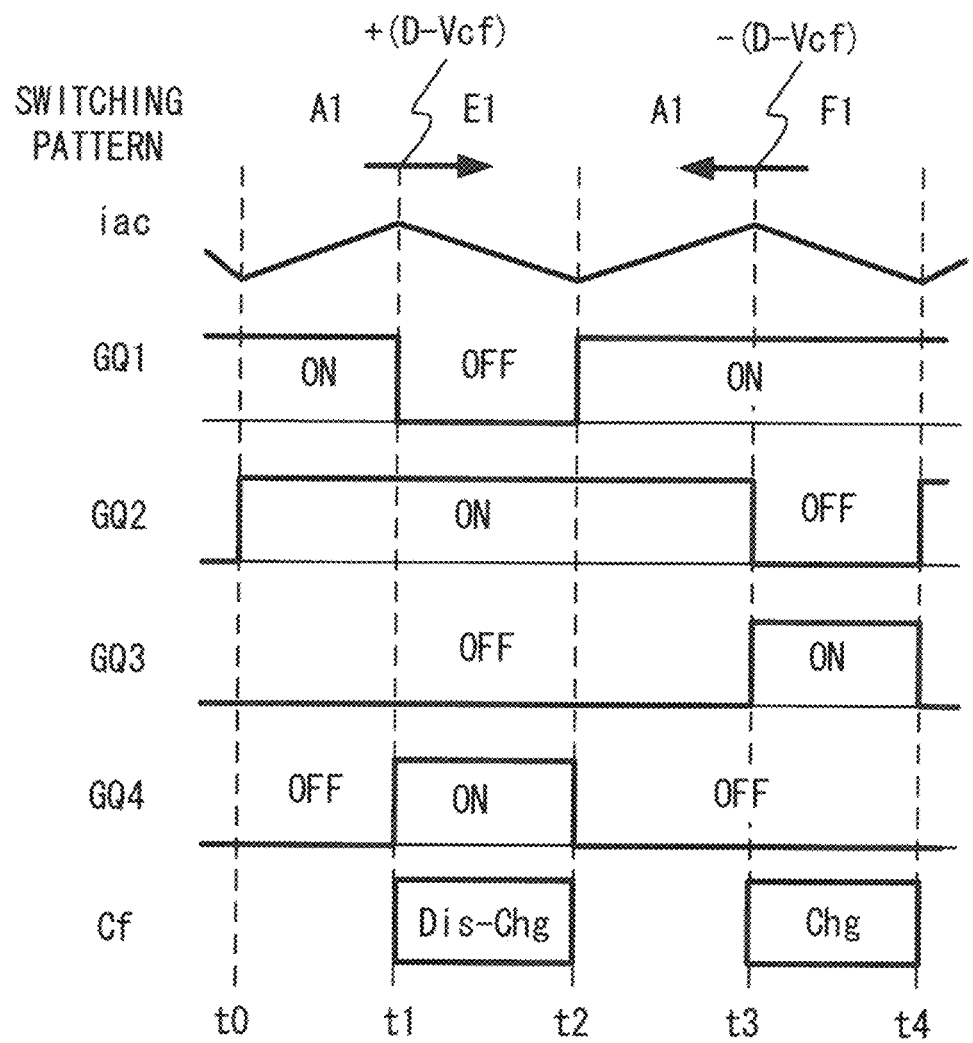
FIG. 20 is a waveform diagram illustrating control in voltage adjustment of the DC capacitor according to embodiment 1.
Figure 21:
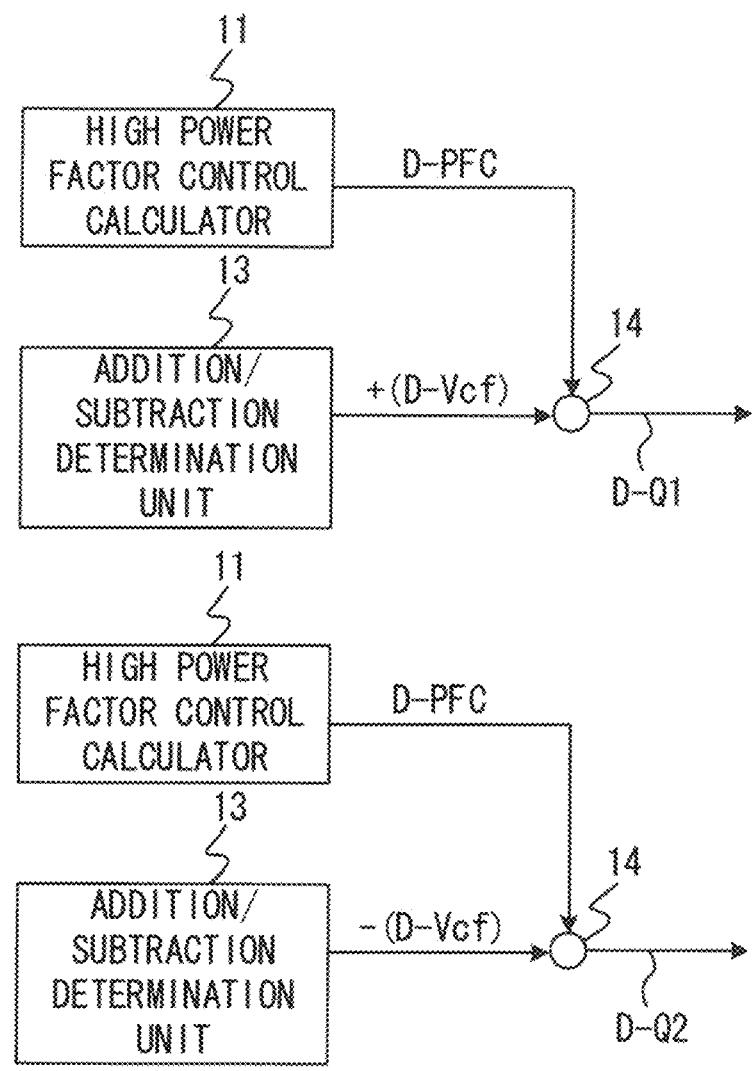
FIG. 21 is a control block diagram illustrating the control in FIG. 20.

FIG. 20 shows waveforms for illustrating control in which the voltage Vcf of the DC capacitor Cf is increased due to the voltage Vcf being lower than the command value Vcf* in the operation range α1. FIG. 21 is a control block diagram illustrating the control in FIG. 20.

As shown in FIG. 20, the timing t1 at which the Q1 is switched off is shifted rightward in FIG. 20 to shorten the discharging section, and the timing t3 at which the Q2 is switched off is shifted leftward in FIG. 20 to increase the charging section. As shown in FIG. 21, in a case where the duty cycle D-Q1 is generated, the addition/subtraction determination unit 13 determines that the second duty cycle D-Vcf is to be added to the first duty cycle D-PFC, to increase the duty cycle D-Q1. In a case where the duty cycle D-Q2 is generated, the addition/subtraction determination unit 13 determines that the second duty cycle D-Vcf is to be subtracted from the first duty cycle D-PFC, to reduce the duty cycle D-Q2.

In both a case where the voltage Vcf is reduced as shown in FIG. 18 and FIG. 19 and a case where the voltage Vcf is increased as shown in FIG. 20 and FIG. 21, the second duty cycle D-Vcf is added for one of the two duty cycles D-Q1, D-Q2, and the second duty cycle D-Vcf is subtracted for the other thereof, so that the sum is not changed and is constant. The sample and hold unit 28 in the second controller 12 holds a value of the second duty cycle D-Vcf in one cycle and outputs the value. Therefore, in the calculation, the sum of the two duty cycles D-Q1, D-Q2 can be assuredly made constant.

In a case where the sum of the duty cycles D-Q1, D-Q2 of the Q1, Q2 in the upper leg 4a is constant, the sum of the duty cycles D-Q3, D-Q4 of the Q3, Q4 in the lower leg 4b also becomes constant.

Thus, voltage control for the DC capacitor Cf can be performed for each control cycle (one switching cycle). Furthermore, the sum of the two duty cycles D-Q1, D-Q2 is constant and is equal to the sum of the first duty cycles D-PFC. Therefore, interference with the high power factor control of the input current iac is significantly suppressed.

As described above, in the present embodiment, the control circuit 7 uses the switching pattern SP to control charging and discharging of the DC capacitor Cf and control the input current iac according to the first duty cycle D-PFC. Furthermore, the addition/subtraction determination unit 13 operates to add or subtract the second duty cycle D-Vcf to or from the first duty cycle D-PFC, thereby suppressing voltage fluctuation of the DC capacitor Cf. Although the two duty cycles D-Q1, D-Q2 are adjusted so as to suppress voltage fluctuation of the DC capacitor Cf, the sum thereof is not changed and is constant.

Thus, the voltage control for the DC capacitor Cf can be performed for each control cycle (one switching cycle). Therefore, a charging/discharging time constant of the DC capacitor Cf can be made equal to the control cycle. Therefore, the capacitance of the DC capacitor Cf can be reduced while a preferable control responsiveness is maintained. The sum of the two duty cycles D-Q1, D-Q2 is constant regardless of voltage fluctuation of the DC capacitor Cf, and is equal to the sum of the first duty cycles D-PFC. Therefore, interference with high power factor control of the input current iac is significantly suppressed.

Figure 22:
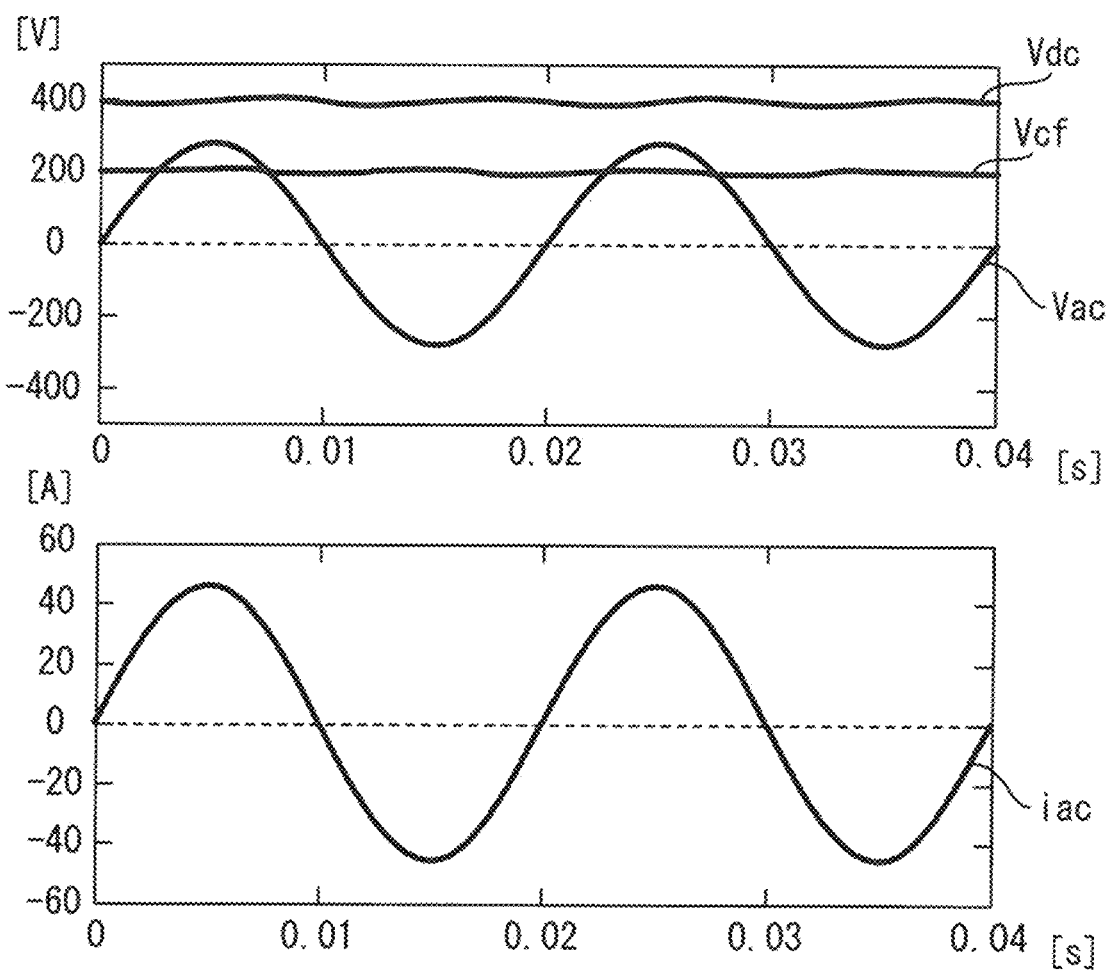
FIG. 22 illustrates voltage and current waveforms in the power conversion device for illustrating the effect according to embodiment 1.

For example, in the technique disclosed in Patent Document 1, the capacitance of the DC capacitor Cf needs to be greater than or equal to several hundreds of µF. However, even if the capacitance of the DC capacitor Cf is reduced to several tens of µF, the circuit can be stably operated by the control operation according to the present embodiment. FIG. 22 illustrates voltage and current waveforms in several kW level of a power conversion device having the configuration of the present embodiment. In this case, the capacitance of the DC capacitor Cf is 20 µF. As shown in FIG. 22, the DC capacitor Cf allows achievement of high power factor control of the input current iac and control for making the voltage Vcf of the DC capacitor Cf constant, with a low capacitance of 20 µF.

As described above, in the control operation according to the present embodiment, interference between the high power factor control of the input current iac and the voltage control for the DC capacitor Cf can be suppressed to perform both the controls with high accuracy, and the capacitance and the size of the DC capacitor Cf can be reduced. Thus, the downsizing of the power conversion device 100 can be promoted.

In embodiment 1, the feedforward term 23a is added to generate the first duty cycle D-PFC. However, the first duty cycle D-PFC may be generated without using such a feedforward control. In this case, although control responsiveness to rapid change during switching of control may be degraded, the above-described effect can be similarly obtained.

In embodiment 1, the reactor L is connected between the mid-point of the rectification bridge circuit 3 and the first end of the AC power supply 2. However, the structure is not limited thereto as long as the reactor L is inserted in the current path between the AC power supply 2 and the leg circuit 4.

Figure 23:
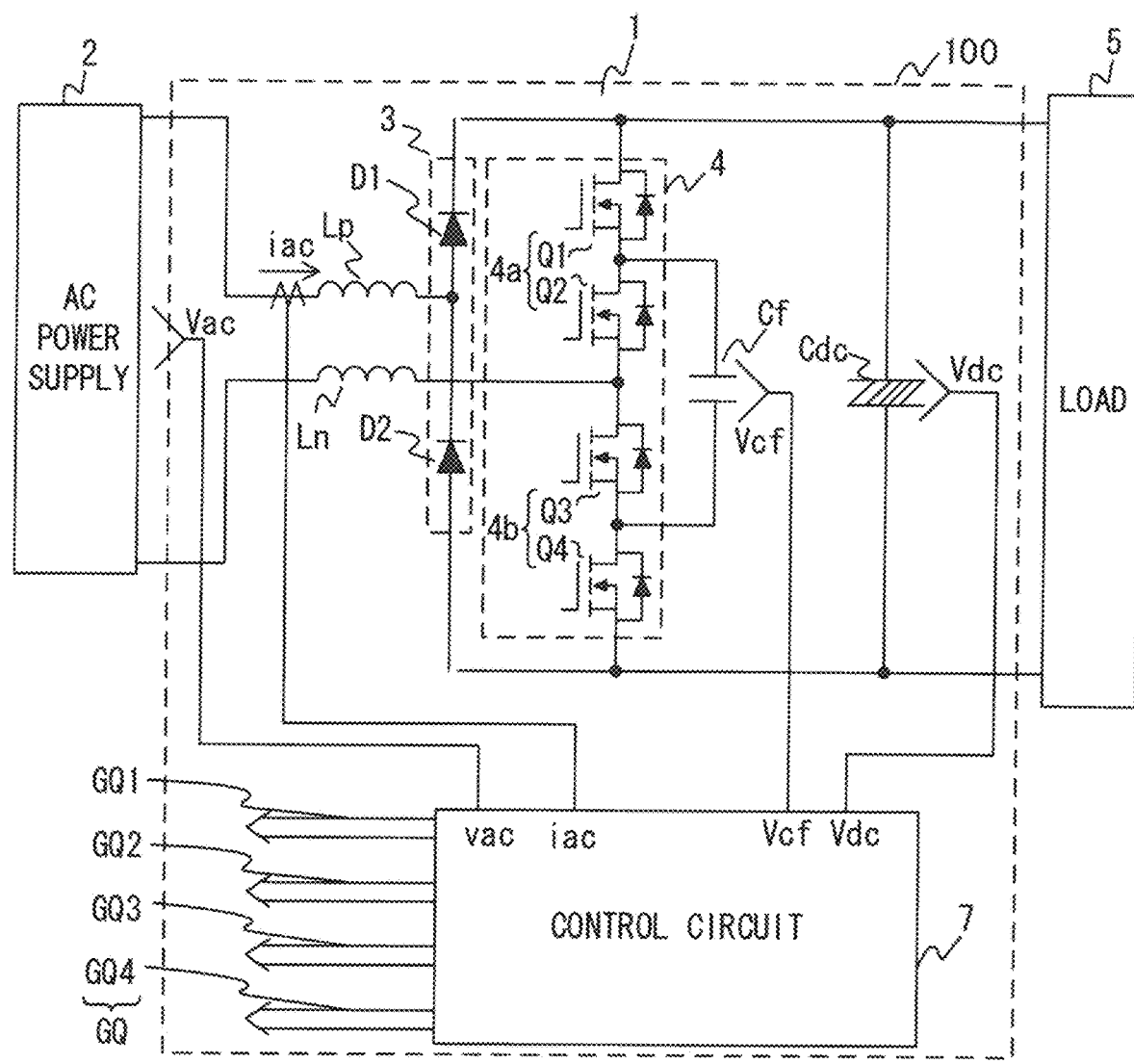
FIG. 23 schematically illustrates a configuration of another example of the power conversion device according to embodiment 1.

As shown in FIG. 23, a reactor Lp may be connected between the mid-point of the rectification bridge circuit 3 and the first end of the AC power supply 2, and a reactor Ln may be connected between the mid-point of the leg circuit 4 and the second end of the AC power supply 2. In this case, imbalance in the current path due to the polarity of the AC voltage Vac does not occur, whereby generation of a common mode noise in the power conversion circuit 1 can be suppressed.

Embodiment 2

Figure 24:
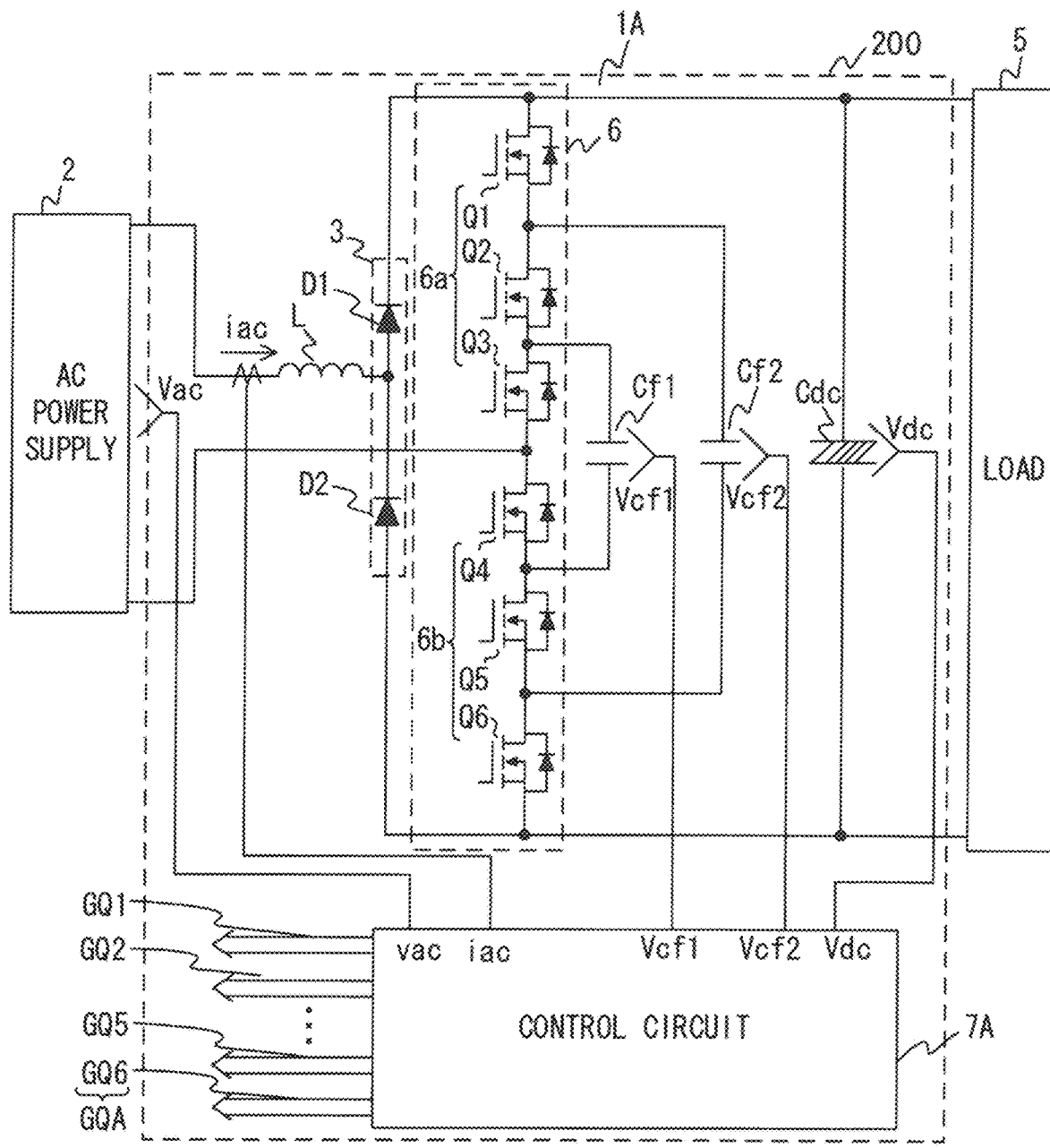
FIG. 24 schematically illustrates a configuration of a power conversion device according to embodiment 2.

FIG. 24 schematically illustrates a configuration of a power conversion device according to embodiment 2.

As shown in FIG. 24, a power conversion device 200 includes a power conversion circuit 1A, and a control circuit 7A for performing output control for the power conversion circuit 1A, and performs power conversion of AC power from the AC power supply 2, to supply DC power to the load 5.

The power conversion circuit 1A consists of a totem pole type AC/DC converter circuit, and includes the rectification bridge circuit 3 connected to the AC power supply 2, a leg circuit 6, first and second DC capacitors Cf1, Cf2 that are two DC capacitors, the smoothing capacitor Cdc, and the reactor L for limiting the input current iac from the AC power supply 2.

In this case, the leg circuit 6, the first and the second DC capacitors Cf1, Cf2, and the control circuit 7A are different from those in embodiment 1, and the other configurations are the same as those in embodiment 1. Therefore, the description is omitted as appropriate.

The rectification bridge circuit 3, the leg circuit 6, and the smoothing capacitor Cdc are connected between DC buses, respectively.

The leg circuit 6 has an upper leg 6a and a lower leg 6b connected in series, and the mid-point as a connection point between the upper leg 6a and the lower leg 6b is connected to the second end of the AC power supply 2. The upper leg 6a consists of switching elements Q1, Q2, Q3, as semiconductor elements, connected in series via connection points. The lower leg 6b consists of switching elements Q4, Q5, Q6, as semiconductor elements, connected in series via connection points.

Hereinafter, the switching elements Q1, Q2, Q3, Q4, Q5, Q6 will be simply referred to as Q1, Q2, Q3, Q4, Q5, Q6, respectively.

The first DC capacitor Cf1 is connected between a connection point of the Q2 and Q3 in the upper leg 6a and a connection point of the Q4 and Q5 in the lower leg 6b. The second DC capacitor Cf2 is connected between a connection point of the Q1 and the Q2 in the upper leg 6a and a connection point of the Q5 and Q6 in the lower leg 6b. Thus, the second DC capacitor Cf2 is disposed closer to the outer side relative to the center of the leg circuit 6 than the first DC capacitor Cf1 is.

The first and the second DC capacitors Cf1, Cf2 and the smoothing capacitor Cdc can be each composed of an aluminum electrolytic capacitor, a film capacitor, or the like.

The Q1, Q2, Q3, Q4, Q5, Q6 used in the leg circuit 6 are, for example, IGBTs to which diodes are connected in reverse parallel, MOSFETs to which diodes are connected between the sources and the drains, or cascode GaN-HEMTs, as in embodiment 1. The diodes may be diodes incorporated in the switching elements or external diodes may be separately connected. The rectification bridge circuit 3 may be configured by using switching elements instead of the diodes D1, D2.

The AC voltage vac of the AC power supply 2, voltages Vcf1 and Vcf2 of the first and the second DC capacitors Cf1, Cf2, and the voltage Vdc of the smoothing capacitor Cdc are detected by a voltage sensor and inputted to the control circuit 7A.

Furthermore, the input current iac from the AC power supply 2 is detected by a current sensor and inputted to the control circuit 7A. The control circuit 7A generates a gate signal GQA (GQ1, GQ2, GQ3, GQ4, GQ5, GQ6) for the Q1, Q2, Q3, Q4, Q5, Q6 in the leg circuit 6 based on information about the inputted voltage and current, and performs high-frequency switching of the Q1, Q2, Q3, Q4, Q5, Q6 by PWM control to control the power conversion circuit 1A.

In this case, the control circuit 7A controls driving of the Q1, Q2, Q3, Q4, Q5, Q6 by setting two cycles of the switching cycle as a control cycle. The control cycle is determined according to the switching cycle corresponding to the number of the DC capacitors (Cf1, Cf2) in the power conversion circuit 1A.

Figure 25:
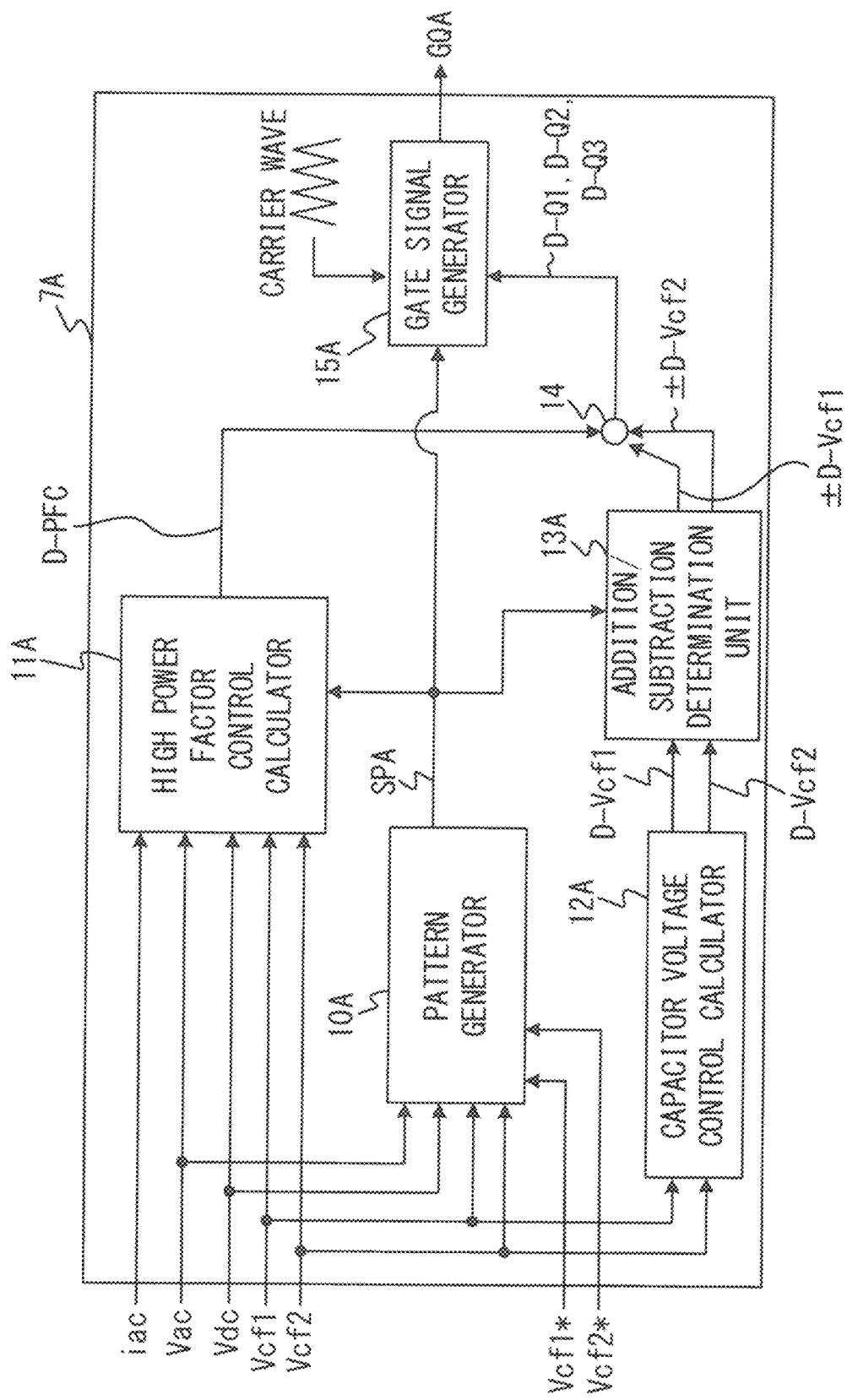
FIG. 25 is a control block diagram illustrating a control circuit of the power conversion device according to embodiment 2.

FIG. 25 is a control block diagram illustrating the control circuit 7A.

As shown in FIG. 25, the control circuit 7A includes a pattern generator 10A for generating a switching pattern SPA, a high power factor control calculator 11A (hereinafter, referred to as first controller 11A) for controlling the input current iac, a capacitor voltage control calculator 12A (hereinafter, referred to as second controller 12A) for controlling voltages Vcf1, Vcf2 of the first and the second DC capacitors Cf1, Cf1, respectively, an addition/subtraction determination unit 13A, the adder 14, and a gate signal generator 15A.

The pattern generator 10A generates the switching pattern SPA consisting of a combination of a plurality of switching states, of the leg circuit 6, which vary in one cycle of the control cycle corresponding to two switching cycles. The first controller 11A uses the generated switching pattern SPA to generate a first duty cycle D-PFC for performing control so as to improve a power factor of the input current iac, converting AC power to DC power, and outputting the DC power. The second controller 12A generates second duty cycles D-Vcf1, D-Vcf2 so as to cause the voltages Vcf1, Vcf2 of the first and the second DC capacitors Cf1, Cf2 to follow command values Vcf1*, Vcf2*, respectively.

The addition/subtraction determination unit 13A and the adder 14 operate so as to add or subtract the second duty cycles D-Vcf1, D-Vcf2 to or from the first duty cycle D-PFC to calculate a duty cycle D of the leg circuit 6. In this case, as the duty cycle D, the duty cycles D-Q1, D-Q2, D-Q3 for the Q1, Q2, Q3 in the upper leg 6a are calculated. The addition/subtraction determination unit 13A determines whether the second duty cycles D-Vcf1, D-Vcf2 are to be added or subtracted, according to the switching pattern SPA. In the case of subtraction, the second duty cycles D-Vcf1 and D-Vcf2 are inputted to the adder 14 with the polarities reversed. The duty cycles D-Q1, D-Q2, D-Q3 are generated such that the sum of the duty cycles D-Q1, D-Q2, D-Q3 for the Q1, Q2, Q3 becomes constant in one cycle of the control cycle.

The gate signal generator 15A obtains the duty cycles D-Q4, D-Q5, D-Q6 for the Q4, Q5, Q6 in the lower leg 6b based on the duty cycles D-Q1, D-Q2, D-Q3. The PWM control by comparing each of the duty cycles D-Q1, D-Q2, D-Q3, D-Q4, D-Q5, D-Q6 with a carrier wave based on the switching pattern SPA is performed, and the gate signal GQA (GQ1, GQ2, GQ3, GQ4, GQ5, GQ6) for each of the Q1, Q2, Q3, Q4, Q5, Q6 in the leg circuit 6 is generated. As the carrier wave, a triangular wave, a saw-tooth wave, or the like is used.

The duty cycles D-Q4, D-Q5, D-Q6 for the Q4, Q5, Q6 are obtained according to D-Q4=1−(D-Q3), D-Q5=1−(D-Q2), D-Q6=1−(D-Q1). The gate signals GQ3 and GQ4 are signals that are on-off inverted relative to each other. The gate signals GQ2 and GQ5 are signals that are on-off inverted relative to each other. The gate signals GQ1 and GQ6 are signals that are on-off inverted relative to each other.

Next, the control by the control circuit 7A and the operation of the power conversion circuit 1A will be described in detail.

The power conversion circuit 1A performs high-frequency switching of the Q1 to Q6 in the leg circuit 4 to boost a voltage while the input current iac flowing in the reactor L is controlled to have a high power factor, causes the smoothing capacitor Cdc to smooth power, and supplies DC power to the load 5.

FIG. 26 illustrates voltage/current waveforms and operation ranges in the power conversion device 200. FIG. 26 illustrates waveforms of the voltage Vac of the AC power supply 2 such as a system power supply in one cycle, the voltages Vcf1, Vcf2 of the first and the second DC capacitors Cf1, Cf2, the voltage Vdc, of the smoothing capacitor Cdc, which is an output voltage from the power conversion circuit 1A, and the input current iac.

The control circuit 7A determines a plurality of operation ranges β1 to β6 based on a relationship in voltage magnitude among the inputted AC voltage vac, the voltage Vcf1, the voltage Vcf2, and the voltage Vdc. In this case, three operation ranges are in half the cycle of the AC power supply 2, and six operation ranges are in one cycle.

In this case, Vcf1=Vdc/3, Vcf2=2Vdc/3, Vdc>vac are satisfied as a voltage condition. The voltage Vcf2 may not necessarily satisfy the above-described voltage condition as long as the voltage Vcf2 is lower than or equal to the voltage Vdc. The voltage Vcf1 may not necessarily satisfy the above-described voltage condition as long as the voltage Vcf1 is lower than or equal to the voltage Vcf2.

The pattern generator 10A generates the switching pattern SPA according to the operation ranges β1 to β6.

As described above, the switching pattern SPA consists of a combination of a plurality of switching states, of the leg circuit 6, which vary in one cycle of the control cycle which corresponds to two cycles of the switching cycle in the PWM control.

One cycle of the control cycle of the gate signal GQA (GQ1 to GQ6) corresponds to a combination of eight switching states based on ON and OFF of the Q1 to Q6 in the leg circuit 6 as described below. The combination of the eight switching states is the switching pattern SPA. At this time, switching states in which the reactor L is excited by application of a positive voltage and switching states in which the reactor L is reset by application of a negative voltage are combined so as to alternate in order to control the input current iac.

In the power conversion circuit 1A, the operation for exciting the reactor L and the operation for resetting the reactor L are different for each of the operation ranges β1 to β6. Each of the operation ranges β1, β2, β3 in half the cycle in which the AC voltage Vac has a positive polarity will be described below in detail. In each of the operation ranges β4, β5, β6 in half the cycle in which the AC voltage Vac has a negative polarity, the polarity of the current is reversed, however, the case is similar to the case for the positive polarity, then the description is omitted as appropriate.

FIG. 27 to FIG. 29 illustrate kinds of the switching states in the operation ranges I31, I32, I33. In a case where the gate signal GQA (GQ1 to GQ6) represents 1, the Q1 to Q6 are on. In a case where the gate signal GQA (GQ1 to GQ6) represents 0, the Q1 to Q6 are off. A charging, discharging, or through state of the first and the second DC capacitors Cf1, Cf2, and a voltage applied to the reactor L in each switching state are also illustrated.

As shown in FIG. 27, in the operation range β1 in which vac whose polarity is positive is less than or equal to Vcf1, the reactor L is excited in a switching state A1, and the reactor L is reset in switching states F1, G1, H1, I1, J1, K1. In this case, the reactor L is excited only in the switching state A1 in which both the first and the second DC capacitors Cf1, Cf2 are in through states, and six kinds of different switching states are for resetting of the reactor L.

As shown in FIG. 28, in the operation range β2 in which vac whose polarity is positive is higher than Vcf1 and less than or equal to Vcf2, the reactor L is excited in switching states A2, B2, C2, D2, and the reactor L is reset in switching states F2, G2, I2, J2. In this case, four kinds of different switching states are for each of excitation and resetting of the reactor L.

As shown in FIG. 29, in the operation range β3 in which vac whose polarity is positive is higher than Vcf2, the reactor L is excited in switching states A3, B3, C3, D3, E3, F3, and the reactor L is reset in a switching state G3. In this case, the reactor L is reset only in the switching state G3 in which both the first and the second DC capacitors Cf1, Cf2 are in through states, and six kinds of different switching states are for excitation of the reactor L.

As described above, the pattern generator 10A generates the switching pattern SPA according to the operation ranges β1 to β6.

The pattern generator 10A generates the switching pattern SPA such that, in one cycle of the control cycle, the excitation and resetting of the reactor L repeatedly alternate, and the number of times the first and the second DC capacitors Cf1, Cf2 are each charged and the number of times the first and the second DC capacitors Cf1, Cf2 are each discharged are equal to each other. Eight switching states are selected allowing overlapping from the switching states usable in the operation ranges β1 to β6 and combined, thereby generating the switching pattern SPA. One switching cycle consists of four sections according to the switching states. That is, one control cycle consists of eight sections according to the switching states. In one cycle of the control cycle, the number of the charging sections and the number of the discharging sections are equal to each other for the first DC capacitor Cf1, and the number of charging sections and the number of discharging sections are equal to each other for the second DC capacitor Cf2.

The control in the operation range β1 will be described below with reference to FIG. 30 and FIG. 31.

FIG. 30 illustrates the switching pattern SPA (A1-G1-A1-I1-A1-H1-A1-J1), the input current iac, the gate signal GQA (GQ1 to GQ6), and the charged and discharged states of the first and the second DC capacitors Cf1, Cf2, in the operation range β1.

Figure 31:
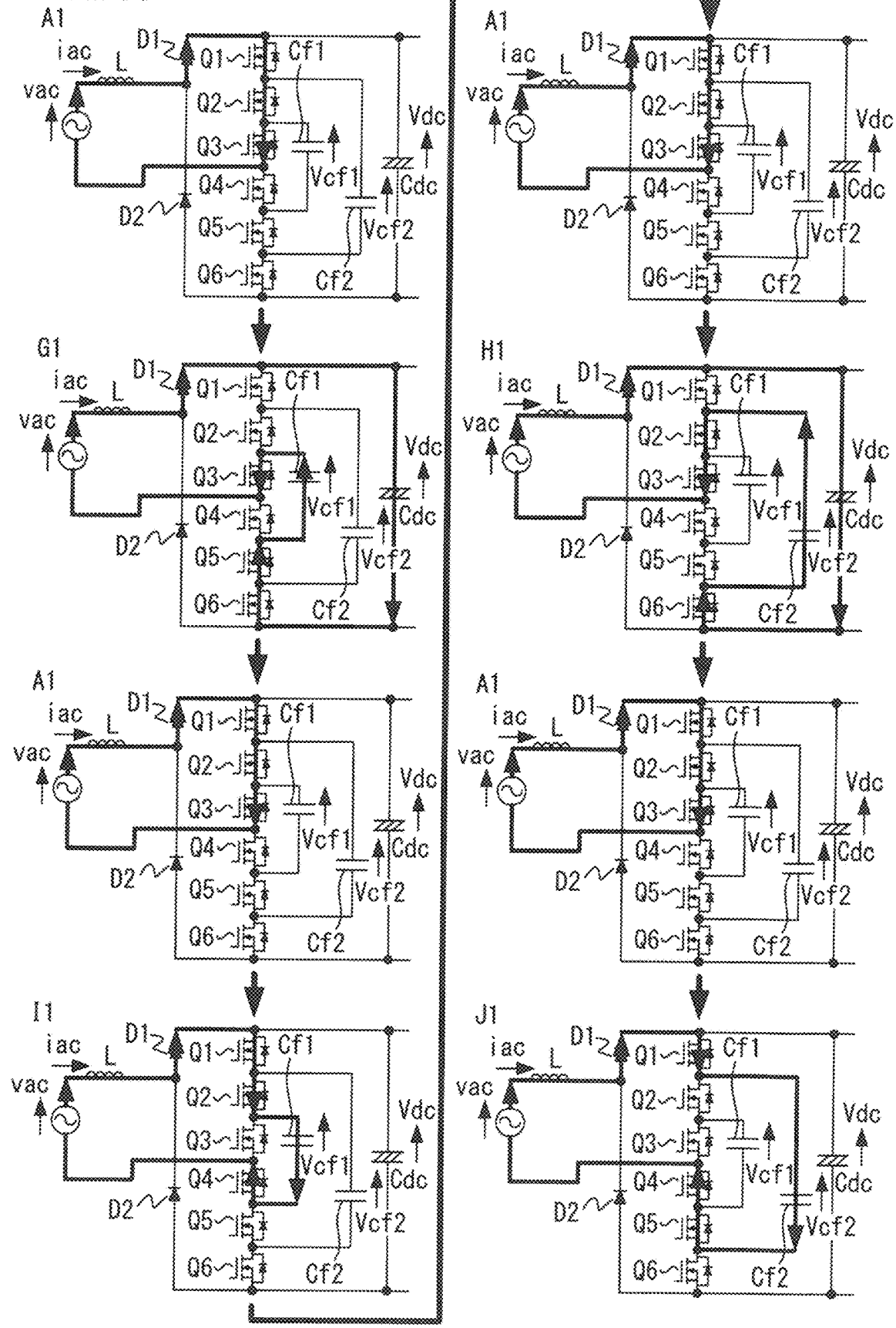
FIG. 31 is a current path diagram illustrating the control in FIG. 30.

FIG. 31 illustrates a current path in the power conversion circuit 1A in the switching pattern SPA (A1-G1-A1-I1-A1-H1-A1-J1).

As shown in FIG. 30 and FIG. 31, in one cycle of a control cycle T consisting of two switching cycles S1, S2, the state varies as indicated by A1 (excited)-G1 (reset and Cf1 discharged)-A1 (excited)-I1 (reset and Cf1 charged)-A1 (excited)-H1 (reset and Cf2 discharged)-A1 (excited)-J1 (reset and Cf2 charged). That is, excitation and resetting of the reactor L repeatedly alternate, the charging and discharging of the first DC capacitor Cf1 are each performed once, and the charging and discharging of the second DC capacitor Cf2 are each performed once.

The control in the operation range β2 will be described below with reference to FIG. 32 and FIG. 33.

Figure 32:
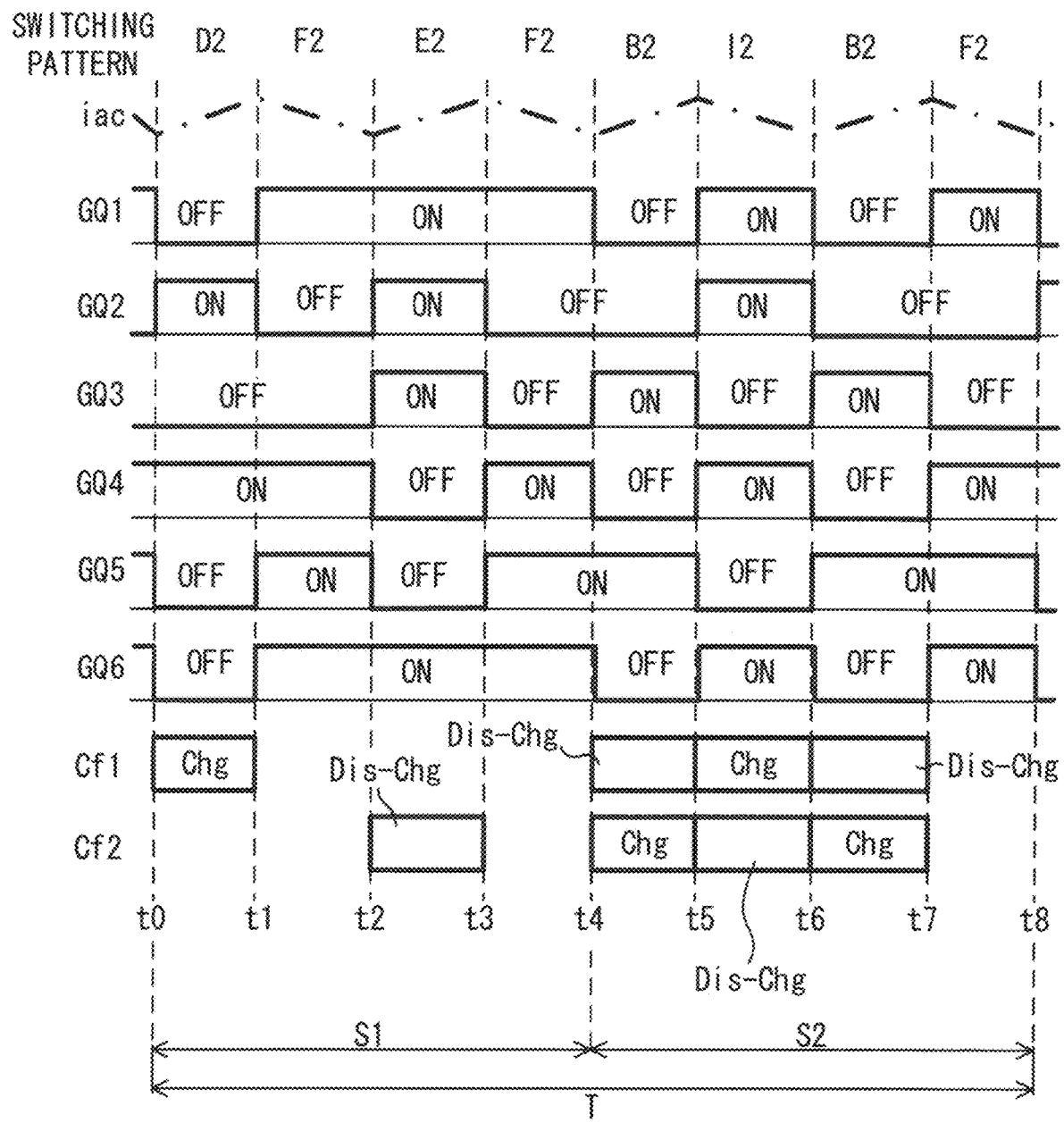
FIG. 32 is a waveform diagram illustrating switching patterns and control in one operation range according to embodiment 2.

FIG. 32 illustrates the switching pattern SPA (D2-F2-E2-F2-B2-I2-B2-F2), the input current iac, the gate signal GQA (GQ1 to GQ6), and the charged and discharged states of the first and the second DC capacitors Cf1, Cf2, in the operation range β2.

Figure 33:
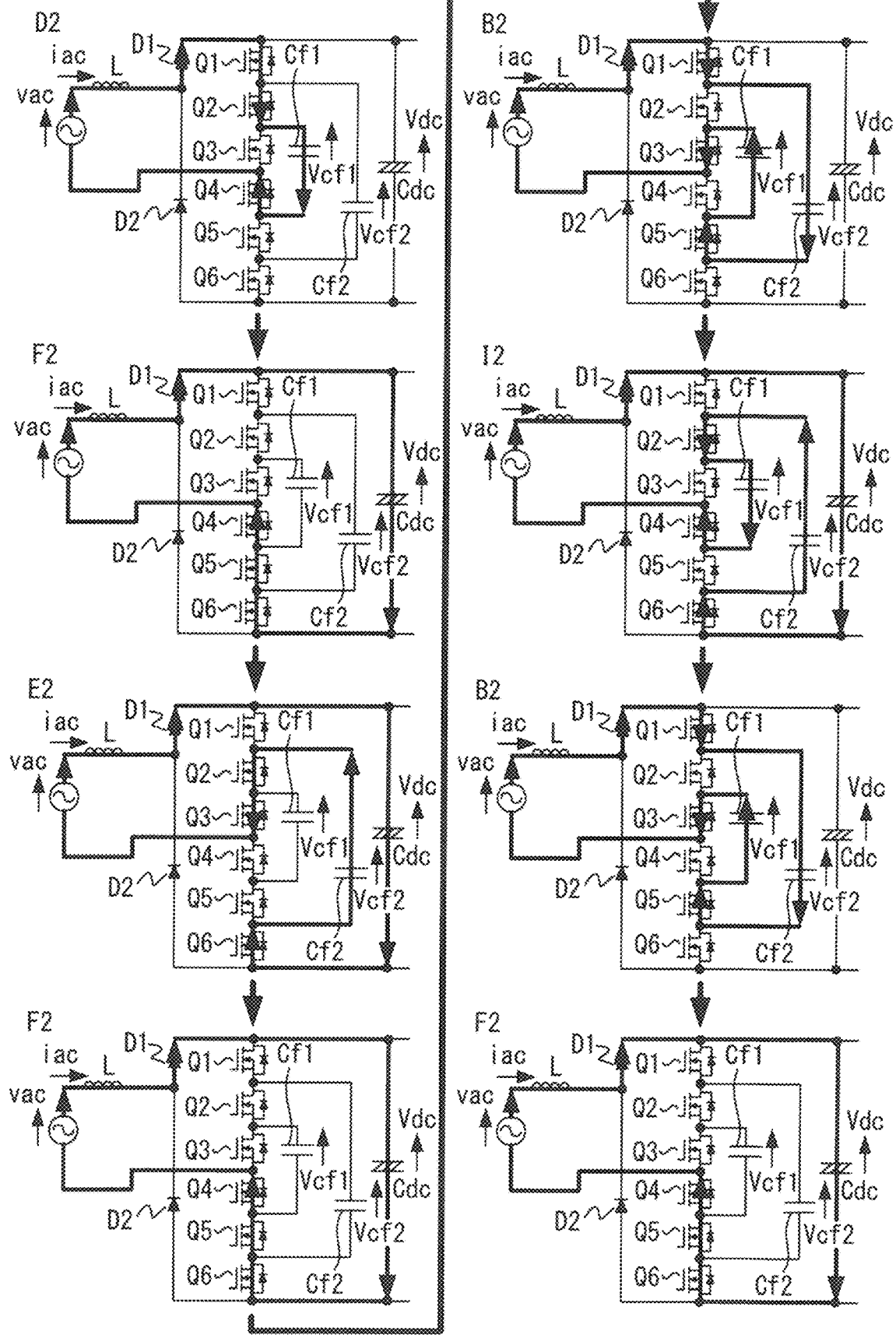
FIG. 33 is a current path diagram illustrating the control in FIG. 32.

FIG. 33 illustrates a current path in the power conversion circuit 1A in the switching pattern SPA (A1-G1-A1-I1-A1-H1-A1-J1).

As shown in FIG. 32 and FIG. 33, in one cycle of the control cycle T consisting of two switching cycles S1, S2, the state varies as indicated by D2 (excited and Cf1 charged)-F2 (reset)-E2 (excited and Cf2 discharged)-F2 (reset)-B2 (excited, Cf1 discharged, Cf2 charged)-I2 (reset, Cf1 charged, Cf2 discharged)-B2 (excited, Cf1 discharged, Cf2 charged)-F2 (reset). That is, excitation and resetting of the reactor L repeatedly alternate, the charging and discharging of the first DC capacitor Cf1 are each performed twice, and the charging and discharging of the second DC capacitor Cf2 are each performed twice.

The control in the operation range β3 will be described below with reference to FIG. 34 and FIG. 35.

Figure 34:
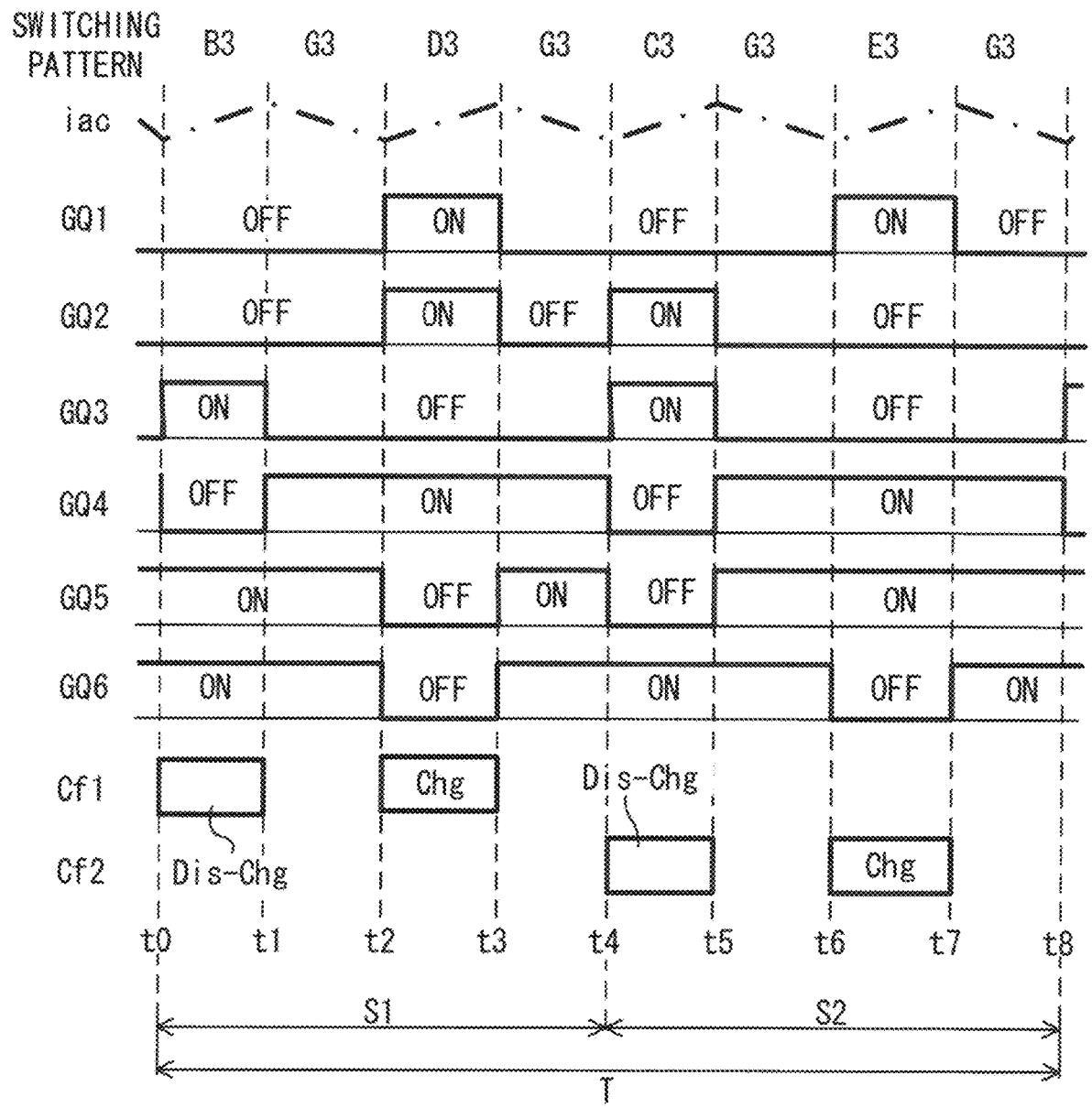
FIG. 34 is a waveform diagram illustrating switching patterns and control in one operation range according to embodiment 2.

FIG. 34 illustrates the switching pattern SPA (B3-G3-D3-G3-C3-G3-E3-G3), the input current iac, the gate signal GQA (GQ1 to GQ6), and the charged and discharged states of the first and the second DC capacitors Cf1, Cf2, in the operation range β3.

Figure 35:
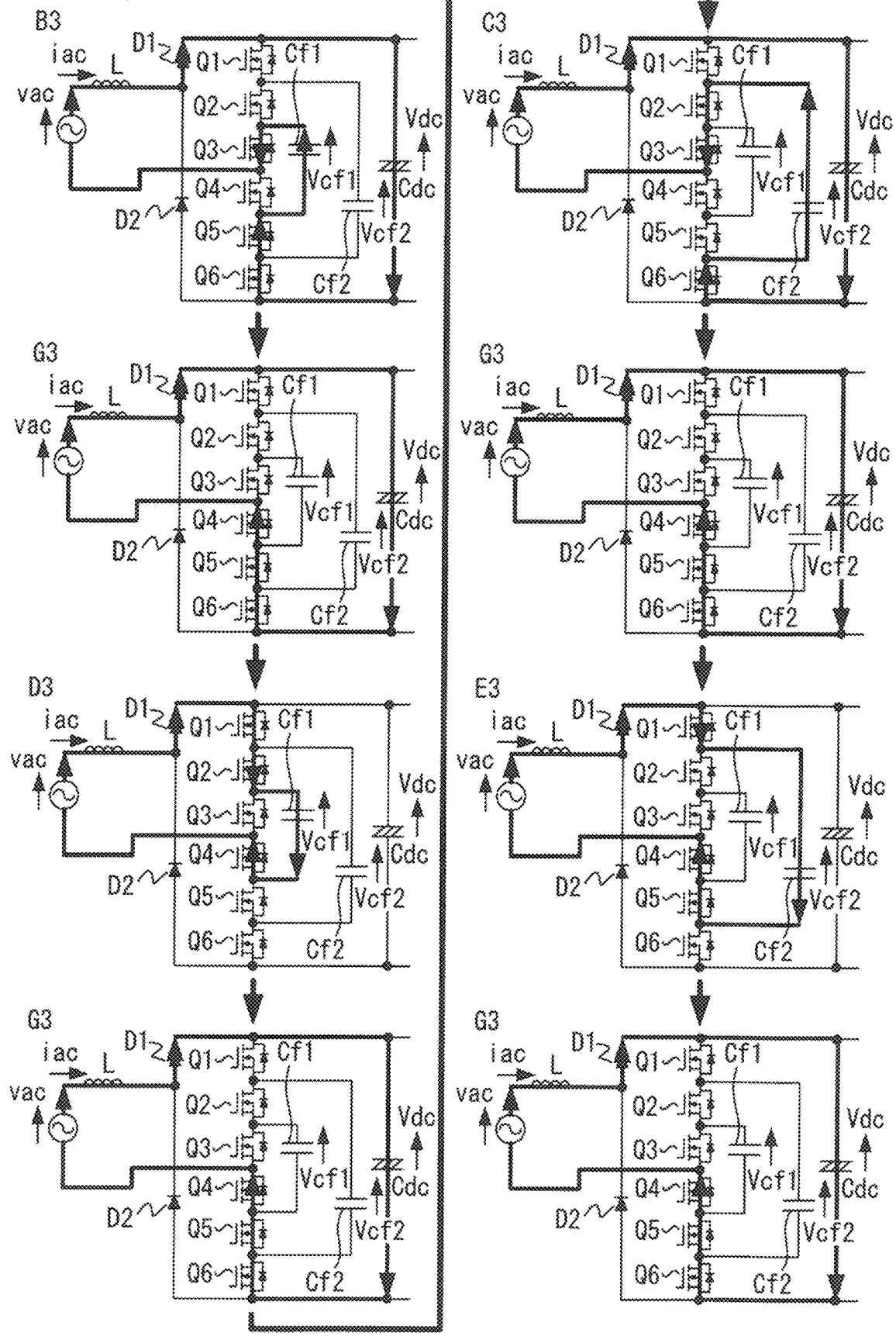
FIG. 35 is a current path diagram illustrating the control in FIG. 34.

FIG. 35 illustrates a current path in the power conversion circuit 1A in the switching pattern SPA (B3-G3-D3-G3-C3-G3-E3-G3).

As shown in FIG. 34 and FIG. 35, in one cycle of the control cycle T consisting of two switching cycles S1, S2, the state varies as indicated by B3 (excited and Cf1 discharged)-G3 (reset)-D3 (excited and Cf1 charged)-G3 (reset)-C3 (excited and Cf2 discharged)-G3 (reset)-E3 (excited and Cf2 charged)-G3 (reset). That is, excitation and resetting of the reactor L repeatedly alternate, the charging and discharging of the first DC capacitor Cf1 are each performed once, and the charging and discharging of the second DC capacitor Cf2 are each performed once.

As described above, the switching pattern SPA is generated such that the excitation and resetting of the reactor L repeatedly alternate, and the number of times each of the first and the second DC capacitors Cf1, Cf2 is charged and the number of times each of the first and the second DC capacitors Cf1, Cf2 is discharged are equal to each other, in one control cycle, according to the operation ranges β1 to β6. The control for improving a power factor of the input current iac and the voltage control for the first and the second DC capacitors Cf1, Cf2 are performed by using such a switching pattern SPA, whereby a high-accuracy control responsiveness can be obtained.

The control circuit 7A stores, as a table, information indicating the switching states for each of the operation ranges β1 to β6 as shown in, for example, FIG. 27 to FIG. 29, and selects a plurality of switching states with reference to the table, to generate the switching pattern SPA. The switching pattern SPA may be determined based on an external command.

The gate signal GQA (GQ1 to GQ6) based on the switching pattern SPA is generated.

As shown in FIG. 30, FIG. 32, and FIG. 34, the gate signal GQ1 and the gate signal GQ3 are shifted from each other by half the cycle of the switching cycle. The gate signal GQ2 is a signal that is in synchronization with the gate signal GQ1 in one switching cycle S1 and is in synchronization with the gate signal GQ3 in the other switching cycle S2, in the control cycle T. The switching control of the leg circuit 6 is performed based on such gate signals GQ1 to GQ3, whereby excitation and resetting of the reactor are each performed four times so as to alternate in one control cycle. Thus, the power factor of the input current iac can be controlled. The switching pattern SPA is generated such that the number of times each of the first and the second DC capacitors Cf1, Cf2 is charged and the number of times each of the first and the second DC capacitors Cf1, Cf2 is discharged are equal to each other, whereby a circuit configuration that can suppress voltage fluctuation of each of the first and the second DC capacitors Cf1, Cf2 and does not use an external power supply can be obtained.

In FIG. 30, FIG. 32, and FIG. 34, the timings to, t2, t4, t6, t8 in one cycle (t0-t8) are determined by half the cycle of the switching cycles S1, S2 and fixed, and the timings t1, t3, t5 are variable. That is, the gate signal GQ1 and the gate signal GQ3 which are shifted from each other by half the cycle of the switching cycle each become Hi (ON) at the cycle shifted by half the cycle, while the timing at which the gate signal GQ1 and the gate signal GQ3 each become Low (OFF) varies according to the duty cycles D-Q1, D-Q3. The gate signal GQ2 varies in the switching cycle S1 in the same manner as the gate signal GQ1 and varies in the switching cycle S2 in the same manner as the gate signal GQ3.

The control of the input current iac, the voltage control for the smoothing capacitor Cdc, and the voltage control for each of the first and the second DC capacitors Cf1, Cf2 are all performed by PWM control of the leg circuit 6, that is, performed by using the duty cycle D as the command. The control circuit 7A adjusts the timings t1, t3, t5 according to the duty cycle D (D-Q1, D-Q2, D-Q3) in each of the operation ranges β1 to β6, and controls the output voltage (Vdc) and the voltages Vcf1, Vcf2 of the first and the second DC capacitors Cf1, Cf2 while performing high power factor control of the input current iac.

The first controller 11A controls the input current iac such that a power factor of 1 with respect to the voltage vac of the AC power supply 2, and further generates the first duty cycle D-PFC so as to perform voltage control for the smoothing capacitor Cdc. The first controller 11A has the same configuration as the first controller 11 of embodiment 1 shown in FIG. 16, and operates in the same manner as the first controller 11.

Also in this case, the FF calculator 23 calculates the feedforward term 23a and generates the first duty cycle D-PFC to which the feedforward term 23a has been added.

Also in embodiment 2, the feedforward term 23a is calculated so as to improve responsiveness in the high power factor control of the input current iac when control is switched according to the operation ranges β1 to β6, whereby rapid change during switching of control can be inhibited.

The feedforward term 23a is obtained by calculation of a theoretical duty cycle that allows electric current increase and reduction caused by excitation and resetting of the reactor L to be equal to each other. In this case, up to four theoretical expressions are derived in one control cycle. For example, in the operation range β1, calculation is performed according to the following expressions (5) to (8).

$$(Vdc-vac-Vcf1)/(Vdc-Vcf1) \tag{5}$$

$$(Vcf1-vac)/Vcf1 \tag{6}$$

$$(Vdc-vac-Vcf2)/(Vdc-Vcf2) \tag{7}$$

$$(Vcf2-vac)/Vcf2 \tag{8}$$

Expression (5) represents a calculation for balancing electric current increase and reduction according to the two switching states A1, G1 in the switching pattern SPA (A1-G1-A1-I1-A1-H1-A1-J1) in the operation range β1. Expression (6) represents a calculation for balancing electric current increase and reduction according to the two switching states A1, I1. Expression (7) represents a calculation for balancing electric current increase and reduction according to the two switching states A1, H1. Expression (8) represents a calculation for balancing electric current increase and reduction according to the two switching states A1, J1.

In the operation range β2, calculation is performed according to the following expressions (9) to (12).

$$(Vdc-vac)/(Vdc-Vcf1) \tag{9}$$

$$(Vdc-vac)/Vcf2 \tag{10}$$

$$(Vdc-vac-Vcf2+Vcf1)/(Vdc-2Vcf2+2Vcf1) \tag{11}$$

$$(Vcf-vac)/(Vdc-Vcf2+Vcf1) \tag{12}$$

Expression (9) represents a calculation for balancing electric current increase and reduction according to the two switching states D2, F2 in the switching pattern SPA (D2-F2-E2-F2-B2-I2-B2-F2) in the operation range β2. Expression (10) represents a calculation for balancing electric current increase and reduction according to the two switching states E2, F2. Expression (11) represents a calculation for balancing electric current increase and reduction according to the two switching states B2, I2. Expression (12) represents a calculation for balancing electric current increase and reduction according to the two switching states B2, F2.

In the operation range β3, calculation is performed according to the following expressions (13) to (16).

$$(Vdc-vac)/Vcf1 \quad (13)$$

$$(Vdc-vac)/(Vdc-Vcf1) \quad (14)$$

$$(Vdc-vac)/Vcf2 \quad (15)$$

$$(Vdc-vac)/(Vdc-Vcf2) \quad (16)$$

Expression (13) represents a calculation for balancing electric current increase and reduction according to the two switching states B3, G3 in the switching pattern SPA (B3-G3-D3-G3-C3-G3-E3-G3) in the operation range β3. Expression (14) represents a calculation for balancing electric current increase and reduction according to the two switching states D3, G3. Expression (15) represents a calculation for balancing electric current increase and reduction according to the two switching states C3, G3. Expression (16) represents a calculation for balancing electric current increase and reduction according to the two switching states E3, G3.

Figure 36:
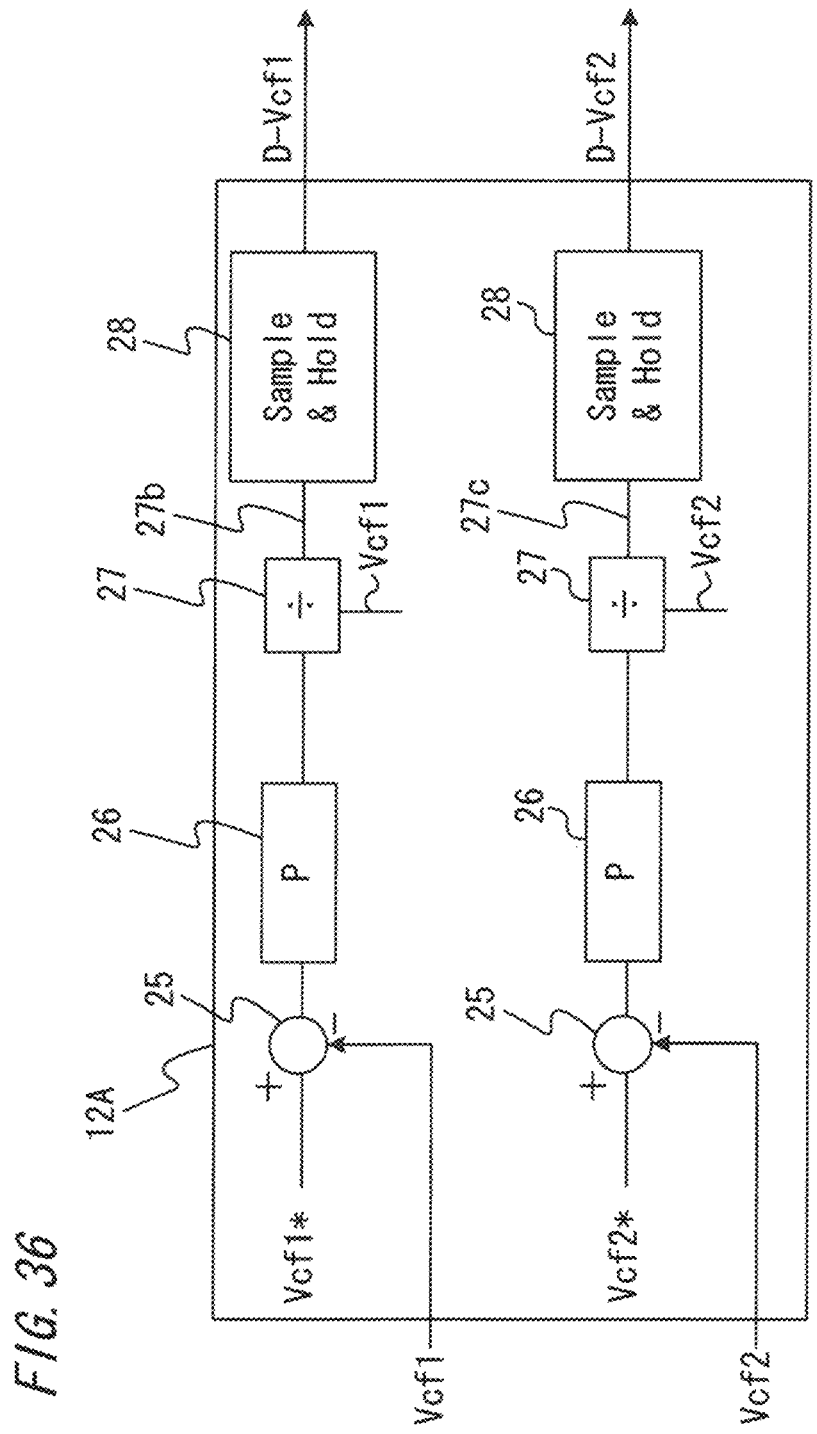
FIG. 36 illustrates a control block of a capacitor voltage control calculator according to embodiment 2.

FIG. 36 illustrates a control block of the second controller 12A. The second controller 12A generates the second duty cycles D-Vcf1, D-Vcf2 so as to cause the voltages Vcf1, Vcf2 of the first and the second DC capacitors Cf1, Cf2 to follow command values Vcf1*, Vcf2*, respectively.

As shown in FIG. 36, the subtractor 25 calculates a deviation between the command value Vcf1* and the detected voltage Vcf1 of the first DC capacitor Cf1. The P controller 26 performs P control such that the deviation approaches 0, and, thereafter, the divider 27 performs division by the voltage Vcf1 to calculate a duty cycle 27b. The sample and hold unit 28 updates a value of the duty cycle 27b for each control cycle, and outputs the value as the second duty cycle D-Vcf1. The subtractor 25 similarly calculates a deviation between the command value Vcf1* and the detected voltage Vcf2 also for the second DC capacitor Cf2. The P controller 26 performs P control such that the deviation approaches 0, and, thereafter, the divider 27 performs division by the voltage Vcf2 to calculate a duty cycle 27c. The sample and hold unit 28 updates a value of the duty cycle 27c for each control cycle, and outputs the value as the second duty cycle D-Vcf2.

Next, control of the addition/subtraction determination unit 13A will be described in detail.

As described above, the second duty cycles D-Vcf1, D-Vcf2 are added to or subtracted from the first duty cycle D-PFC to calculate the duty cycle D (D-Q1, D-Q2, D-Q3) of the leg circuit 6. The addition/subtraction determination unit 13A determines whether the second duty cycles D-Vcf1, D-Vcf2 are to be added or subtracted, according to the switching pattern SP. At this time, addition or subtraction is determined such that the sum of the duty cycles D-Q1, D-Q2, D-Q3 for the Q1, Q2, Q3 in the upper leg 6a is constant in one cycle of the control cycle. That is, the sum of the duty cycles D-Q1, D-Q2, D-Q3 is constant regardless of voltage fluctuations of the first and the second DC capacitors Cf1, Cf2, and is equal to the sum of the first duty cycles D-PFC (corresponding components of the Q1, Q2, Q3).

An example of an operation of the addition/subtraction determination unit 13A in the operation range β1 will be described below.

Figure 37:
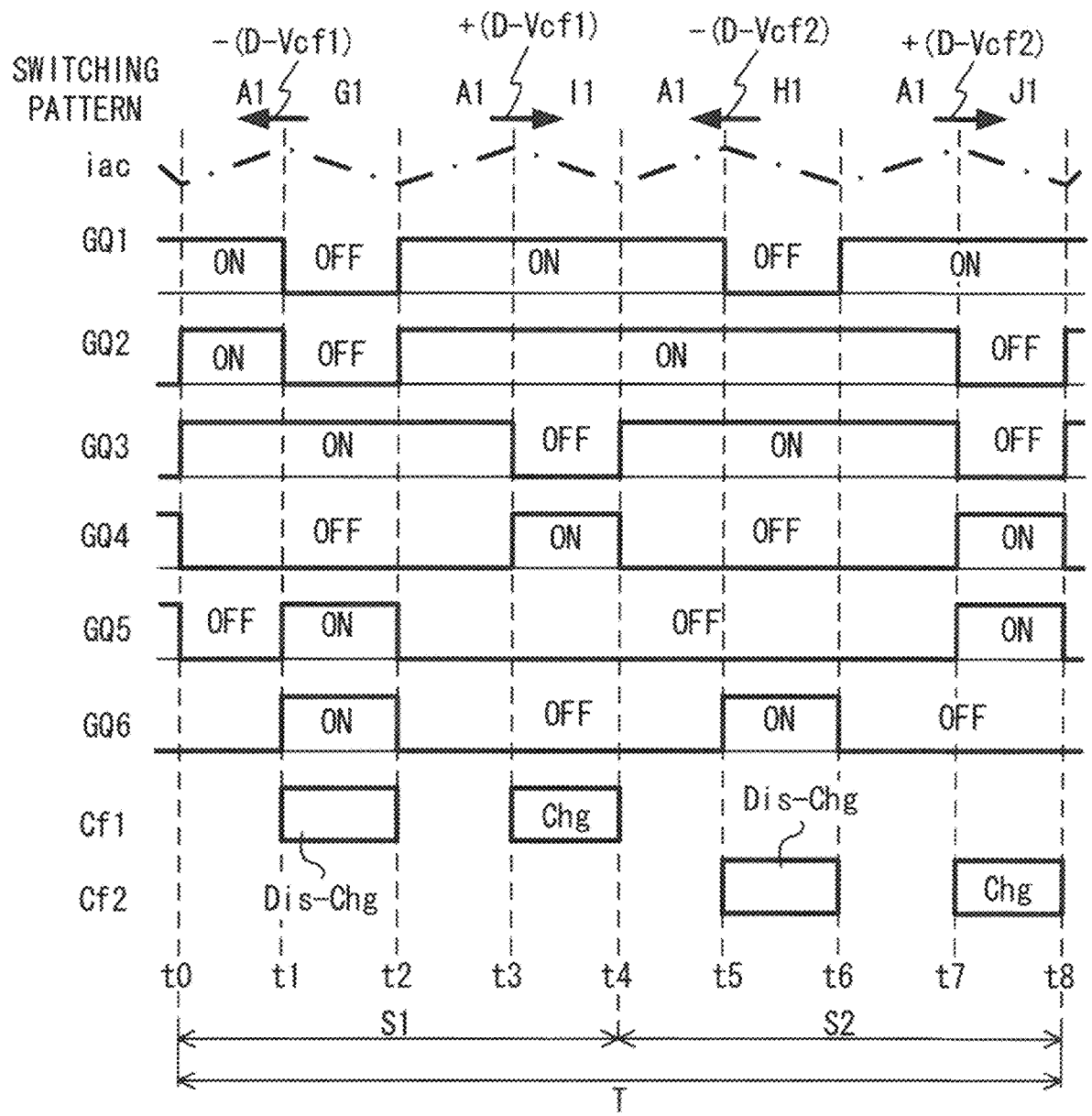
FIG. 37 is a waveform diagram illustrating control in voltage adjustment of a DC capacitor according to embodiment 2.
Figure 38:
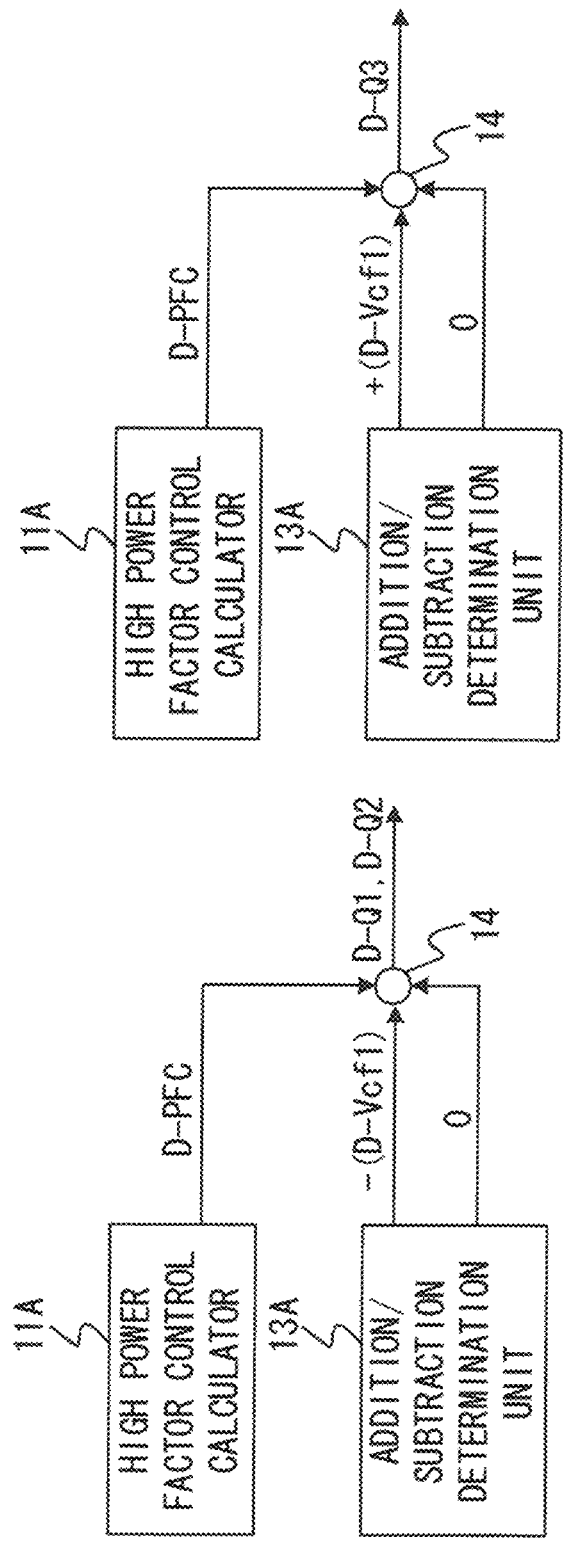
FIG. 38 is a control block diagram illustrating the control in FIG. 37.
Figure 39:
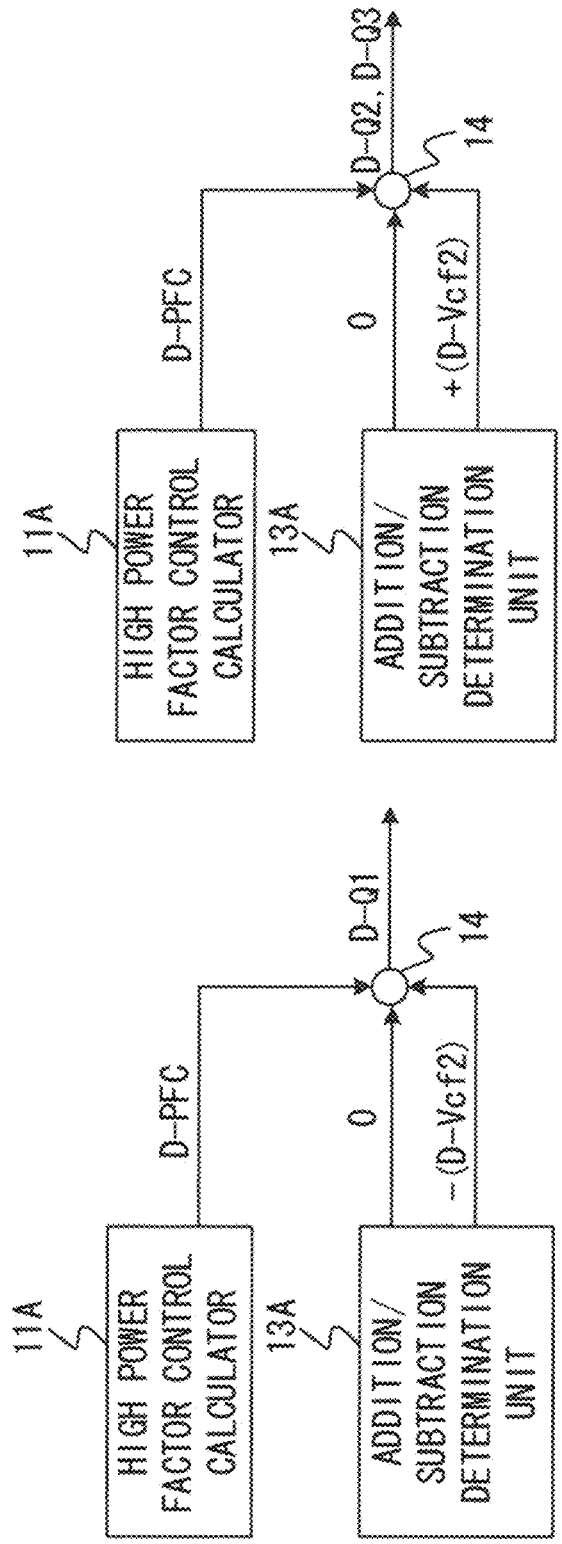
FIG. 39 is a control block diagram illustrating the control in FIG. 37.

FIG. 37 shows waveforms for illustrating control for a case where, in the operation range β1, the voltage Vcf1 of the first DC capacitor Cf1 is higher than the command value Vcf1* and the voltage Vcf2 of the second DC capacitor Cf2 is higher than the command value Vcf2*, and both the voltage Vcf1 and the voltage Vcf2 are reduced. FIG. 38 and FIG. 39 are control block diagrams illustrating the control in FIG. 37, and FIG. 38 is for the switching cycle S1 and FIG. 39 is for the switching cycle S2.

As shown in FIG. 37, in the switching cycle S1 in the control cycle T, the timing t1 at which the Q1, Q2 are switched off is shifted leftward in FIG. 37 to increase a discharging section for the first DC capacitor Cf1, and the timing t3 at which the Q3 is switched off is shifted rightward in FIG. 37 to shorten the charging section for the first DC capacitor Cf1. In the switching cycle S2 in the control cycle T, the timing t5 at which the Q1 is switched off is shifted leftward in FIG. 37 to increase the discharging section for the second DC capacitor Cf2, and the timing t7 at which the Q2, Q3 are switched off is shifted rightward in FIG. 37 to shorten the charging section for the second DC capacitor Cf2.

In the two switching cycles S1, S2 in the control cycle T, each of the duty cycles D-Q1, D-Q2, D-Q3 is adjusted for each of the switching cycles S1, S2. That is, each of the duty cycles D-Q1, D-Q2, D-Q3 has a value corresponding to two switching cycles and can have different values for each of the switching cycles S1, S2.

In the case of the operation range β1, the duty cycles D-Q1, D-Q2, D-Q3 are adjusted according to voltage fluctuation of the first DC capacitor Cf1 in the switching cycle S1, and the duty cycles D-Q1, D-Q2, D-Q3 are adjusted according to voltage fluctuation of the second DC capacitor Cf2 in the switching cycle S2.

As shown in FIG. 38, in a case where the duty cycles D-Q1, D-Q2 are generated in the switching cycle S1, the addition/subtraction determination unit 13A determines that the second duty cycle D-Vcf1 is to be subtracted from the first duty cycle D-PFC, to reduce the duty cycles D-Q1, D-Q2. In a case where the duty cycle D-Q3 is generated, the addition/subtraction determination unit 13A determines that the second duty cycle D-Vcf1 is to be added to the first duty cycle D-PFC, to increase the duty cycle D-Q3. In the switching cycle S1, the second duty cycle D-Vcf2 for the second DC capacitor Cf2 is not used and the corresponding value is set to 0.

As shown in FIG. 39, in a case where the duty cycle D-Q1 is generated in the switching cycle S2, the addition/subtraction determination unit 13A determines that the second duty cycle D-Vcf2 is to be subtracted from the first duty cycle D-PFC, to reduce the duty cycle D-Q1. In a case where the duty cycles D-Q2, D-Q3 are generated, the addition/subtraction determination unit 13A determines that the second duty cycle D-Vcf2 is to be added to the first duty cycle D-PFC, to increase the duty cycles D-Q2, D-Q3. In the switching cycle S2, the second duty cycle D-Vcf1 for the first DC capacitor Cf1 is not used and the corresponding value is set to 0.

Figure 40:
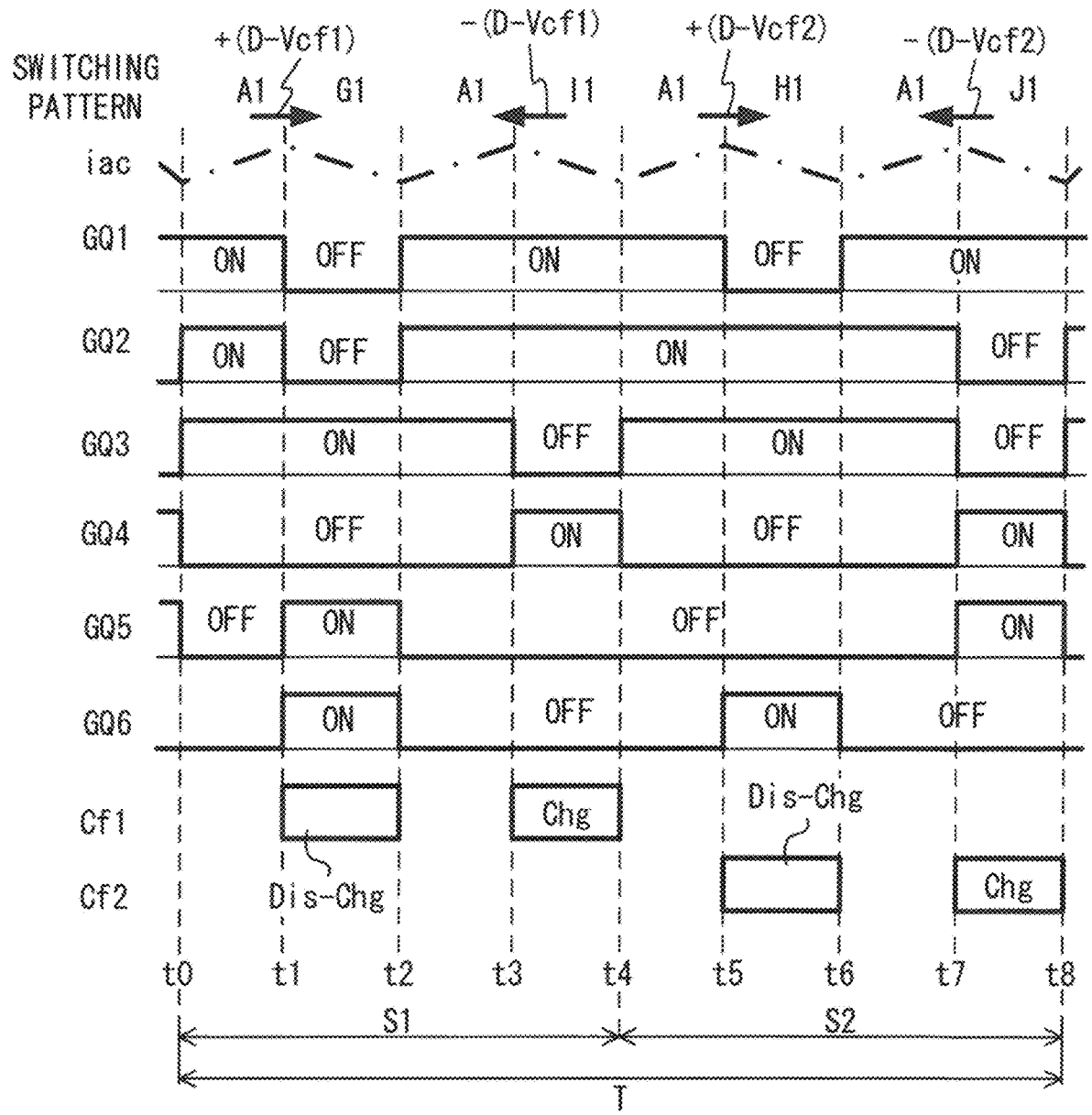
FIG. 40 is a waveform diagram illustrating control in voltage adjustment of the DC capacitor according to embodiment 2.
Figure 41:
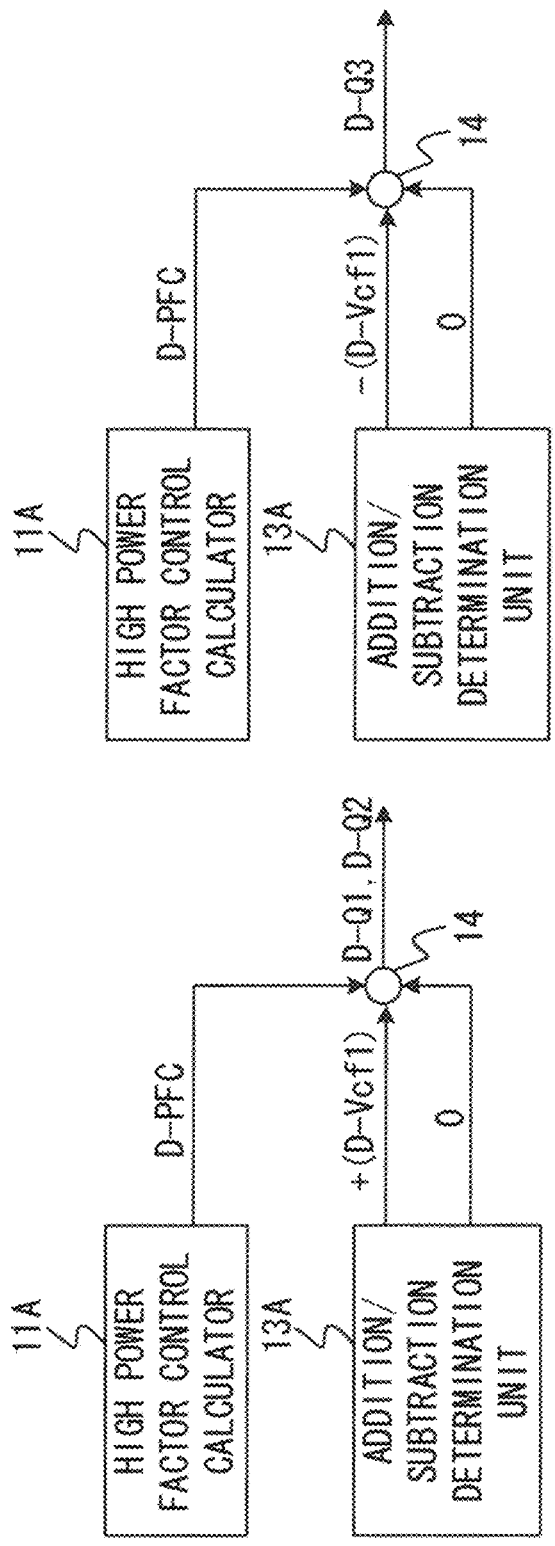
FIG. 41 is a control block diagram illustrating the control in FIG. 40.
Figure 42:
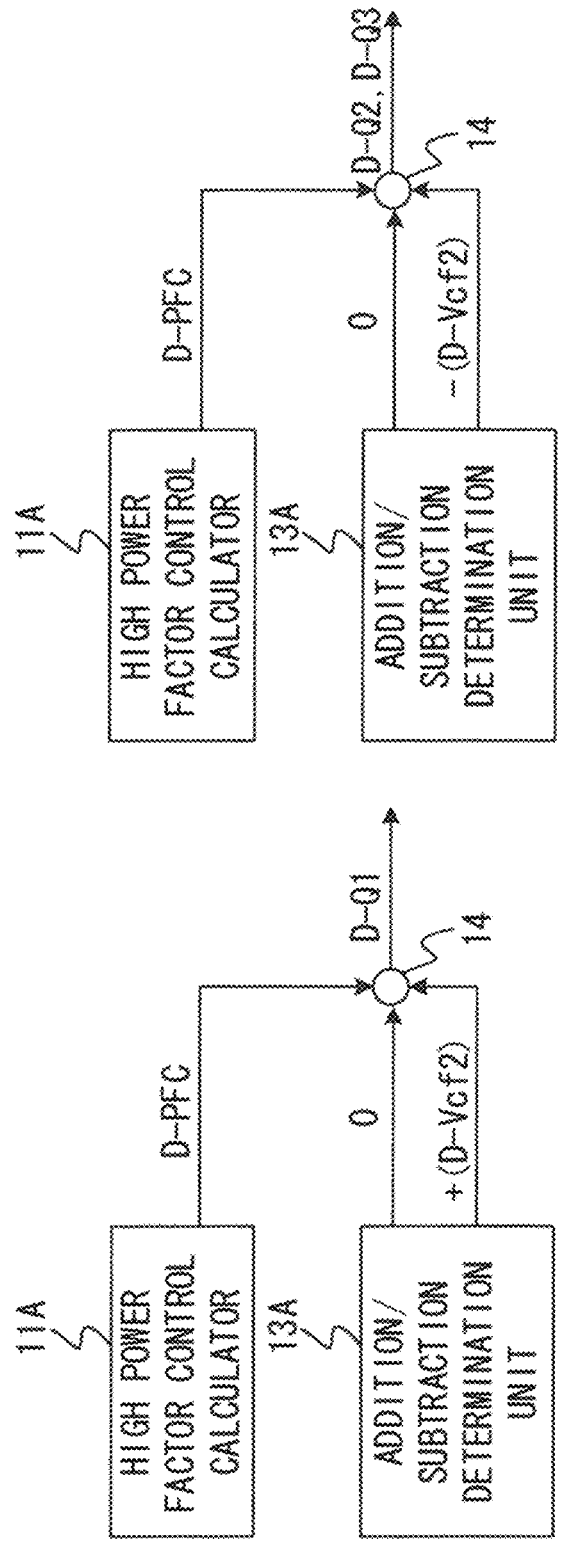
FIG. 42 is a control block diagram illustrating the control in FIG. 40.

FIG. 40 shows waveforms for illustrating control for a case where, in the operation range β1, the voltage Vcf1 of the first DC capacitor Cf1 is less than the command value Vcf1* and the voltage Vcf2 of the second DC capacitor Cf2 is less than the command value Vcf2*, and both the voltage Vcf1 and the voltage Vcf2 are increased. FIG. 41 and FIG. 42 are control block diagrams illustrating the control in FIG. 40. FIG. 41 is for the switching cycle S1 and FIG. 42 is for the switching cycle S2.

As shown in FIG. 40, in the switching cycle S1 in the control cycle T, the timing t1 at which the Q1, Q2 are switched off is shifted rightward in FIG. 40 to shorten the discharging section for the first DC capacitor Cf1, and the timing t3 at which the Q3 is switched off is shifted leftward in FIG. 40 to increase the charging section for the first DC capacitor Cf1. In the switching cycle S2 in the control cycle T, the timing t5 at which the Q1 is switched off is shifted rightward in FIG. 40 to shorten the discharging section for the second DC capacitor Cf2, and the timing t7 at which the Q2, Q3 are switched off is shifted leftward in FIG. 40 to increase the charging section for the second DC capacitor Cf2.

As shown in FIG. 41, in a case where the duty cycles D-Q1, D-Q2 are generated in the switching cycle S1, the addition/subtraction determination unit 13A determines that the second duty cycle D-Vcf1 is to be added to the first duty cycle D-PFC to increase the duty cycles D-Q1, D-Q2. In a case where the duty cycle D-Q3 is generated, the addition/subtraction determination unit 13A determines that the second duty cycle D-Vcf1 is to be subtracted from the first duty cycle D-PFC to reduce the duty cycle D-Q3. In the switching cycle S1, the second duty cycle D-Vcf2 for the second DC capacitor Cf2 is not used and the corresponding value is set to 0.

As shown in FIG. 42, in a case where the duty cycle D-Q1 is generated in the switching cycle S2, the addition/subtraction determination unit 13A determines that the second duty cycle D-Vcf2 is to be added to the first duty cycle D-PFC to increase the duty cycle D-Q1. In a case where the duty cycles D-Q2, D-Q3 are generated, the addition/subtraction determination unit 13A determines that the second duty cycle D-Vcf2 is to be subtracted from the first duty cycle D-PFC to reduce the duty cycles D-Q2, D-Q3. In the switching cycle S2, the second duty cycle D-Vcf1 for the first DC capacitor Cf1 is not used and the corresponding value is set to 0.

In both the case shown in FIG. 37 to FIG. 39 and the case shown in FIG. 40 to FIG. 42, each of the second duty cycle D-Vcf1 and the second duty cycle D-Vcf2 is once added to and once subtracted from the sum of the three duty cycles D-Q1, D-Q2, D-Q3 in the control cycle. Therefore, the sum is not changed and is constant. The sample and hold unit 28 in the second controller 12A holds values of the second duty cycles D-Vcf1, D-Vcf2 in one control cycle and outputs the values. Therefore, in the calculation, the sum of the three duty cycles D-Q1, D-Q2, D-Q3 can be assuredly made constant.

In a case where the sum of the duty cycles D-Q1, D-Q2, D-Q3 for the Q1, Q2, Q3 in the upper leg 6a is constant, the sum of the duty cycles D-Q4, D-Q5, D-Q6 for the Q4, Q5, Q6 in the lower leg 6b also becomes constant.

Thus, voltage control for each of the first and the second DC capacitors Cf1, Cf2 can be performed for each control cycle (two switching cycles). The sum of the three duty cycles D-Q1, D-Q2, D-Q3 is constant regardless of voltage fluctuations of the first and the second DC capacitors Cf1, Cf2, and is equal to the sum of the first duty cycles D-PFC. Therefore, interference with high power factor control of the input current iac is significantly suppressed.

In the above description, both the voltages Vcf1, Vcf2 of the first and the second DC capacitors Cf1, Cf2 are reduced or increased. However, either of them may be reduced or increased. Alternatively, both of them may be controlled in opposite directions.

For example, in a case where the first DC capacitor Cf1 is charged or discharged and the second DC capacitor Cf2 is charged or discharged in one switching state in a certain section as in the operation range β2 shown in FIG. 32, one of the first and the second DC capacitors Cf1 and Cf2 in which the deviation between the voltage Vcf1, Vcf2 and the command value Vcf1*, Vcf2* is greater can be preferentially controlled. Thus, more stable control can be continued.

As described above, in the present embodiment, the power conversion circuit 1A includes two DC capacitors (the first and the second DC capacitors Cf1, Cf2). The control circuit 7A controls driving of the leg circuit 6 at a control cycle corresponding to two cycles of the switching cycle. The switching pattern SPA is used to control the input current iac and control charging and discharging of the DC capacitor Cf according to the first duty cycle D-PFC. Furthermore, the addition/subtraction determination unit 13A operates to add or subtract the second duty cycle D-Vcf to or from the first duty cycle D-PFC, thereby suppressing voltage fluctuations of the first and the second DC capacitors Cf1, Cf2. Although the three duty cycles D-Q1, D-Q2, D-Q3 are each adjusted so as to suppress voltage fluctuations of the first and the second DC capacitors Cf1, Cf2, the sum in one control cycle is not changed and is constant.

The voltage control for the first and the second DC capacitors Cf1, Cf2 can be performed for each control cycle (two switching cycles). Therefore, the charging/discharging time constants of the first and the second DC capacitors Cf1, Cf2 can be made equal to the control cycle. Thus, good control responsiveness is maintained, and the capacitances of the first and the second DC capacitors Cf1, Cf2 can be reduced. The sum of the three duty cycles D-Q1, D-Q2, D-Q3 is constant regardless of voltage fluctuations of the first and the second DC capacitors Cf1, Cf2 and is equal to the sum of the first duty cycles D-PFC. Therefore, interference with high power factor control of the input current iac is significantly suppressed.

Therefore, interference between the high power factor control of the input current iac and the voltage control for the first and the second DC capacitors Cf1, Cf2 can be suppressed to perform both the controls with high accuracy, and the capacitance and the size of each of the first and the second DC capacitors Cf1, Cf2 can be reduced. Thus, downsizing of the power conversion device 200 can be promoted.

In embodiment 2, the power conversion circuit 1A includes two DC capacitors (the first and the second DC capacitors Cf1, Cf2). However, the number of the DC capacitors may be greater than or equal to three.

In a case where N represents the number of the DC capacitors in the power conversion circuit 1A, the control cycle corresponds to the N switching cycles. The voltage control for each DC capacitor can be similarly performed for each control cycle. The N DC capacitors are disposed sequentially from the center of the leg circuit 6 toward the outer side. The closer the DC capacitor is to the outer side, the higher the voltage is.

In embodiments 1 and 2, the control circuit 7, 7A performs calculation such that the sum of the duty cycles D of the switching elements in the upper leg 4a, 6a is constant in one control cycle. However, the control circuit 7, 7A may perform calculation such that the sum of the duty cycles D of the switching elements in the lower leg 4b, 6b is constant in one control cycle. In this case, the duty cycle D of the switching element in the lower leg 4b, 6b is calculated and used more preferentially than that in the upper leg 4a, 6a. In each of the cases, the sum of the duty cycles D is constant in the control cycle in both the upper and lower legs.

Also in embodiment 2, the first duty cycle D-PFC may be generated without using the feedforward control as in embodiment 1.

Also in embodiment 2, the reactor L may be disposed in any manner as long as the reactor L is inserted in the current path between the AC power supply 2 and the leg circuit 4, and, as shown in FIG. 23, the two reactors Lp, Ln may be connected.

Embodiment 3

Figure 43:
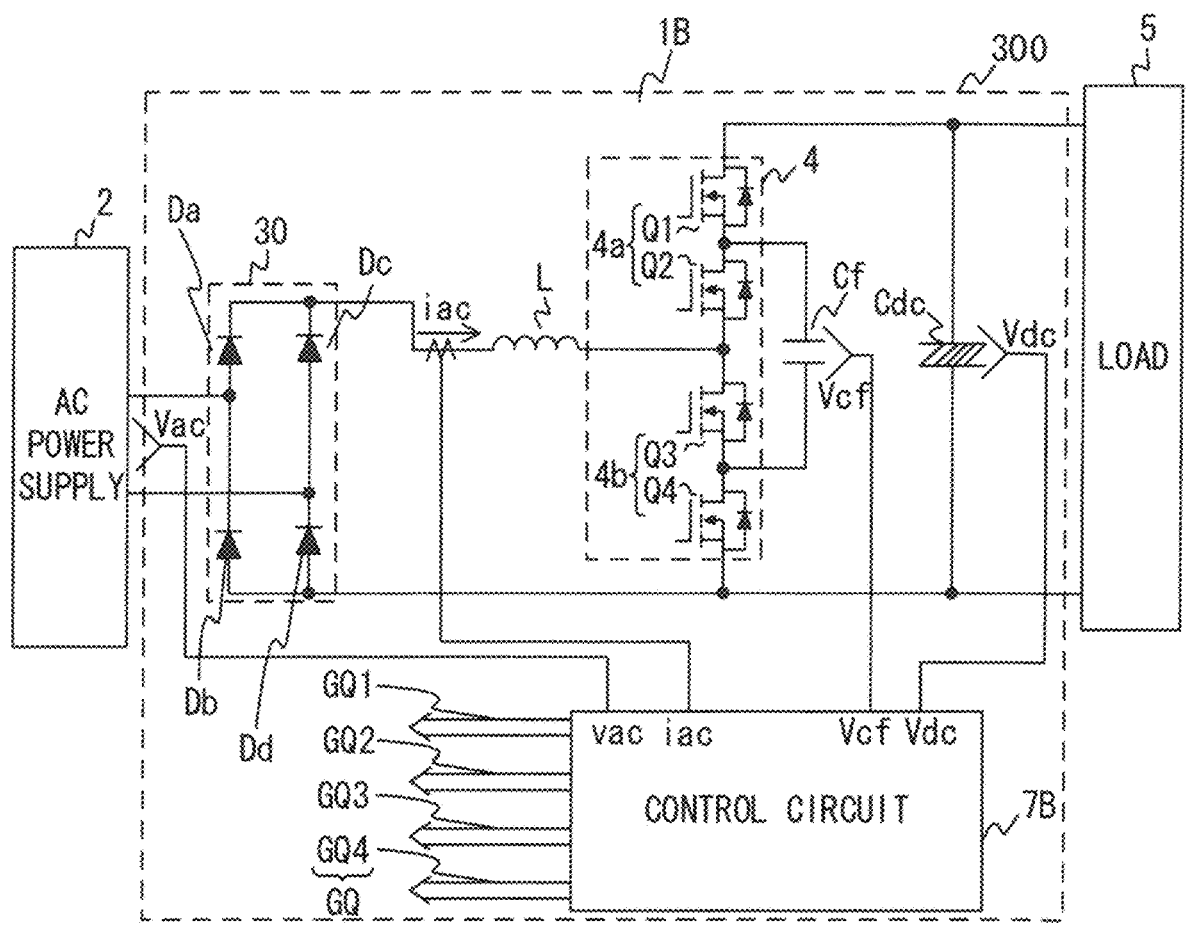
FIG. 43 schematically illustrates a configuration of a power conversion device according to embodiment 3.

FIG. 43 schematically illustrates a configuration of a power conversion device according to embodiment 3.

As shown in FIG. 43, a power conversion device 300 includes a power conversion circuit 1B, and a control circuit 7B for performing output control for the power conversion circuit 1B, and performs power conversion of AC power from the AC power supply 2, to supply DC power to the load 5. The power conversion circuit 1B consists of an AC/DC converter circuit, and includes a rectification bridge circuit 30 connected to the AC power supply 2, the leg circuit 4, the DC capacitor Cf, the smoothing capacitor Cdc, and the reactor L for limiting the input current iac.

In this case, the rectification bridge circuit 30 and the control circuit 7B are different from those in embodiment 1, and the other configurations are the same as in embodiment 1. Therefore, the description is omitted as appropriate.

The rectification bridge circuit 30 is a full-bridge circuit composed of four diodes Da, Db, Dc, Dd, and two AC terminals are connected to a first end and a second end, respectively, of the AC power supply. A positive electrode of the rectification bridge circuit 30 is connected to a mid-point of the leg circuit 4 via the reactor L. A negative electrode of the rectification bridge circuit 30 is connected to a negative DC bus, that is, connected to a negative electrode of the leg circuit 4 and a negative electrode of the smoothing capacitor Cdc.

The rectification bridge circuit 30 performs full-wave rectification for current inputted from the AC power supply 2, and outputs a positive half wave only. In this case, current flowing in the reactor L after the rectification is the input current iac.

The rectification bridge circuit 30 may be configured by using switching elements instead of the diodes Da, Db, Dc, Dd. The same type of switching elements as those used in the leg circuit 4 may be used.

The control circuit 7B has the same configuration as in embodiment 1. In this case, the full-wave-rectified input current iac is inputted to the mid-point of the leg circuit 4. Therefore, two kinds of operation ranges are obtained, and a different current path is formed in the power conversion circuit 1B. However, the control operation by the control circuit 7B is the same as in embodiment 1. Therefore, the same effect as in embodiment 1 can be obtained.

The leg circuit 4 processes the full-wave-rectified input current iac only and does not process a negative half-wave current. Therefore, switching of the upper leg 4a may be unnecessary.

Figure 44:
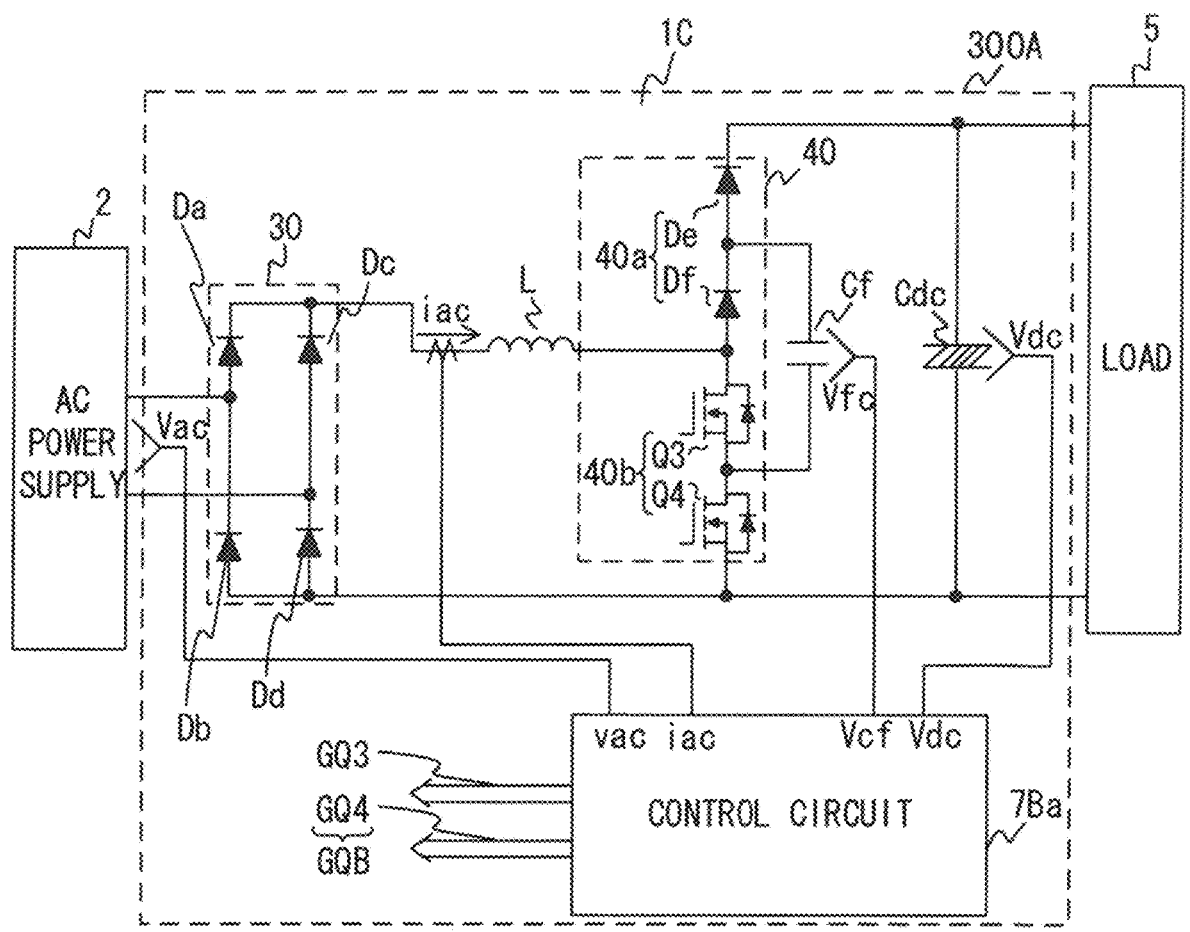
FIG. 44 schematically illustrates a configuration of another example of the power conversion device according to embodiment 3.

FIG. 44 schematically illustrates a configuration of another example of the power conversion device according to embodiment 3.

As shown in FIG. 44, a power conversion device 300A includes a power conversion circuit 1C, and a control circuit 7Ba for performing output control for the power conversion circuit 1C. The power conversion circuit 1C includes the rectification bridge circuit 30, a leg circuit 40, the DC capacitor Cf, the smoothing capacitor Cdc, and the reactor L. The power conversion device 300A uses the leg circuit 40 instead of the leg circuit 4 used in the power conversion device 300 of embodiment 3. The leg circuit 40 is structured such that semiconductor elements in an upper leg 40a are composed of diodes De, Df, and only semiconductor elements in a lower leg 40b are composed of the switching elements Q3, Q4.

In this case, the control circuit 7Ba generates only a gate signal GQB (GQ3, GQ4) for the Q3, Q4 in the lower leg 40b, and, at this time, the sum of the duty cycles D-Q3, D-Q4 for the Q3, Q4 is made constant in one control cycle. Thus, the same effect as in embodiment 1 can be obtained.

The number of the switching elements in the leg circuit 40 can be reduced to obtain the leg circuit 40 with low cost. Thus, cost of the power conversion device 300A can be reduced.

Embodiment 4

Figure 45:
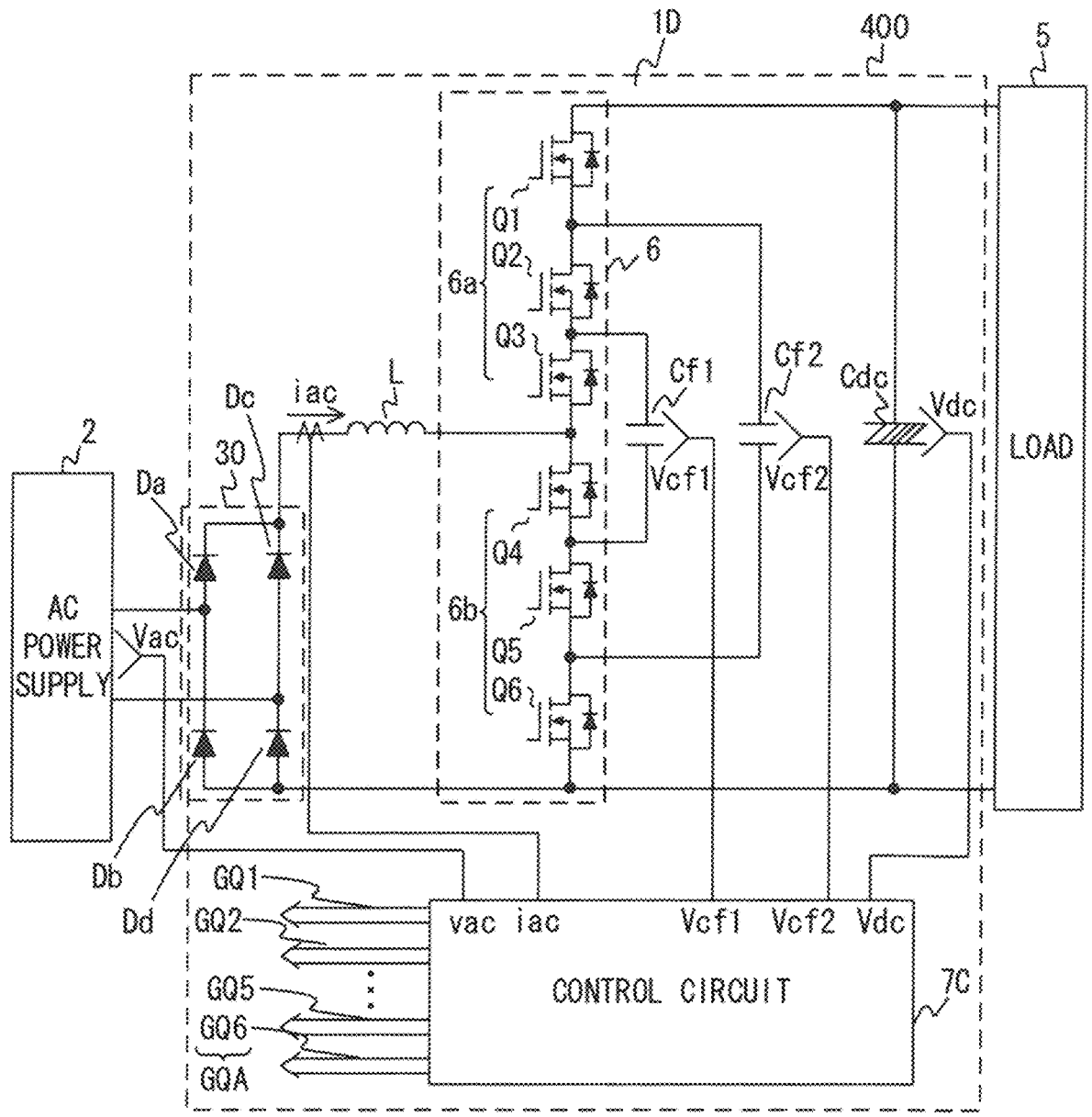
FIG. 45 schematically illustrates a configuration of a power conversion device according to embodiment 4.

FIG. 45 schematically illustrates a configuration of a power conversion device according to embodiment 4.

As shown in FIG. 45, a power conversion device 400 includes a power conversion circuit 1D, and a control circuit 7C for performing output control for the power conversion circuit 1D, and performs power conversion of AC power from the AC power supply 2, to supply DC power to the load 5. The power conversion circuit 1D consists of an AC/DC converter circuit, and includes the rectification bridge circuit 30 connected to the AC power supply 2, the leg circuit 6, the first and the second DC capacitors Cf1, Cf2, the smoothing capacitor Cdc, and the reactor L for limiting the input current iac.

In this case, the rectification bridge circuit 30 and the control circuit 7C are different from those in embodiment 2, and the other configurations are the same as in embodiment 2. Therefore, the description is omitted as appropriate.

The rectification bridge circuit 30 is the same as that in embodiment 3, that is, is a full-bridge circuit consisting of four diodes Da, Db, Dc, Dd. The two AC terminals are connected to the first end and the second end, respectively, of the AC power supply. A positive electrode of the rectification bridge circuit 30 is connected to a mid-point of the leg circuit 6 via the reactor L. A negative electrode of the rectification bridge circuit 30 is connected to a negative DC bus, that is, connected to a negative electrode of the leg circuit 6 and a negative electrode of the smoothing capacitor Cdc.

The rectification bridge circuit 30 performs full-wave rectification for current inputted from the AC power supply 2, and outputs a positive half wave only. In this case, current flowing in the reactor L after the rectification is the input current iac.

The control circuit 7C has the same configuration as in embodiment 2. In this case, the full-wave-rectified input current iac is inputted to the mid-point of the leg circuit 6. Therefore, three kinds of operation ranges are obtained, and a different current path is formed in the power conversion circuit 1D. However, the control operation by the control circuit 7C is the same as in embodiment 2. Therefore, the same effect as in embodiment 2 can be obtained.

The leg circuit 6 processes the full-wave-rectified input current iac only and does not process a negative half-wave current. Therefore, switching of the upper leg 6a may be unnecessary.

Figure 46:
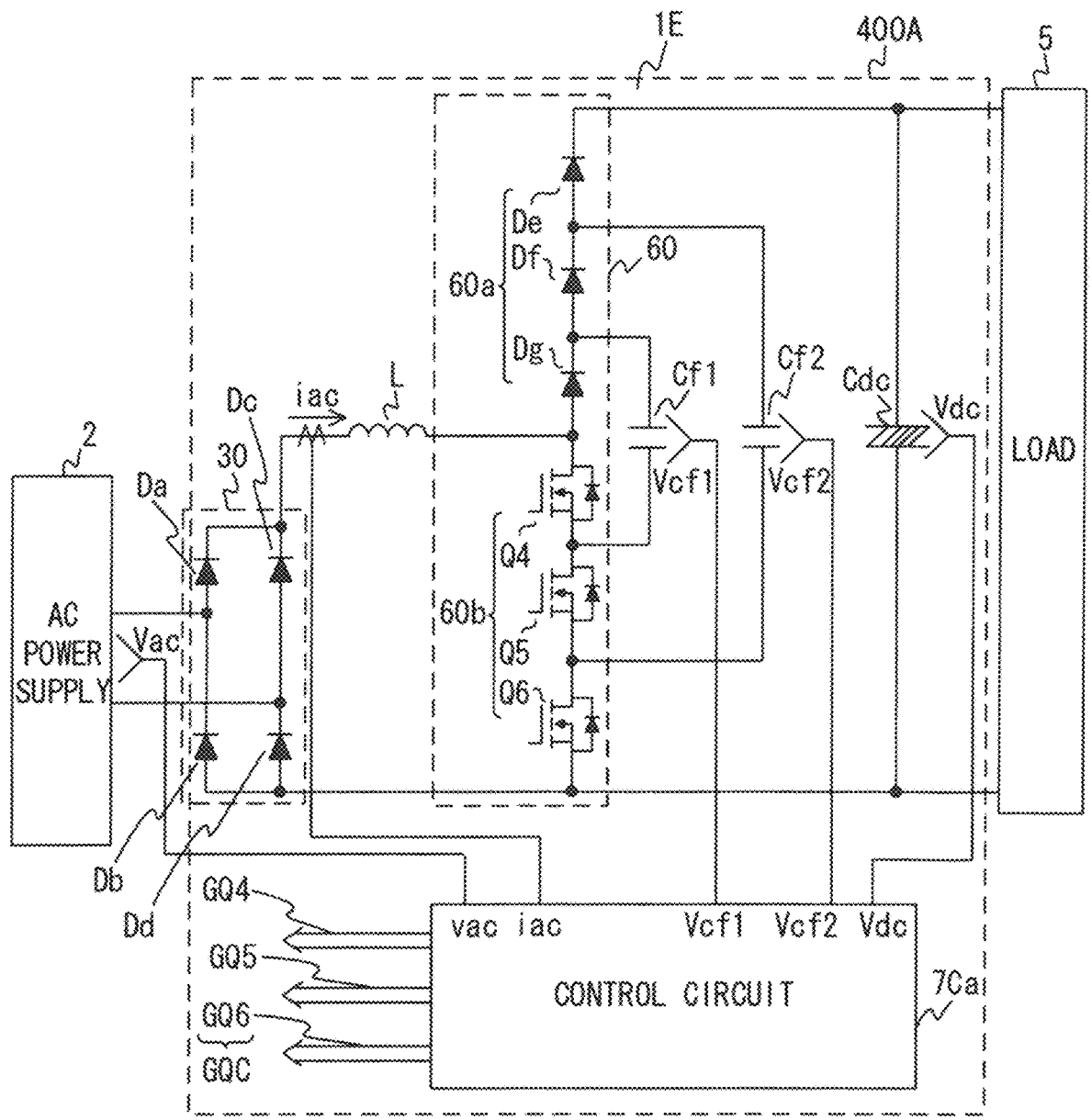
FIG. 46 schematically illustrates a configuration of another example of the power conversion device according to embodiment 4.

FIG. 46 schematically illustrates a configuration of another example of the power conversion device according to embodiment 4.

As shown in FIG. 46, a power conversion device 400A includes a power conversion circuit 1E, and a control circuit 7Ca for performing output control for the power conversion circuit 1E. The power conversion circuit 1E includes the rectification bridge circuit 30, a leg circuit 60, the first and the second DC capacitors Cf1, Cf2, the smoothing capacitor Cdc, and the reactor L. The power conversion device 400A uses the leg circuit 60 instead of the leg circuit 6 used in the power conversion device 400 of embodiment 4. The leg circuit 60 is structured such that semiconductor elements in an upper leg 60a are composed of diodes De, Df, Dg and only semiconductor elements in a lower leg 60b are composed of the switching elements Q4, Q5, Q6.

In this case, the control circuit 7Ca generates only a gate signal GQC (GQ4, GQ5, GQ6) for the Q4, Q5, Q6 in the lower leg 60b, and, at this time, the sum of the duty cycles D-Q4, D-Q5, D-Q6 for the Q4, Q5, Q6 is made constant in one control cycle. Thus, the same effect as in embodiment 2 can be obtained.

The number of the switching elements in the leg circuit 60 can be reduced to obtain the leg circuit 60 with low cost. Thus, cost of the power conversion device 400A can be reduced.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1, 1A, 1B, 1C, 1D power conversion circuit
2 AC power supply
3 rectification bridge circuit
4 leg circuit
4a upper leg
4b lower leg
6 leg circuit
6a upper leg
6b lower leg
7, 7A, 7B, 7Ba, 7C, 7Ca control circuit
10, 10A pattern generator
11, 11A first controller (high power factor control calculator)
12, 12A second controller (capacitor voltage control calculator)
13, 13A addition/subtraction determination unit
23a feedforward term
30 rectification bridge circuit
40 leg circuit
40a upper leg
40b lower leg
60 leg circuit
60a upper leg
60b lower leg
100, 200, 300, 300A, 400, 400A power conversion device
$\alpha 1$ to $\alpha 4$, $\beta 1$ to $\beta 6$ operation range
A1 to K1, A2 to J2, A3 to K3 switching state
Cdc smoothing capacitor
Cf DC capacitor
Cf1 first DC capacitor
Cf2 second DC capacitor
De, Df, Dg diode (semiconductor element)
D-PFC first duty cycle
D-Vcf, D-Vcf1, D-Vcf2 second duty cycle
D-Q1 to D-Q6 duty cycle
iac input current
L, Lp, Ln reactor
Q1 to Q6 switching element
S1, S2 switching cycle
SP, SPA switching pattern
T control cycle
Vcf voltage of DC capacitor
Vcf1 voltage of first DC capacitor
Vcf2 voltage of second DC capacitor
Vdc voltage of smoothing capacitor
vac AC voltage

The invention claimed is:

1. A power conversion device comprising:
a power conversion circuit for converting an AC power from an AC power supply, to a DC power, and outputting the DC power; and
a control circuitry to perform output control for the power conversion circuit,
wherein the power conversion circuit includes:
a rectification bridge circuit connected to the AC power supply;
a leg circuit including an upper leg and a lower leg, connected in series, each of which includes a plurality of semiconductor elements connected in series via connection points, the plurality of semiconductor elements of at least the lower leg being switching elements, the leg circuit connected between DC buses and connected to the AC power supply via the rectification bridge circuit;
at least one DC capacitor connected between the connection point in the upper leg and the connection point in the lower leg;
a reactor inserted in a current path between the AC power supply and the leg circuit; and
a smoothing capacitor connected between the DC buses;
and wherein the control circuitry generates duty cycles corresponding to each leg having the switching elements among the upper and the lower legs so that a sum of the duty cycles is constant in one cycle of a switching cycle, and performs PWM control of the leg circuit so as to cause a voltage of the DC capacitor to follow a command value while controlling an input current from the AC power supply, wherein the control circuitry includes
- a first controller to control the input current and causing the power conversion circuit to output DC power,
- a second controller to cause the voltage of the DC capacitor to follow the command value,
- a pattern generator to generate a switching pattern including a combination of switching states, of the leg circuit, which vary in one cycle of a control cycle which is an integer multiple of the switching cycle, and
- an addition/subtraction determination circuitry to determine whether addition or subtraction is to be performed, the first controller generates a first duty cycle according to the switching pattern from the pattern generator, a second duty cycle generated by the second controller is added to or subtracted from the first duty cycle to calculate each of the duty cycles of the leg circuit, and the addition/subtraction determination circuitry determines, when the second duty cycle is added to or subtracted from the first duty cycle, whether addition or subtraction is to be performed according to the switching pattern.

2. The power conversion device according to claim 1, wherein
the at least one DC capacitor includes N DC capacitors which are a first to an N-th DC capacitors, the first to the N-th DC capacitors being disposed sequentially from a center of the leg circuit in an outward direction, wherein N is an integer, and
the control circuitry performs PWM control of the leg circuit at the control cycle corresponding to N switching cycles, such that the sum of the duty cycles is constant in one cycle of the control cycle.

3. The power conversion device according to claim 1, wherein
the control circuitry determines a plurality of operation ranges based on a voltage relationship among the voltage of the DC capacitor, a voltage of the AC power supply, and a voltage of the smoothing capacitor, and
the pattern generator generates the switching pattern according to each of the operation ranges.

4. The power conversion device according to claim 1, wherein the sum of the duty cycles corresponding to each leg is equal to a sum of the first duty cycles.

5. The power conversion device according to claim 1, wherein a plurality of sections corresponding to the plurality of switching states of the switching pattern is a combination formed by alternating sections in which excitation of the reactor is performed and sections in which the excitation is reset.

6. The power conversion device according to claim 1, wherein
the control circuitry performs control so as to cause the voltage of the DC capacitor to follow the command value for each DC capacitor, and
a number of charging sections and a number of discharging sections are equal to each other for each DC capacitor in the plurality of sections corresponding to the plurality of switching states of the switching pattern.

7. The power conversion device according to claim 6, wherein the control circuitry performs control so as to cause the voltage of the DC capacitor to follow the command value for each DC capacitor preferentially for a DC capacitor having a greater deviation between the voltage of the DC capacitor and the command value.

8. The power conversion device according to claim 1, wherein the first controller calculates a feedforward term according to the switching pattern and uses the feedforward term.

9. The power conversion device according to claim 1, wherein the second duty cycle generated by the second controller is fixed in one cycle of the control cycle.

10. The power conversion device according to claim 2, wherein the first to the N-th DC capacitors are disposed such that a voltage is increased from the center of the leg circuit in the outward direction.

11. The power conversion device according to claim 1, wherein
the rectification bridge circuit is a half-bridge circuit connected between the DC buses,
a mid-point of the half-bridge circuit is connected to a first end of the AC power supply,
a mid-point of the leg circuit is connected to a second end of the AC power supply, and
the plurality of semiconductor elements of the upper leg are switching elements.

12. The power conversion device according to claim 1, wherein
the rectification bridge circuit is a full-bridge circuit including two AC terminals connected to a first end and a second end, respectively, of the AC power supply, and
a positive electrode of the full-bridge circuit is connected to a mid-point of the leg circuit.

13. The power conversion device according to claim 3, wherein the sum of the duty cycles corresponding to each leg is equal to a sum of the first duty cycles.

14. The power conversion device according to claim 3, wherein a plurality of sections corresponding to the plurality of switching states of the switching pattern is a combination formed by alternating sections in which excitation of the reactor is performed and sections in which the excitation is reset.

15. The power conversion device according to claim 4, wherein a plurality of sections corresponding to the plurality of switching states of the switching pattern is a combination formed by alternating sections in which excitation of the reactor is performed and sections in which the excitation is reset.

16. The power conversion device according to claim 3, wherein
the control circuitry performs control so as to cause the voltage of the DC capacitor to follow the command value for each DC capacitor, and
a number of charging sections and a number of discharging sections are equal to each other for each DC capacitor in the plurality of sections corresponding to the plurality of switching states of the switching pattern.

17. The power conversion device according to claim 4, wherein
the control circuitry performs control so as to cause a voltage to follow the command value for each DC capacitor, and
a number of charging sections and a number of discharging sections are equal to each other for each DC capacitor in the plurality of sections corresponding to the plurality of switching states of the switching pattern.

18. The power conversion device according to claim 5, wherein
- the control circuitry performs control so as to cause a voltage to follow the command value for each DC capacitor, and
- a number of charging sections and a number of discharging sections are equal to each other for each DC capacitor in the plurality of sections corresponding to the plurality of switching states of the switching pattern.

19. The power conversion device according to claim 3, wherein the first controller calculates a feedforward term according to the switching pattern and uses the feedforward term.

* * * * *